United States Patent [19]
Ito et al.

[11] Patent Number: 5,991,457
[45] Date of Patent: Nov. 23, 1999

[54] MULTI-RESOLUTION TRANSFORMING, IMAGE PROCESSING AND DYNAMIC RANGE COMPRESSING METHOD AND APPARATUS

[75] Inventors: Wataru Ito; Masahiko Yamada, both of Kanagawa-ken, Japan

[73] Assignee: Fuji Photo Film Co., Ltd., Kanagawa-ken, Japan

[21] Appl. No.: 08/723,313

[22] Filed: Sep. 30, 1996

[30] Foreign Application Priority Data

| Sep. 29, 1995 | [JP] | Japan | 7-252088 |
|---|---|---|---|
| Sep. 29, 1995 | [JP] | Japan | 7-252089 |
| Sep. 29, 1995 | [JP] | Japan | 7-252090 |
| Dec. 12, 1995 | [JP] | Japan | 7-323121 |
| Jun. 28, 1996 | [JP] | Japan | 8-169062 |
| Jun. 28, 1996 | [JP] | Japan | 8-169063 |
| Jun. 28, 1996 | [JP] | Japan | 8-169064 |
| Jun. 28, 1996 | [JP] | Japan | 8-169065 |
| Jul. 2, 1996 | [JP] | Japan | 8-172498 |
| Jul. 11, 1996 | [JP] | Japan | 8-182155 |
| Jul. 11, 1996 | [JP] | Japan | 8-182156 |

[51] Int. Cl.$^6$ .............. G06K 9/40; G06K 9/36; G06K 9/00
[52] U.S. Cl. .............. 382/254; 382/132; 382/276
[58] Field of Search .............. 382/240, 302, 382/132, 128, 264, 274, 275, 263, 270, 131, 276; 250/584, 586; 378/98.4, 207, 62, 98.2; 358/447

[56] References Cited

U.S. PATENT DOCUMENTS

| 4,315,318 | 2/1982 | Kato et al. | 382/264 |
|---|---|---|---|
| 4,317,179 | 2/1982 | Kato et al. | 364/515 |
| 4,581,535 | 4/1986 | Komaki et al. | 250/327.2 |
| 4,794,531 | 12/1988 | Morishita et al. | 382/132 |
| 4,903,205 | 2/1990 | Hishinuma | 382/130 |
| 5,048,111 | 9/1991 | Jones et al. | 382/56 |
| 5,051,902 | 9/1991 | Hishinuma | 364/413.13 |

(List continued on next page.)

FOREIGN PATENT DOCUMENTS

| 0313042 | 4/1989 | European Pat. Off. | H04N 1/40 |
|---|---|---|---|
| 0440166 | 8/1991 | European Pat. Off. | G06F 15/68 |
| 0610604 | 8/1994 | European Pat. Off. | G06F 15/68 |
| 3276265 | 12/1991 | Japan | G06F 15/62 |
| WO 8907799 | 8/1989 | WIPO | H04N 1/40 |

OTHER PUBLICATIONS

"Dynamic Range Compression by Edge–Preserving Filtering", Y. Wong IEEE Signal Processing Letters 1 (1994) 179–181.

E.J. Purcell, *Calculus with Analytic Geometry*, (Appleton–Century–Crofts; NY, 1965) 207–212.

A. Vanzo et al., "An Image Enhancement Technique Using Polynomial Filters", D.E.E.I., University of Trieste, 1994, pp. 477–481.

Primary Examiner—Thomas D. Lee
Assistant Examiner—Wenpeng Chen
Attorney, Agent, or Firm—Sughrue, Mion, Zinn, Macpeak & Seas, PLLC

[57] ABSTRACT

A filtering process and an interpolating operation process are carried out in steps on an original image signal and, in the respective steps, a plurality of unsharp image signals are formed, which represent images having the same size as the size of the original image and have different frequency characteristics. Band-limited image signals are formed from the unsharp image signals and the original image signal, restricted by conversion, and integrated. An integration signal composed of predetermined frequency components of the original image signal is thereby formed. The frequency emphasis processing is carried out by multiplying the integration signal by an emphasis coefficient, and adding the resulting product to the original image signal. The dynamic range compressing process is carried out by converting a difference signal, which is obtained by subtracting the integration signal from the original image signal, and adding the converted difference signal to the original image signal. An artifact is thereby prevented from occurring at a region in the vicinity of an edge.

146 Claims, 34 Drawing Sheets

U.S. PATENT DOCUMENTS

| | | | |
|---|---|---|---|
| 5,131,057 | 7/1992 | Walowit et al. | 382/264 |
| 5,333,065 | 7/1994 | Vuylsteke | 358/456 |
| 5,425,113 | 6/1995 | Ito | 382/254 |
| 5,454,044 | 9/1995 | Nakajima | 382/132 |
| 5,454,053 | 9/1995 | Okubo et al. | 382/132 |
| 5,467,404 | 11/1995 | Vuylsteke | 382/128 |
| 5,471,987 | 12/1995 | Nakazawa et al. | 128/659 |
| 5,608,813 | 3/1997 | Nakajima | 382/132 |
| 5,717,789 | 2/1998 | Anderson et al. | 382/254 |
| 5,740,268 | 4/1998 | Nishikawa et al. | 382/132 |

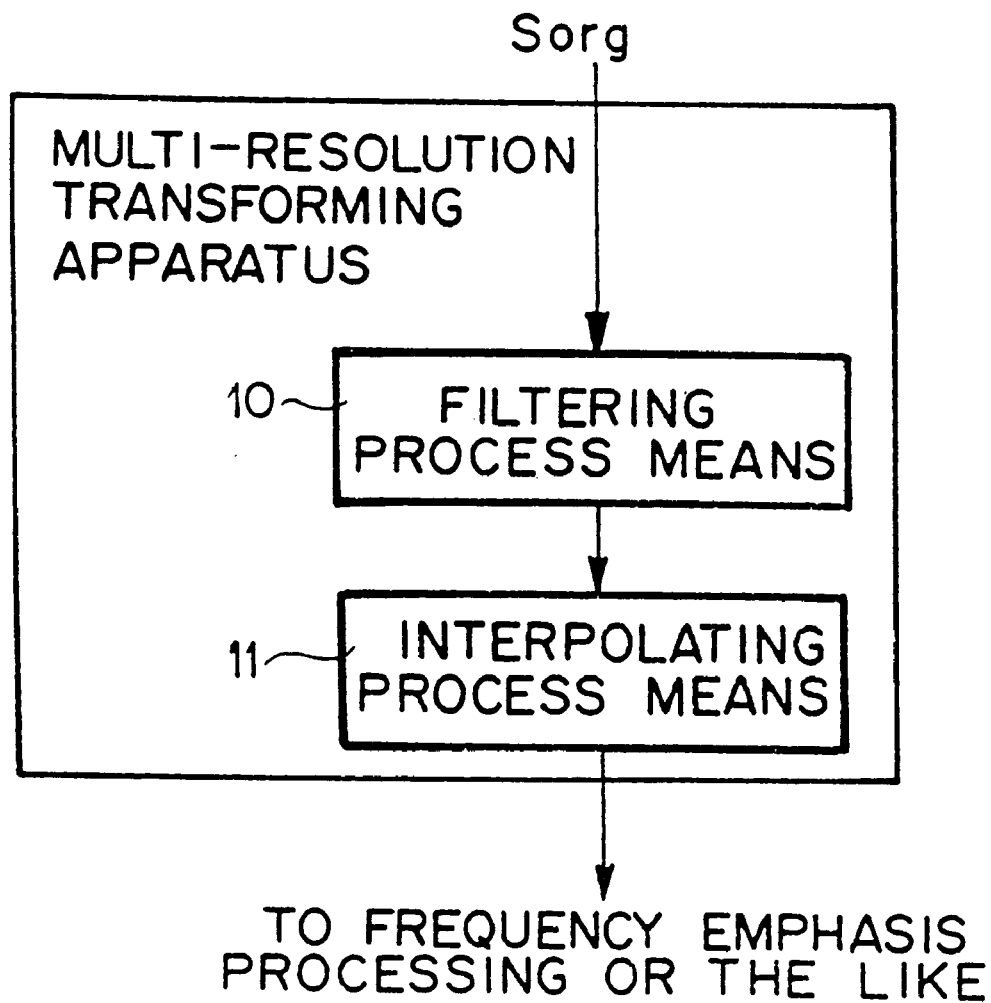

0.1  0.5  0.8  0.5  0.1

0.1  0.5  0.8  0.5  0.1

F I G .12
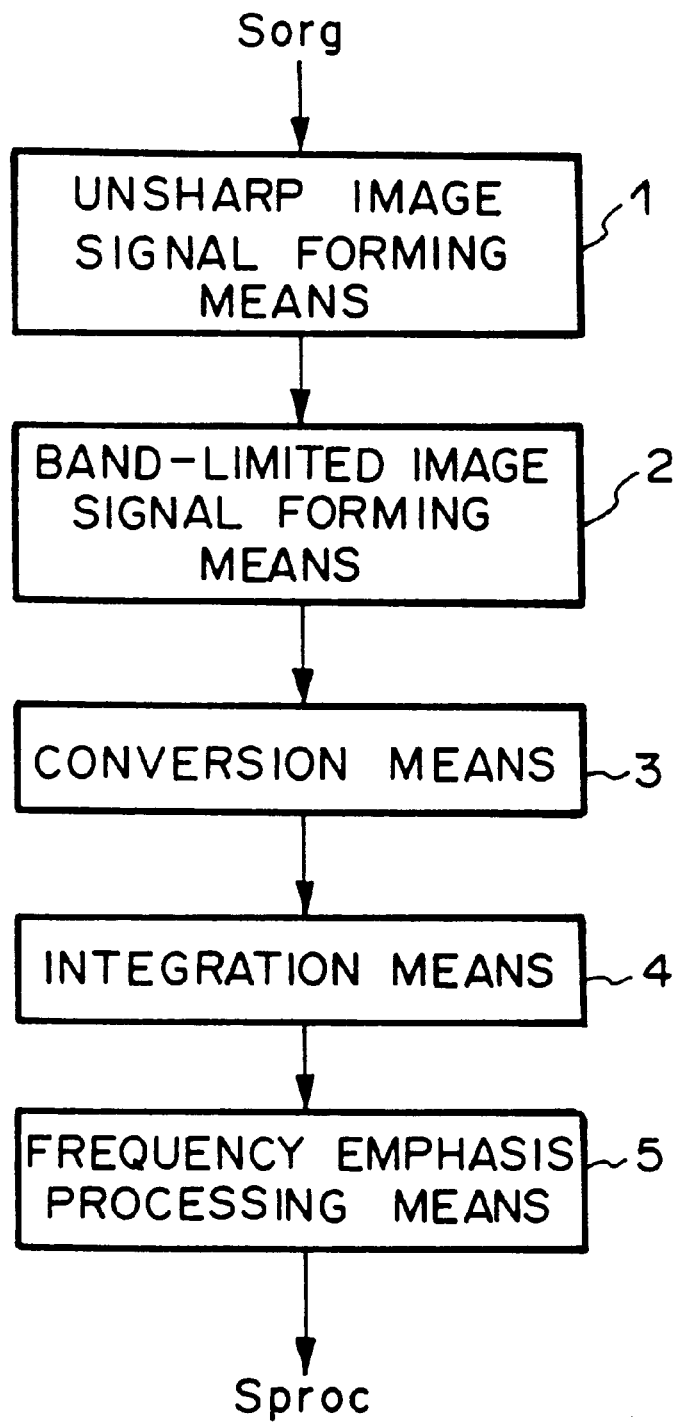

F I G. 19
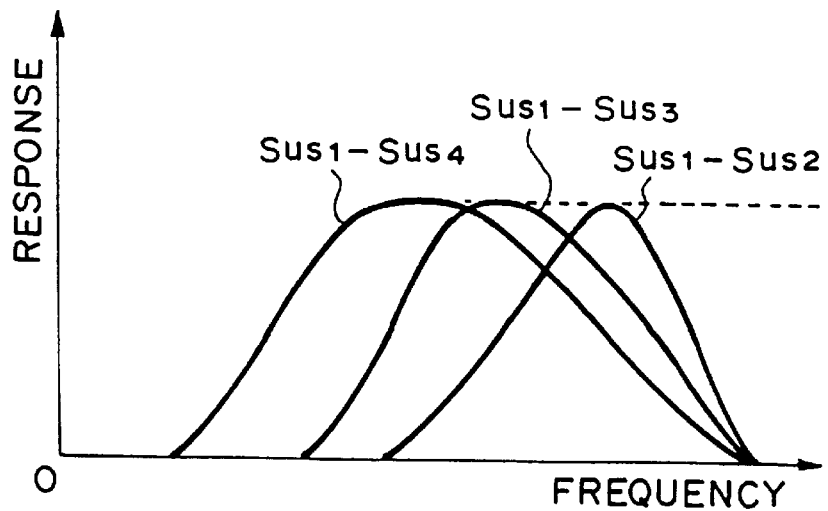
F I G. 20
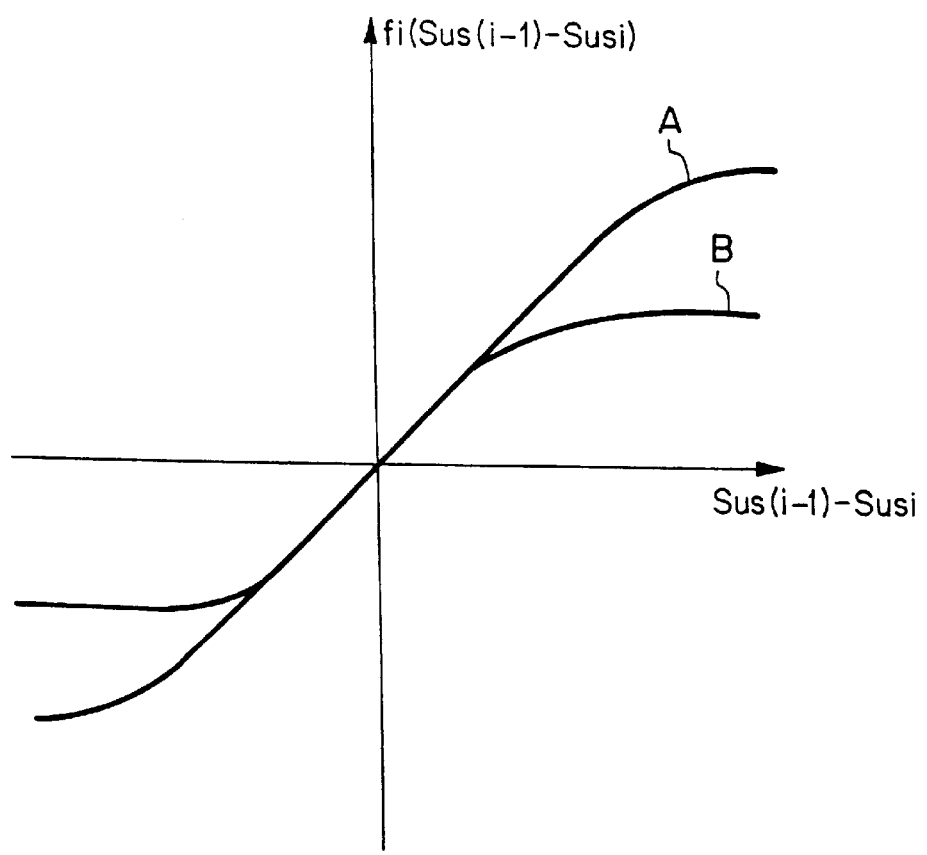

F I G. 33
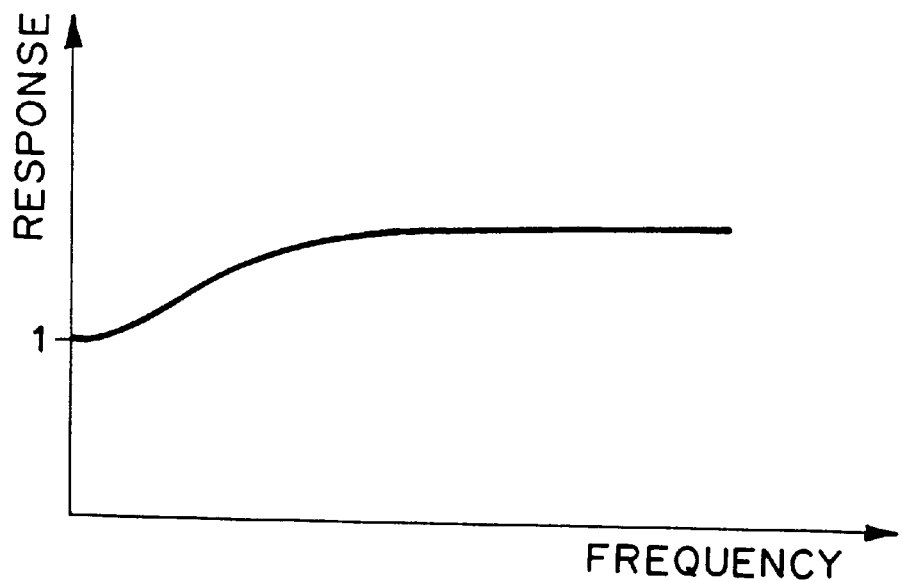
F I G. 34
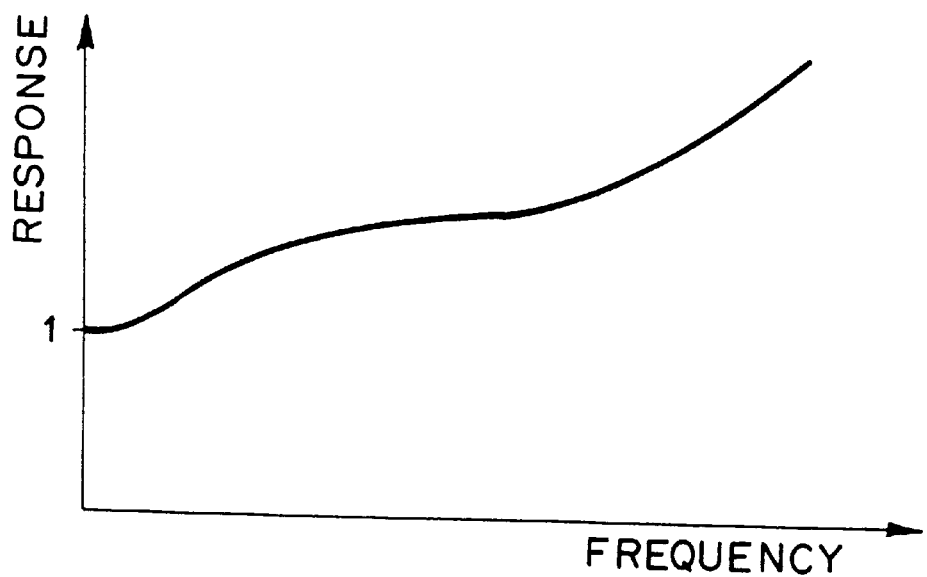

F I G. 36
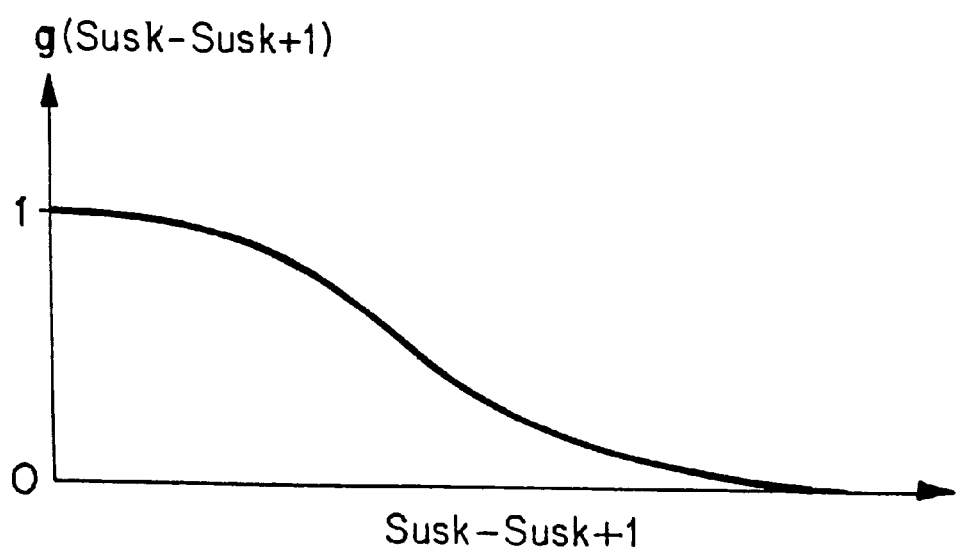

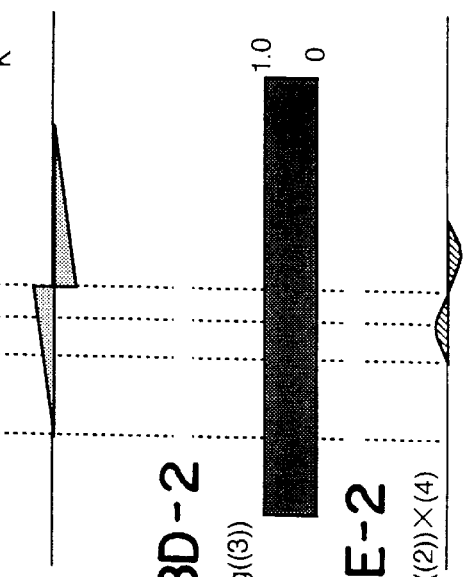
FIG.38A-1 EDGE OF HIGH CONTRAST
FIG.38A-2 EDGE OF LOW CONTRAST
FIG.38B-1 Sus1-Sus2
FIG.38B-2 Sus1-Sus2
FIG.38C-1 Sorg-Sus3
FIG.38C-2 Sorg-Sus3
FIG.38D-1 g((3))
FIG.38D-2 g((3))
FIG.38E-1 f((2))×(4)
FIG.38E-2 f((2))×(4)

FIG. 42A
Sorg
FIG. 42B
Sus1-Sus2
FIG. 42C
Sus2-Sus3
FIG. 42D
g((3))
FIG. 42E
(2)+(4)
FIG. 42F
f((2)+(4))
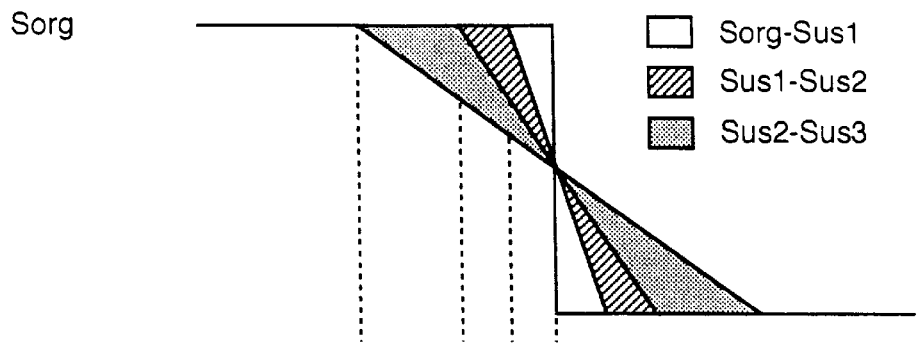
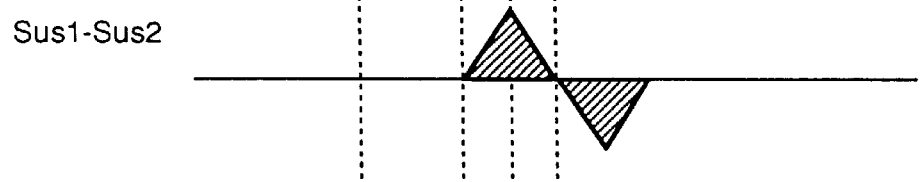
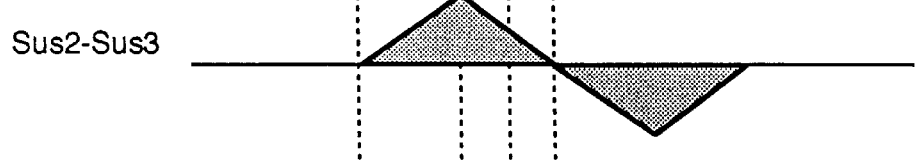
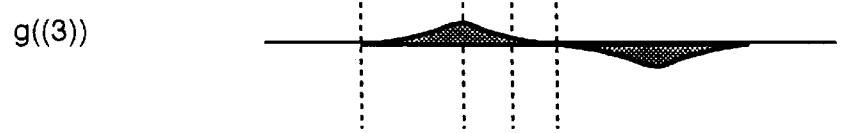
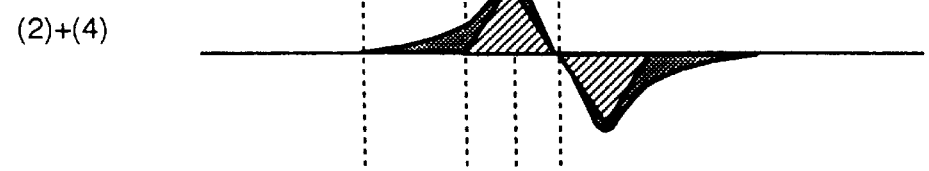
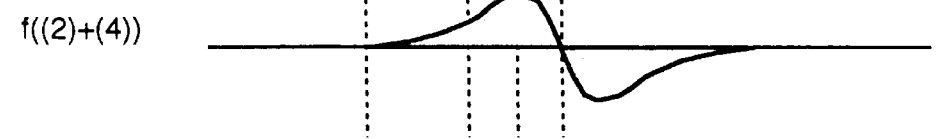

MULTI-RESOLUTION TRANSFORMING, IMAGE PROCESSING AND DYNAMIC RANGE COMPRESSING METHOD AND APPARATUS

BACKGROUND OF THE INVENTION

1. Field of the Invention

This invention relates to processing for forming a plurality of unsharp image signals, which have different frequency characteristics, from an image signal. This invention also relates to frequency emphasis processing for emphasizing high frequency components of the image signal by utilizing the unsharp image signals. This invention further relates to a dynamic range compressing process for rendering the level of contrast of the original image low by utilizing the unsharp image signals.

2. Description of the Prior Art

Techniques for obtaining an image signal, which represents an image, carrying out appropriate image processing on the image signal, and thereafter reproducing a visible image from the processed image signal have heretofore been carried out in various fields. For example, in methods for carrying out such techniques, an image is transformed into multi-resolution images by a Fourier transform, a wavelet transform, a sub-band transform, or the like, and the image signal representing the image is thereby decomposed into signals falling within a plurality of different frequency bands. Thereafter, of the decomposed signals, a signal falling within a desired frequency band is subjected to predetermined image processing.

As one of such methods, a method has been proposed, wherein an original image is transformed into multi-resolution images by utilizing an unsharp mask filter as in the technique using the wavelet transform, and image processing is then carried out on an unsharp image signal representing the unsharp image of each solution. The proposed method is utilized in image processing of radiation images, and the like.

Also, in the field of radiation image processing, when a radiation image (i.e., a tomographic image) of a tomographic plane is recorded with a tomographic image recording operation described in, for example, U.S. Pat. No. 4,581,535, it often occurs that the amount of transmitted radiation changes sharply at a portion, which is located at a position other than the tomographic plane. In such cases, an image pattern of such a portion occurs as an interfering pattern (or an interfering shadow) in the direction, along which the recording medium moves, and at a center region which is to be used in the radiation image. (Such an interfering pattern will hereinafter be referred to as the "flow pattern.") An image processing method for eliminating the flow pattern is proposed in, for example, Japanese Unexamined Patent Publication No. 3(1991)-276265. With the proposed image processing method, low frequency components corresponding to the flow pattern are removed from the image signal, which represents the radiation image obtained from the tomographic image recording operation, and an image free of the flow pattern is thereby obtained from the resulting image signal. The unsharp image signal described above can also be utilized in the process for eliminating the flow pattern.

The applicant proposed the methods for carrying out frequency emphasis processing on an image signal by utilizing an unsharp image signal in order that a visible radiation image having good image quality can be reproduced and used as an effective tool in, particularly, the accurate and efficient diagnosis of an illness. The methods for carrying out the frequency emphasis processing are disclosed in, for example, U.S. Pat. Nos. 4,315,318 and 4,317,179. With the frequency emphasis processing, an unsharp mask image signal (hereinbelow often referred to as the unsharp image signal) Sus is subtracted from an original image signal Sorg, which has been detected from a radiation image. The obtained difference value is multiplied by an emphasis coefficient β. The resulting product is then added to the original image signal Sorg. In this manner, predetermined frequency components in the image can be emphasized. The frequency emphasis processing is represented by Formula (1) shown below.

$$Sproc = Sorg + \beta \times (Sorg - Sus) \quad (1)$$

wherein Sproc represents the signal obtained from the frequency emphasis processing, Sorg represents the original image signal, Sus represents the unsharp image signal, and β represents the emphasis coefficient.

The unsharp image signal Sus can be obtained by carrying out an operation with Formula (2)

$$Sus = \Sigma Sorg / (M \times N) \quad (2)$$

on the image signal components of the original image signal Sorg, which represent M×N picture elements surrounding a middle picture element. By way of example, each of picture elements located at every second row and every second column in the array of picture elements constituting the image is taken as the middle picture element.

The unsharp image signal Sus representing an unsharp image, which results from the unsharp mask processing and has a resolution lower than the resolution of the original image, can also be obtained by utilizing an unsharp mask filter, which has a predetermined size, and calculating the mean value or the weighted mean value of the values of the picture elements located within the unsharp mask filter.

The applicant also proposed a method for compressing a dynamic range of an image, wherein an unsharp image signal is utilized, and the level of contrast of the parts of the image having a high or low image density or the level of contrast of the whole image is rendered low such that the difference between the highest image density and the lowest image density in the original image may become small, i.e. such that the dynamic range of the original image may become narrow. The method for compressing a dynamic range of an image is disclosed in, for example, U.S. Pat. No. 5,454,044. The proposed method comprises the steps of calculating an unsharp image signal Sus from the original image signal representing the original image, and processing the original image signal with Formula (3)

$$Sproc = Sorg + f(Sus) \quad (3)$$

wherein f(Sus) represents a function, the value of which decreases monotonically as the value of the unsharp image signal Sus increases. In this manner, a processed image signal Sproc is obtained, which represents an image having a dynamic range narrower than the dynamic range of the original image. With the proposed method, both the dynamic range of parts of the image, which parts have low levels of image density, and the dynamic range of parts of the image, which have high levels of image density, can be compressed appropriately. Also, in cases where the differential coefficient of the function f(Sus) is set to be continuous, no artificial contour occurs in the image represented by the processed image signal Sproc. In this manner, the range of image density of the image can be compressed such that the parts of the image covering a wide range of image density can be used and may have good image quality in the reproduced visible image, and the image quality of fine image structures at each of parts having various levels of image density may be kept well.

In the image processing described above, in order for the original image to be transformed into the multi-resolution images by utilizing unsharp mask filters, it is necessary to use a plurality of filters having different sizes. In particular, in order for an unsharp image having a low resolution to be obtained, it is necessary to use a filter having a large size. However, if the size of the filter becomes large, the amount of operations for carrying out the filtering process will become very large, and a long time will be required to carry out the operations for conducting the unsharp mask processing. Also, it will become necessary to use a storage means having a large capacity for storing the information, which represents the plurality of the filters for obtaining the plurality of unsharp images having different levels of resolution. Therefore, the apparatus for carrying out the processing cannot be kept small, and the cost of the apparatus cannot be kept low.

Further, in cases where the unsharp image signal is formed with the unsharp mask filter, in the region in the vicinity of an edge in the image, at which the image density changes sharply, the unsharp image signal is affected by the image density of the edge in the image. Therefore, if the frequency emphasis processing, the dynamic range compressing process, or the flow pattern eliminating process described above is carried out by using the unsharp image signal, the problems will occur in that an artifact, such as overshoot, undershoot, or an artificial contour, occurs, and the image quality of the image obtained from the processing cannot be kept well.

SUMMARY OF THE INVENTION

The primary object of the present invention is to provide a multi-resolution transforming method, in which the amount of operations for obtaining multi-resolution unsharp images is kept small and which is capable of being carried out with an apparatus having a small size.

Another object of the present invention is to provide an apparatus for carrying out the multi-resolution transforming method.

A further object of the present invention is to provide an image processing method, wherein frequency emphasis processing is carried out on an original image signal by utilizing a plurality of unsharp image signals such that no artifact may occur in a region in the vicinity of an edge in the image, and such that a processed image having good image quality may be obtained.

A still further object of the present invention is to provide an apparatus for carrying out the image processing method.

Another object of the present invention is to provide a dynamic range compressing method, wherein a dynamic range compressing process is carried out on an original image signal by utilizing a plurality of unsharp image signals such that no artifact may occur in a region in the vicinity of an edge in the image.

A further object of the present invention is to provide an apparatus for carrying out the dynamic range compressing method.

The present invention provides a multi-resolution transforming method, wherein an original image constituted of a lattice-like array of picture elements, which are located at predetermined intervals along the rows and columns of the lattice-like array, is transformed into a multi-resolution space, the method comprising the steps of:

i) carrying out a filtering process on the original image, the filtering process being carried out by using a filter having a predetermined size and with respect to each of picture elements selected at predetermined intervals, a first filtering-processed image being thereby obtained, ii) carrying out said filtering process on said first filtering-processed image, a second filtering-processed image being thereby obtained, iii) successively carrying out said filtering process on the respective filtering-processed images, which are thus obtained successively, the original image being thereby transformed into a plurality of images having different levels of resolution, and iv) carrying out an interpolating operation process on each of the plurality of said images having different levels of resolution, whereby multi-resolution transformed images, each of which is constituted of the same number of picture elements as that of the picture elements constituting the original image, are obtained.

The present invention also provides a multi-resolution transforming apparatus, wherein an original image constituted of a lattice-like array of picture elements, which are located at predetermined intervals along the rows and columns of the lattice-like array, is transformed into a multi-resolution space, the apparatus comprising:

i) a filtering means for transforming the original image into a plurality of images having different levels of resolution by:

carrying out a filtering process on the original image, the filtering process being carried out by using a filter having a predetermined size and with respect to each of picture elements selected at predetermined intervals, a first filtering-processed image being thereby obtained, carrying out said filtering process on said first filtering-processed image, a second filtering-processed image being thereby obtained, and successively carrying out said filtering process on the respective filtering-processed images, which are thus obtained successively, and ii) an interpolating operation means for carrying out an interpolating operation process on each of the plurality of said images having different levels of resolution, and thereby obtaining multi-resolution transformed images, each of which is constituted of the same number of picture elements as that of the picture elements constituting the original image.

With the multi-resolution transforming method and apparatus in accordance with the present invention, the filtering process is carried out by using the filter having a predetermined size and with respect to each of the picture elements of the image, which are selected at predetermined intervals, and the first filtering-processed image is thereby obtained. The filtering process is then carried out on the first filtering-processed image, and the second filtering-processed image is thereby obtained. In this manner, the filtering process is successively carried out on the respective filtering-processed images, which are obtained successively. Therefore, from the filtering process carried out successively, the plurality of the image are obtained, in which the high frequency components have been removed in steps from the original image. Also, the filtering process is carried out with respect to each of the picture elements of the image, which are selected at predetermined intervals, and therefore the sizes of the filtering-processed images become small in steps from the size of the original image. The interpolating operation process is then carried out on each of the filtering-processed images, and the size of each of the filtering-processed images is thereby enlarged. In this manner, the multi-resolution transformed images, each of which is constituted of the same number of picture elements as that of the picture elements constituting the original image, i.e., each of which has the same size as that of the original image, can be obtained.

Specifically, the multi-resolution images are obtained by successively carrying out the filtering process by using the filter having the predetermined size. Therefore, it becomes unnecessary to use a plurality of filters. Accordingly, it becomes unnecessary to provide a memory for storing the information representing the plurality of filters, and the multi-resolution transforming apparatus can be kept small in size. Also, even if the size of the filter is not set to be large, the images of low resolution can be obtained in steps. Therefore, the problems can be prevented from occurring in that the amount of operations becomes large due to an increase in the size of the filter. As a result, the multi-resolution unsharp images can be obtained quickly.

The present invention further provides an image processing method, wherein a signal containing high frequency components of an original image is added to an original image signal, which represents the original image, and the high frequency components of the original image are thereby emphasized, the method comprising the steps of:

i) forming a plurality of unsharp mask image signals, which have different frequency response characteristics, from the original image signal, ii) forming a plurality of band-limited image signals, each of which represents one of signals falling within a plurality of different frequency bands of the original image signal, from the original image signal and the plurality of said unsharp mask image signals, or from the plurality of said unsharp mask image signals, iii) carrying out a converting process on at least a single band-limited image signal, which is among the plurality of said band-limited image signals, such that at least a portion of the band-limited image signal may become small, a plurality of converted image signals being thereby formed, and iv) integrating the plurality of said converted image signals, whereby the signal containing the high frequency components of the original image, which signal is to be added to the original image signal, is obtained.

The present invention still further provides an image processing apparatus, wherein a signal concerning high frequency components of an original image is added to an original image signal, which represents the original image, and the high frequency components of the original image are thereby emphasized, the apparatus comprising:

i) an unsharp mask image signal forming means for forming a plurality of unsharp mask image signals, which have different frequency response characteristics, from the original image signal, ii) a band-limited image signal forming means for forming a plurality of band-limited image signals, each of which represents one of signals falling within a plurality of different frequency bands of the original image signal, from the original image signal and the plurality of said unsharp mask image signals, or from the plurality of said unsharp mask image signals, iii) a conversion means for carrying out a converting process on at least a single band-limited image signal, which is among the plurality of said band-limited image signals, such that at least a portion of the band-limited image signal may become small, and thereby forming a plurality of converted image signals, and iv) a frequency emphasis processing means for integrating the plurality of said converted image signals, and thereby obtaining the signal concerning the high frequency components of the original image, which signal is to be added to the original image signal.

With the image processing method and apparatus in accordance with the present invention, the converting process is carried out on at least a single band-limited image signal, which is among the plurality of the band-limited image signals, such that at least a portion of the band-limited image signal may become small. The plurality of the converted image signals are thereby formed. The converted image signals are then integrated, and the signal containing the high frequency components of the original image, which signal is to be added to the original image signal, is thereby obtained. Therefore, a band-limited image signal having a signal value, the absolute value of which is comparatively large, can be converted into a signal, which has small influence upon the signal containing the high frequency components to be added to the original image signal, and which has substantially the same characteristics as a signal obtained with an unsharp mask having a small size. Accordingly, in the region in the vicinity of an edge in the image, at which the image density changes sharply, the influence of a signal, which causes an artifact to occur, can be weakened. As a result, an image having no artifact and having good image quality can be obtained from the processing.

The present invention also provides a dynamic range compressing method, wherein a signal containing low frequency components of an original image is added to an original image signal, which represents the original image, and the dynamic range of the original image is thereby compressed, the method comprising the steps of:

i) forming a plurality of unsharp mask image signals, which have different frequency response characteristics, from the original image signal, ii) forming a plurality of band-limited image signals, each of which represents one of signals falling within a plurality of different frequency bands of the original image signal, from the original image signal and the plurality of said unsharp mask image signals, or from the plurality of said unsharp mask image signals, iii) carrying out a converting process on at least a single band-limited image signal, which is among the plurality of said band-limited image signals, such that at least a portion of the band-limited image signal may become small, a plurality of converted image signals being thereby formed, iv) integrating the plurality of said converted image signals, an integration signal being thereby obtained, v) subtracting said integration signal from the original image signal, a difference signal being thereby obtained, and vi) converting said difference signal, whereby the signal containing the low frequency components of the original image, which signal is to be added to the original image signal, is obtained.

The present invention further provides a dynamic range compressing apparatus, wherein a signal containing low frequency components of an original image is added to an original image signal, which represents the original image, and the dynamic range of the original image is thereby compressed, the apparatus comprising:

i) an unsharp mask image signal forming means for forming a plurality of unsharp mask image signals, which have different frequency response characteristics, from the original image signal, ii) a band-limited image signal forming means for forming a plurality of band-limited image signals, each of which represents one of signals falling within a plurality of different frequency bands of the original image signal, from the original image signal and the plurality of said unsharp mask image signals, or from the plurality of said unsharp mask image signals, iii) a conversion means for carrying out a converting process on at least a single band-limited image signal, which is among the plurality of said band-limited image signals, such that at least a portion of the band-limited image signal may become small, and thereby forming a plurality of converted image signals, iv) an integration means for integrating the plurality of said converted image signals, and thereby obtaining an integration signal, v) a subtraction means for subtracting said integration signal from the original image signal, and thereby obtaining a difference signal, and vi) a compressing process means for converting said difference signal, and thereby obtaining the signal containing the low frequency components of the original image, which signal is to be added to the original image signal.

With the dynamic range compressing method and apparatus in accordance with the present invention, the converting process is carried out on at least a single band-limited image signal, which is among the plurality of the band-limited image signals, such that at least a portion of the band-limited image signal may become small. The plurality of the converted image signals are thereby formed. The absolute values of the converted image signals are then integrated, and the integration signal is thereby obtained. The integration signal is then subtracted from the original image signal. In this manner, the signal containing the low frequency components of the original image, which signal is to be added to the original image signal, is obtained. Therefore, a band-limited image signal having a signal value, the absolute value of which is comparatively large, can be converted into a signal, which has small influence upon the signal containing the low frequency components to be added to the original image signal, and which has substantially the same characteristics as a signal obtained with an unsharp mask having a small size. Accordingly, in the region in the vicinity of an edge in the image, at which the image density changes sharply, the influence of a signal, which causes an artifact to occur, can be weakened. As a result, an image having no artifact and having good image quality can be obtained from the dynamic range compressing process.

BRIEF DESCRIPTION OF THE DRAWINGS

FIG. 1 is a block diagram showing the concept behind the multi-resolution transforming apparatus in accordance with the present invention, FIG. 12 is a block diagram showing the concept behind the image processing apparatus in accordance with the present invention, FIG. 19 is a graph showing different examples of frequency characteristics of band-limited image signals, FIG. 20 is a graph showing examples of functions used in a converting process carried out on band-limited image signals in accordance with the portions of an object, the images of which were recorded, FIGS. 28A-2, 28B-2, and 28C-2 are graphs showing frequency characteristics with respect to the entire frequency band, which correspond respectively to FIGS. 28A-1, 28B-1, and 28C-1, FIGS. 29A, 29B, 29C, and 29D are explanatory views showing the problems encountered when all of band-limited image signals are converted with a single kind of function, FIG. 33 is a graph showing the response of an image signal, which is obtained when the functions shown in FIG. 31 are used for the conversion, FIG. 34 is a graph showing the response of an image signal, which is obtained when the functions shown in FIG. 32 are used for the conversion, FIG. 36 is a graph showing an example of a function, which is used in a magnification ratio signal forming means, FIGS. 42A, 42B, 42C, 42D, 42E, and 42F are explanatory views showing the effects of the embodiment shown in FIG. 39.

DESCRIPTION OF THE PREFERRED EMBODIMENTS

The present invention will hereinbelow be described in further detail with reference to the accompanying drawings.

Figures 1, 28A:
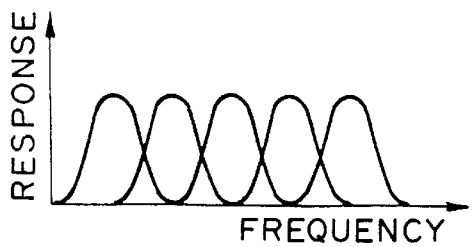
Figures 2, 28A:
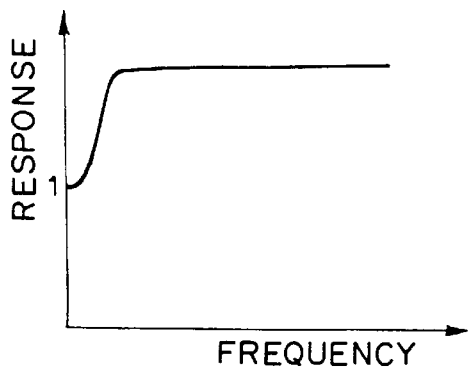

FIG. 1 is a block diagram showing the concept behind the multi-resolution transforming apparatus in accordance with the present invention. As illustrated in FIG. 1, the multi-resolution transforming apparatus comprises a filtering process means 10 and an interpolating process means 11. The filtering process means 10 carries a filtering process on a received original image signal Sorg. The filtering process is carried out by using a filter having a predetermined size and with respect to each of picture elements selected at predetermined intervals, a first filtering-processed image being thereby obtained. Thereafter, the filtering process means 10 carries out the filtering process with the filter, which has the predetermined size, on the first filtering-processed image, a second filtering-processed image being thereby obtained. In this manner, the filtering process means 10 successively carries out the filtering process on the respective filtering-processed images, which are thus obtained successively. The interpolating process means 11 carries out an interpolating operation process on the plurality of the filtering-processed images and thereby obtains multi-resolution unsharp image signals, each of which is constituted of the same number of picture elements as that of the picture elements constituting the original image, i.e. each of which has the same size as the size of the original image.

Figure 2:
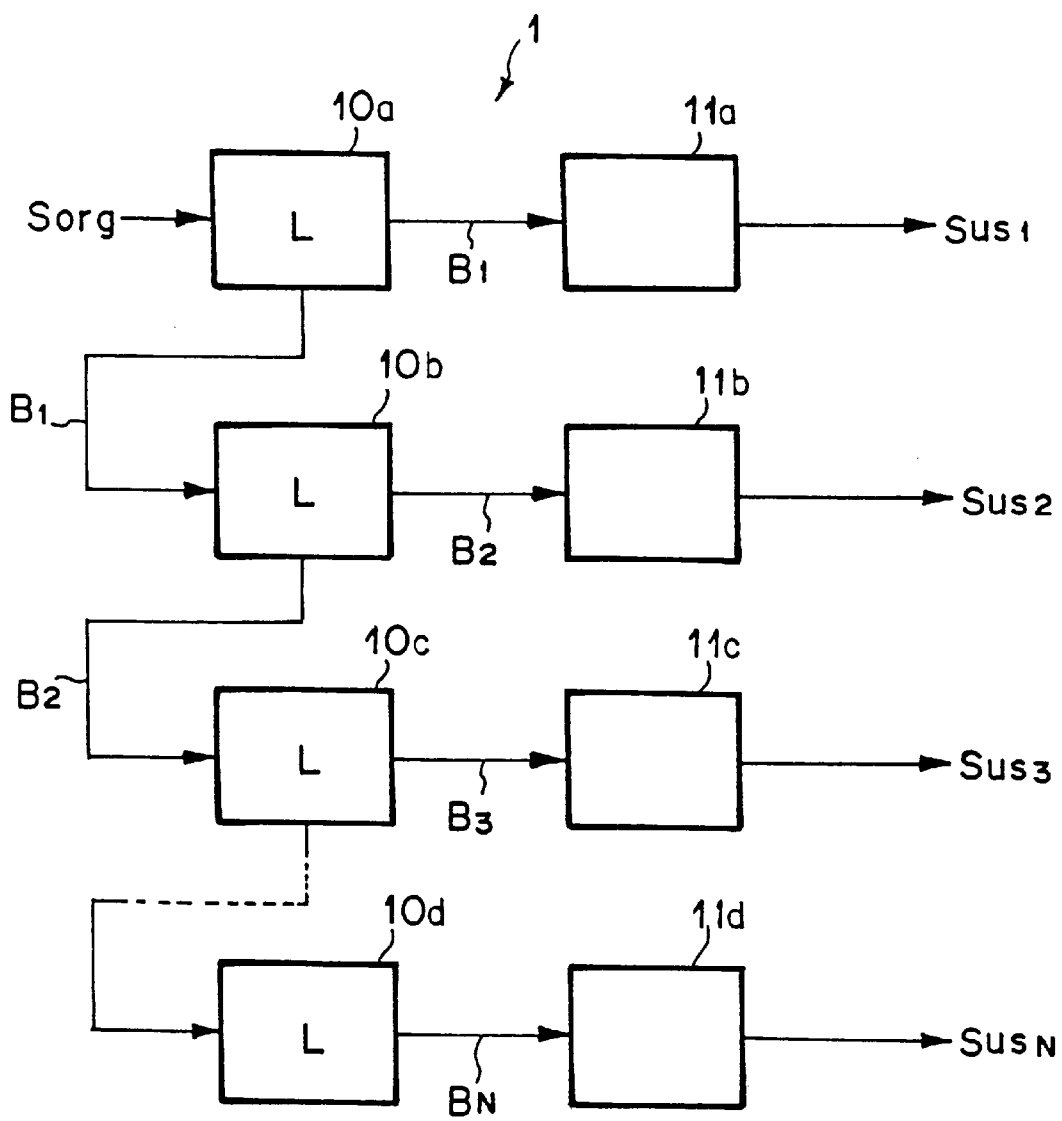
FIG. 2 is a block diagram showing how a plurality of unsharp image signals are formed.

FIG. 2 is a block diagram showing how the plurality of the unsharp image signals are formed in the multi-resolution transforming apparatus shown in FIG. 1. As illustrated in FIG. 2, the digital original image signal Sorg representing the original image is subjected to the filtering process, which is carried out with a low pass filter L in the filtering process means 10a–10d. As the low pass filter L, by way of example, a 5×1 grid-like filter F shown in FIG. 3 may be used. The filter F approximately corresponds to a one-dimensional Gaussian distribution. The filter F may be represented by Formula $$f(t) = e^{-\frac{t^2}{2\sigma^2}} \quad (4)$$

wherein σ=1. The Gaussian signal has good locality characteristics both in the frequency space and in the spatial domain and is therefore utilized as the filter F.

The filtering process is carried out with the filter F along x and y directions in the array of picture elements of the original image. In this manner, the filtering process is carried out with respect to the entire original image signal Sorg.

Figures 3, 4:
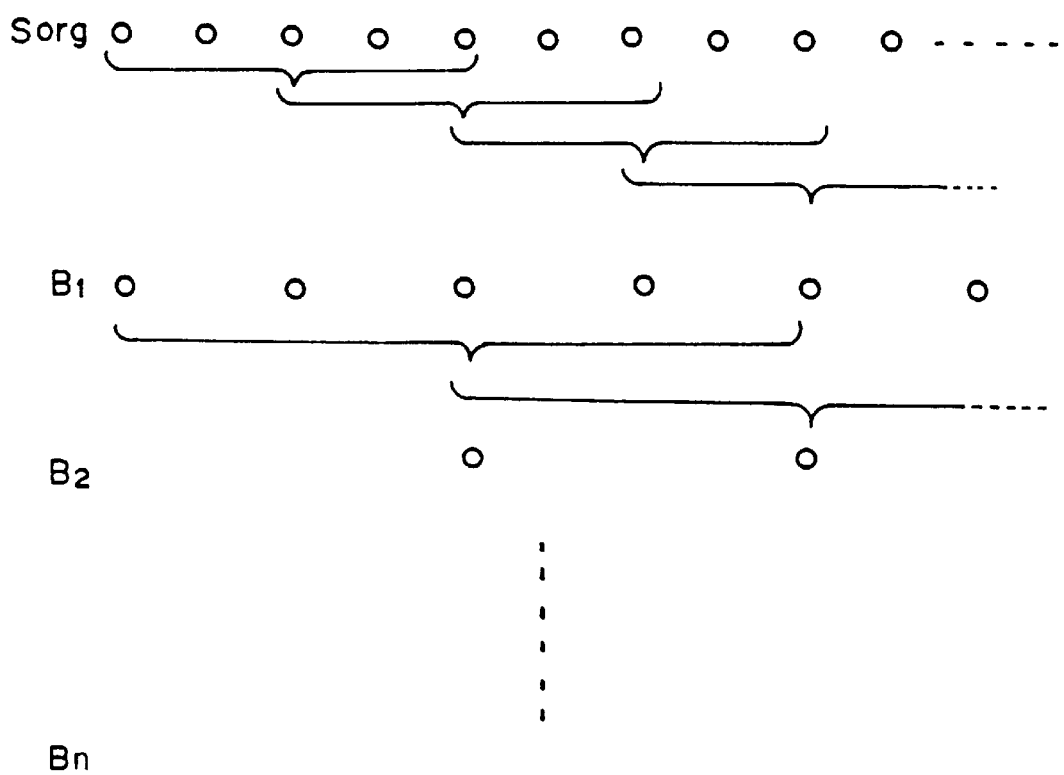
FIG. 3 is an explanatory view showing a (one-dimensional) filter, which is used in the process for forming the unsharp image signals.
FIG. 4 is an explanatory view showing how a filtering process is carried out.
Figures 5, 6, 7:
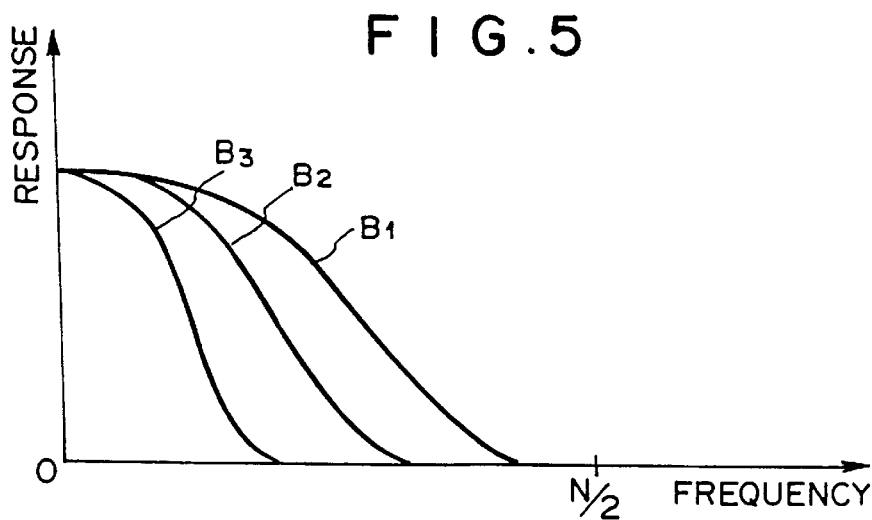
FIG. 5 is a graph showing frequency characteristics of filtering-processed image signals.
FIG. 6 is an explanatory view showing a (two-dimensional) filter, which may be used in a filtering process means.
FIG. 7 is an explanatory view showing a filter, which is used in an interpolating operation carried out on a filtering-processed image signal B1.

In the filtering process means 10, the filtering process with the filter F is carried out in the manner described below. FIG. 4 is an explanatory view showing how the filtering process is carried out. As illustrated in FIG. 4, the filtering process is carried out by using the filter F shown in FIG. 3 and with respect to the image signal components of the original image signal Sorg, which represent the picture elements located at every second row and every second column in the array of picture elements of the original image. From the filtering process, a filtering-processed image signal B1 is obtained. The filtering-processed image signal B1 represents a filtering-processed image, which has a size ¼ times (½ times in each of the x direction and the y direction) as large as the size of the original image. Thereafter, the filtering process is carried out on the filtering-processed image signal B1 by using the filter F. The filtering process is carried out with respect to the image signal components of the filtering-processed image signal B1, which represent the picture elements located at every second row and every second column in the array of picture elements of the filtering-processed image. The filtering process with the filter F is thus carried out successively, and n number of filtering-processed image signals Bk, where k=1 to n, are thereby obtained. Each of the filtering-processed image signals Bk represents the filtering-processed image, which has a size $½^{2k}$ times as large as the size of the original image. Also, the filtering-processed image signals Bk have the frequency characteristics shown in FIG. 5. As illustrated in FIG. 5, the filtering-processed image signals Bk have the response characteristics such that the high frequency components may have been eliminated successively as the value of k becomes large. In FIG. 5, the response characteristics of only the three filtering-processed image signals Bk, where k=1, 2, and 3, are shown.

In the embodiment described above, the filtering process is carried out by using the one-dimensional filter F shown in FIG. 3 and along the x direction and the y direction of the original image. Alternatively, as illustrated in FIG. 6, the filtering process may be carried out on the original image signal Sorg and each of the filtering-processed image signals Bk by using a 5×5 two-dimensional filter.

Thereafter, in the interpolating process means 11a–11d shown in FIG. 2, the interpolating operation process is carried out on each of the filtering-processed image signals Bk. From the interpolating operation process, multi-resolution unsharp images having the same size as the size of the original image are obtained. How the interpolating operation process is carried out will be described hereinbelow.

As the interpolating operation technique, one of various techniques, such as a B spline technique, may be employed. In this embodiment, the filter F in accordance with the Gaussian signal is used as the low pass filter, and therefore a Gaussian signal is utilized as the interpolation coefficient for carrying out the interpolating operation. The interpolation coefficient utilizing the Gaussian signal is represented by Formula (5)

$$I(t) = 2 \cdot \sigma \cdot e^{-\frac{t^2}{2\sigma^2}} \quad (5)$$

wherein $\sigma = 2^{k-1}$.

Figure 8:
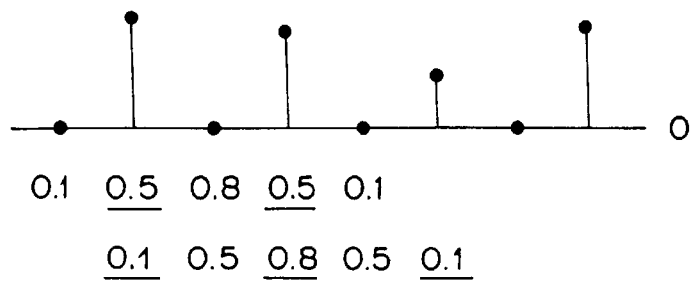
FIG. 8 is an explanatory view showing how an interpolating operation is carried out.

In the interpolating operation for the filtering-processed image signal B1, k=1 and therefore σ=1. In cases where σ=1 in Formula (5) shown above, the filter for carrying out the interpolating operation becomes identical with a 5×1 one-dimensional filter F1 shown in FIG. 7. Firstly, a single picture element having a value of 0 is inserted between two adjacent picture elements in the filtering-processed image represented by the filtering-processed image signal B1. In this manner, the size of the filtering-processed image represented by the filtering-processed image signal B1 is enlarged to the same size as the size of the original image. FIG. 8 illustrates the filtering-processed image signal B1, which has been obtained from the insertion of the picture elements having a value of 0, as a one-dimensional pattern. Thereafter, a filtering process is carried out on the filtering-processed image signal B1, which has been obtained from the insertion of the picture elements having a value of 0, by using the filter F1 shown in FIG. 7.

The filter F1 shown in FIG. 7 is the 5×1 filter. As illustrated in FIG. 8, in the filtering-processed image represented by the filtering-processed image signal B1 obtained from the inserting operation, a single picture element having a value of 0 has been inserted between two adjacent picture elements. Therefore, the filtering process, which is carried out on the filtering-processed image signal B1 by using the filter F1, becomes substantially equivalent to the filtering process, which is carried out with two kinds of filters, i.e. a 2×1 filter (0.5, 0.5) and a 3×1 filter (0.1, 0.8, 0.1). From the filtering process, an unsharp image signal Sus1 is obtained, which is constituted of the same number of image signal components as that in the original image signal Sorg, i.e. which represents an unsharp image having the same size as that of the original image.

Thereafter, a filtering process is carried out on the filtering-processed image signal B2. In the interpolating operation for the filtering-processed image signal B2, k=2 and therefore σ=2. In cases where σ=2 in Formula (5) shown above, the filter for carrying out the interpolating operation becomes identical with a 11×1 one-dimensional filter F2 shown in FIG. 9. Firstly, as illustrated in FIG. 10, three picture elements having a value of 0 are inserted between two adjacent picture elements in the filtering-processed image represented by the filtering-processed image signal B2. In this manner, the size of the filtering-processed image represented by the filtering-processed image signal B2 is enlarged to the same size as the size of the original image. Thereafter, a filtering process is carried out on the filtering-processed image signal B2, which has been obtained from the insertion of the picture elements having a value of 0, by using the filter F2 shown in FIG. 9.

Figure 9:
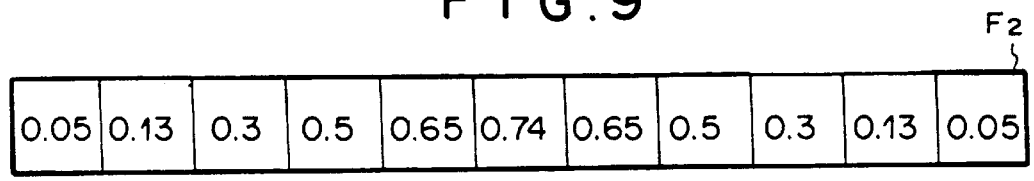
FIG. 9 is an explanatory view showing a filter, which is used in an interpolating operation carried out on a filtering-processed image signal B2.
Figure 10:
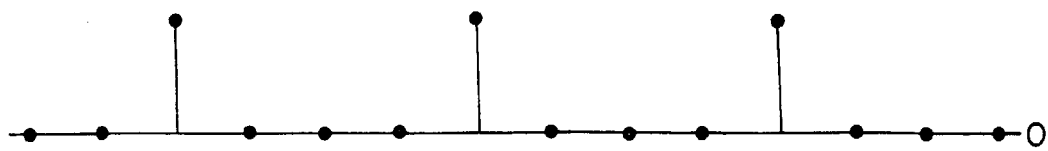
FIG. 10 is an explanatory view showing how an interpolating operation is carried out.

The filter F2 shown in FIG. 9 is the 11×1 filter. As illustrated in FIG. 10, in the filtering-processed image represented by the filtering-processed image signal B2 obtained from the inserting operation, three picture elements having a value of 0 have been inserted between two adjacent picture elements. Therefore, the filtering process, which is carried out on the filtering-processed image signal B2 by using the filter F2, becomes substantially equivalent to the filtering process, which is carried out with four kinds of filters, i.e. a 2×1 filter (0.5, 0.5) and 3×1 filters (0.3, 0.65, 0.05), (0.13, 0.74, 0.13), and (0.05, 0.65, 0.3). From the filtering process, an unsharp image signal Sus2 is obtained, which is constituted of the same number of image signal components as that in the original image signal Sorg.

The filtering process described above is carried out on all of the filtering-processed image signals Bk. In the interpolating operation for the filtering-processed image signals Bk, a filter having a length of $3 \times 2^k - 1$ is prepared in accordance with Formula (5). Also, $2^k - 1$ number of picture elements having a value of 0 are inserted between two adjacent picture elements of each filtering-processed image signal Bk, and the size of the filtering-processed image represented by the filtering-processed image signal Bk is thereby enlarged to the same size as that of the original image. Thereafter, the filtering process is carried out on the filtering-processed image signal Bk, which has been obtained from the insertion of the picture elements having a value of 0, by using the filter having a length of $3\times2^k-1$.

The filtering process carried out with the filter having a length of $3\times2^k-1$ becomes equivalent to the filtering process, which is carried out by using a filter having a length of 2 or 3 with a period of $2^k$. From the filtering process, n number of unsharp image signals Susk are obtained. When visible images are reproduced from the unsharp image signals Susk, multi-resolution unsharp images are obtained, which have different levels of resolution, i.e. which have different frequency response characteristics. As described above, even though the length of the filter becomes long, the filtering process becomes substantially equivalent to the filtering process carried out with a filter having a length of 2 or 3. Therefore, even though the length of the filter becomes long, the amount of operations does not become very large. Accordingly, the amount of operations can be kept small, and the multi-resolution unsharp image signals Susk can be obtained quickly.

In this embodiment, the filtering process is carried out along the x direction and the y direction of the image by using the one-dimensional filter having a length of $3\times2^k-1$. Alternatively, a two-dimensional filter may be prepared previously, the filtering process of each of the filtering-processed images may be carried out by using the two-dimensional filter, and the unsharp image signals Susk may thereby be obtained. In such cases, as the filter used in the filtering process for carrying out the interpolating operation on the filtering-processed image, a $(3\times2^k-1)\times(3\times2^k-1)$ filter is used. As in cases where the one-dimensional filter described above is used, the filtering process with the two-dimensional filter becomes equivalent to the filtering process, which is carried out by using a $2\times2$ or $3\times3$ filter with a period of $2^k$. Therefore, as in cases where the one-dimensional filter described above is used, even though the size of the filter becomes large, the amount of operations for carrying out the filtering process does not become very large.

As described above, with the multi-resolution transforming method and apparatus in accordance with the present invention, even if the size of the filter used for the filtering process is not set to be large, the low-resolution images can be obtained in steps. Therefore, the problems can be prevented from occurring in that the amount of operations becomes large due to an increase in the size of the filter. As a result, the unsharp image signals can be obtained quickly. Also, the filtering process is carried out by repeatedly using the same filter. Therefore, it becomes unnecessary to use a plurality of filters having different sizes. Accordingly, it becomes unnecessary to provide a memory having a large capacity for storing the information representing the plurality of filters, and the multi-resolution transforming apparatus can be kept small in size.

Figure 11:
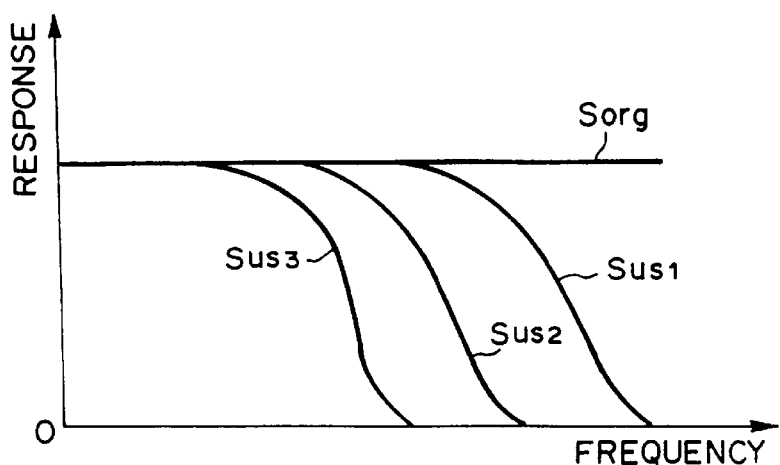
FIG. 11 is a graph showing frequency characteristics of unsharp image signals.

The unsharp image signals Susk having been obtained in the manner described above have the frequency characteristics shown in FIG. 11. As illustrated in FIG. 11, the unsharp image signals Susk have the frequency characteristics such that the high frequency components of the original image signal Sorg may have been eliminated successively as the value of k becomes large.

Embodiments of the image processing method and apparatus in accordance with the present invention, wherein processing for emphasizing predetermined frequency components of the original image signal is carried out by utilizing the unsharp image signals, will be described hereinbelow.

FIG. 12 is a block diagram showing an embodiment of the image processing apparatus in accordance with the present invention, wherein the multi-resolution transforming apparatus shown in FIG. 1 is provided as an unsharp image signal forming means. As illustrated in FIG. 12, the image processing apparatus comprises an unsharp image signal forming means 1 for forming multi-resolution unsharp image signal Susk, where k=1 to n, which have different frequency response characteristics, from a received original image signal Sorg. The image processing apparatus also comprises a band-limited image signal forming means 2 for forming a plurality of band-limited image signals from the unsharp image signals Susk, which have been formed by the unsharp image signal forming means 1. The image processing apparatus further comprises a conversion means 3 for carrying out a converting process on at least a single band-limited image signal, which is among the plurality of the band-limited image signals having been formed by the band-limited image signal forming means 2, such that at least a portion of the band-limited image signal may become small. The image processing apparatus still further comprises an integration means 4 for integrating the converted band-limited image signals, which have been obtained from the conversion means 3, and thereby forming an integration signal. The image processing apparatus also comprises a frequency emphasis processing means 5 for multiplying the integration signal by a predetermined emphasis coefficient, adding the resulting product to the original image signal Sorg, and thereby obtaining a processed image signal Sproc, in which the high frequency components of the original image have been emphasized.

Figure 13:
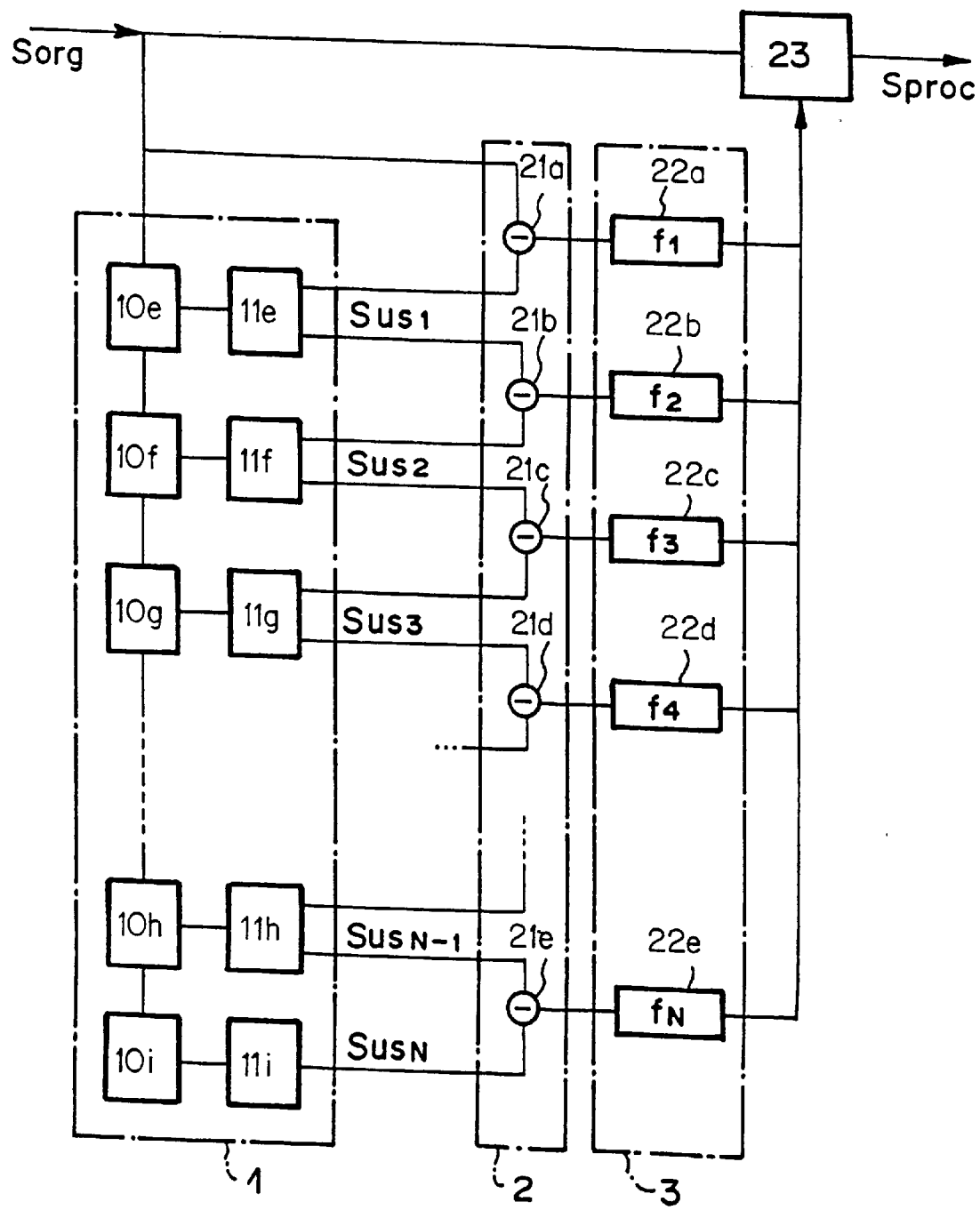
FIG. 13 is a block diagram showing an embodiment of the image processing apparatus in accordance with the present invention.
Figure 14:
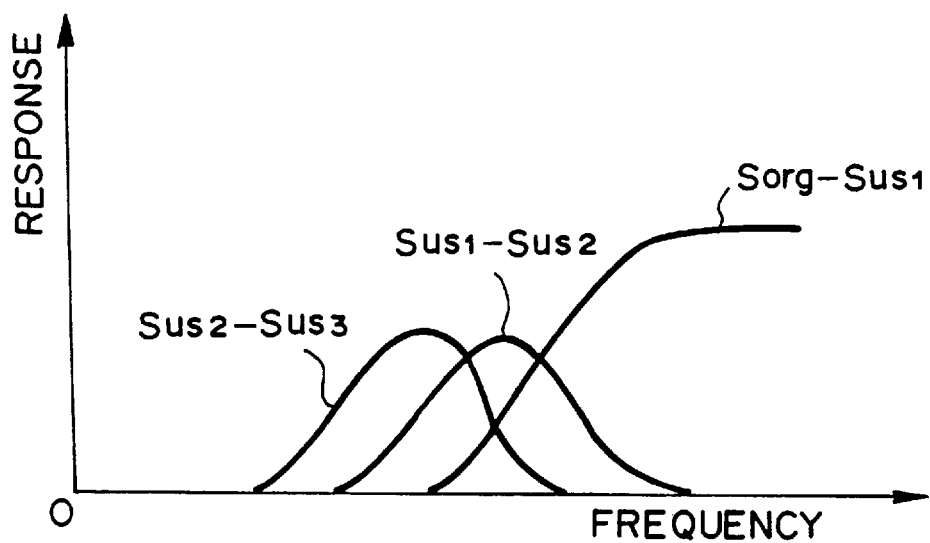
FIG. 14 is a graph showing examples of frequency characteristics of band-limited image signals.

FIG. 13 is a block diagram showing the entire constitution of the embodiment of the image processing apparatus. As illustrated in FIG. 13, the plurality of the unsharp image signals Susk, which have been formed by the unsharp image signal forming means 1, are then processed in the band-limited image signal forming means 2 and the conversion means 3. Firstly, the band-limited image signals are formed from the original image signal Sorg and the plurality of the unsharp image signals Susk, which have been formed by the unsharp image signal forming means 1. Each of the band-limited image signals is obtained from a subtracter $21a$–$21e$, which subtracts the unsharp image signals Susk of two adjacent frequency bands (as for the original image signal Sorg, Sorg and Sus1) from each other. Specifically, the values of Sorg–Sus1, Sus1–Sus2, . . . , SusN–1–SusN are calculated successively, and the plurality of the band-limited image signals are thereby obtained. FIG. 14 shows the frequency characteristics of the band-limited image signals. As illustrated in FIG. 14, the band-limited image signals have the frequency characteristics such that they may represent the bands of low frequency components of the original image signal Sorg as the value of k of the unsharp image signal Susk becomes large.

Thereafter, in the conversion means 3, each of the band-limited image signals is converted in accordance with the level of the band-limited image signal. The conversion of each band-limited image signal is carried out by a converter $22a$–$22e$ by utilizing, for example, a function f shown in FIG. 15. The function f has the characteristics such that the slope of the function may be equal to 1 with respect to the band-limited image signal having the absolute value, which is smaller than a threshold value Th1, and such that the inclination of the function may be smaller than 1 with respect to the band-limited image signal having the absolute value, which is larger than the threshold value Th1. The same function may be utilized for the respective band-limited image signals, or different functions may be utilized for the respective band-limited image signals.

The band-limited image signals, which have been converted with the function f, are fed into an operation device 23, which is provided with the integration means 4 and the frequency emphasis processing means 5 described above. In the operation device 23, the processing is carried out in the manner described below. Firstly, the band-limited image signals, which have been converted with the function f, are integrated, and the integration signal is thereby obtained. In the frequency emphasis processing means 5, the integration signal is multiplied by an emphasis coefficient β, which has a value in accordance with the value of the original image signal Sorg. The resulting product is then added to the original image signal Sorg, and the processed image signal Sproc is thereby obtained.

The aforesaid processing carried out by the band-limited image signal forming means 2, the conversion means 3, the integration means 4, and the frequency emphasis processing means 5 may be represented by Formula (6) shown below.

$$Sproc = Sorg + \beta(Sorg) \cdot Fusm(Sorg, Sus1, Sus2, \ldots, SusN)\ Fusm(Sorg, Sus1, Sus2, \ldots, SusN) = \{f1(Sorg - Sus1) + f2(Sus1 - Sus2) + \ldots + fk(Susk-1 - Susk) + \ldots + fN(SusN-1 - SusN)\} \quad (6)$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

Figure 16:
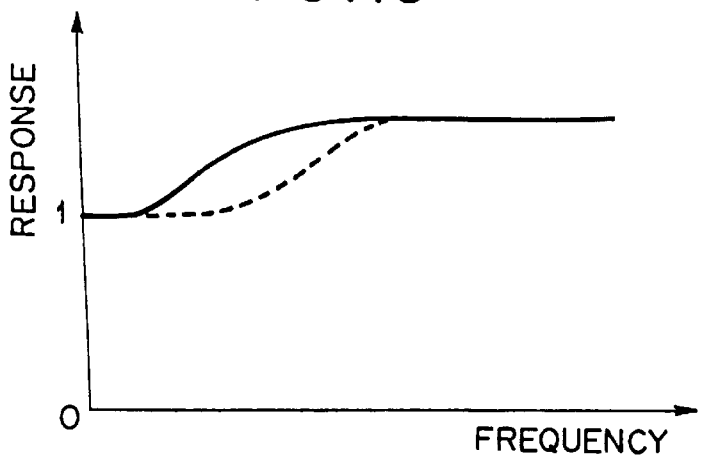
FIG. 16 is a graph showing an example of frequency characteristics of a processed image signal, which is obtained with the image processing apparatus in accordance with the present invention.
Figure 52:
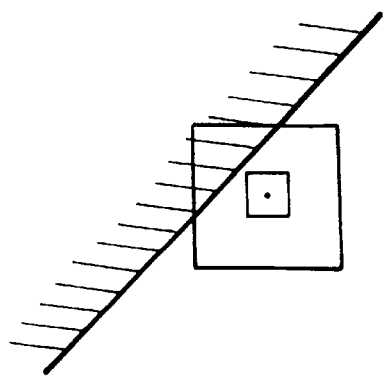
FIG. 52 is an explanatory view showing how an unsharp image signal is formed in a region in the vicinity of an edge in the image.

By way of example, the processed image signal Sproc, which has been obtained in the manner described above, has the frequency response characteristics shown in FIG. 16. Specifically, the band-limited image signals have the characteristics such that, in a flat region in which the change in the image density of the original image is comparatively small, the absolute value of the signal value of each band-limited image signal may be small in each frequency band. On the other hand, as illustrated in FIG. 52, in a region in the vicinity of an edge in the image, at which the image density changes sharply, in cases where the band-limited image signal is of a comparatively low frequency band, i.e. in cases where the size of the unsharp mask used for obtaining the unsharp image signal Susk is comparatively large, the edge in the image is contained in the unsharp mask, which is set for a picture element located in the vicinity of the edge. Therefore, in such cases, the band-limited image signal is affected by the edge, and the absolute value of the signal value of the band-limited image signal becomes comparatively large. In this manner, a portion, which does not constitute the edge in the image, is affected by the image density value of the edge, and an artifact, such as overshoot or undershoot, occurs at the edge portion in the image, which is obtained from the image processing.

Therefore, the band-limited image signal is converted with the aforesaid function f such that, in cases where the absolute value of the band-limited image signal is larger than the threshold value Th1, the absolute value may become small. The band-limited image signals having thus been converted are integrated, and the obtained integration signal is emphasized with the predetermined emphasis coefficient. The signal concerning the high frequency components, which is to be added to the original image signal Sorg, is thereby obtained.

Therefore, as illustrated in FIG. 16, in the flat region in which no edge is located, the processed image signal Sproc has the frequency characteristics indicated by the solid line. Also, as indicated by the broken line in FIG. 16, in the region in the vicinity of an edge, the processed image signal Sproc has the frequency characteristics such that the response with respect to a comparatively low frequency band may become low. Thus the same effects can be obtained as those obtained when the size of the unsharp mask for obtaining the unsharp image signal, i.e. Sus in Formula (1), is set to be smaller than the size of the actual unsharp mask in region in the vicinity of an edge.

In this manner, the band-limited image signal corresponding to the region in the vicinity of an edge and having a signal value, the absolute value of which is comparatively large, is converted into the signal, which has small influence upon the signal concerning the high frequency components to be added to the original image signal Sorg. Accordingly, in the region in the vicinity of an edge, at which the image density changes sharply, the influence of a signal, which causes an artifact to occur, can be weakened. As a result, an image having no artifact and having good image quality can be obtained from the processing.

Figure 17:
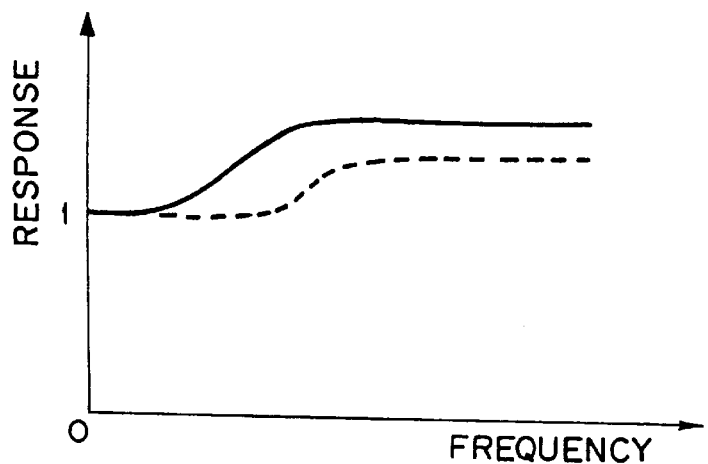
FIG. 17 is a graph showing a different example of frequency characteristics of a processed image signal, which is obtained with the image processing apparatus in accordance with the present invention.

In the embodiment described above, the processed image signal Sproc is obtained with Formula (6). Alternatively, the processed image signal Sproc may be obtained with Formula (7) shown below. Formula (6) and Formula (7) are different in the point described below. Specifically, in Formula (6), the band-limited image signal is obtained by subtracting the signals of two adjacent frequency bands from each other. On the other hand, in Formula (7), the band-limited image signal is obtained by subtracting each of the unsharp image signals Susk of all frequency bands from the original image signal Sorg. The processed image signal Sproc obtained with Formula (7) has the frequency characteristics shown in FIG. 17. As illustrated in FIG. 17, in the flat region in which no edge is located, the processed image signal Sproc has the frequency characteristics indicated by the solid line. Also, as indicated by the broken line in FIG. 17, in the region in the vicinity of an edge, the processed image signal Sproc has the frequency characteristics such that the response with respect to a comparatively low frequency band may become low. Thus the same effects can be obtained as those obtained when the size of the unsharp mask for obtaining the unsharp image signal Susk is set to be smaller than the size of the actual unsharp mask in region in the vicinity of an edge. When the frequency characteristics indicated by the broken line in FIG. 17 are compared with those in FIG. 16, the response in FIG. 17 becomes low over the entire frequency band. Therefore, in the frequency characteristics shown in FIG. 17, the response becomes low also in the flat region, which is not located in the vicinity of an edge. Accordingly, the processed image signal Sproc should preferably be obtained with Formula (6). With Formula (6), the response in the flat region does not become low, and only the response in the region in the vicinity of an edge becomes low.

$$Sproc = Sorg + \beta(Sorg) \cdot Fusm(Sorg, Sus1, Sus2, \ldots, SusN) \quad (7)$$

$$Fusm(Sorg, Sus1, Sus2, \ldots, SusN) =$$

$$(1/N) \cdot \{f1(Sorg - Sus1) + f2(Sorg - Sus2) + \ldots +$$

$$fk\ (Sorg - Susk) + \ldots + fN(Sorg - SusN)\}$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

Figure 18:
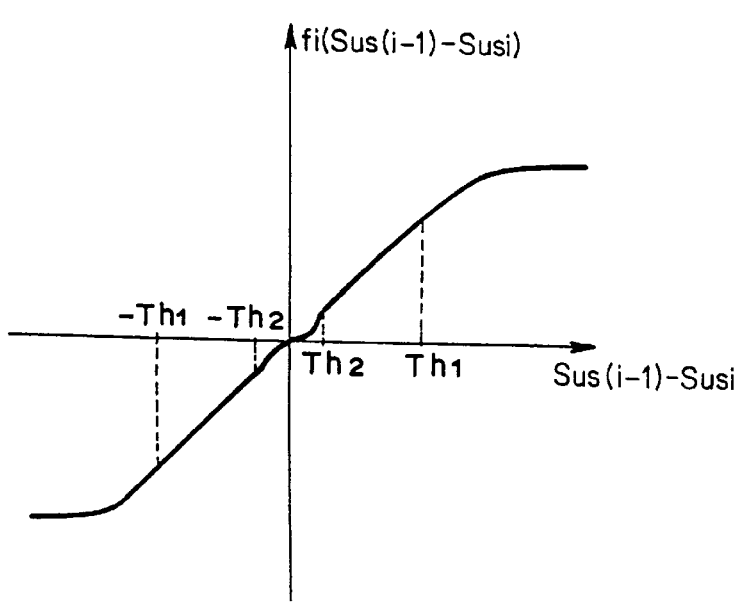
FIG. 18 is a graph showing a different example of a function, which is used in a converting process carried out on a band-limited image signal in the conversion means.

Also, in the embodiment described above, as illustrated in FIG. 15, the function for converting the band-limited image signal is set such that, in cases where the absolute value of the band-limited image signal is larger than the threshold value Th1, the absolute value may become small. Alternatively, for example, as illustrated in FIG. 18, the function for converting the band-limited image signal may be set such that, in cases where the absolute value of the band-limited image signal is larger than the threshold value Th1, the absolute value may become small, and such that, in cases where the absolute value of the band-limited image signal is smaller than a threshold value Th2, the absolute value may become small.

In this manner, a correction may be made such that, as the absolute value of the band-limited image signal becomes smaller than the threshold value Th2, which is smaller than the threshold value Th1, the absolute value of the band-limited image signal may be converted to a small value. In such cases, the response with respect to the components, which have a small absolute value of a signal value and may be considered as being noise in the image, can be rendered low. As a result, noise in the processed image can be reduced.

Further, in the embodiments described above, the processed image signal Sproc is obtained with Formula (6) or Formula (7). As another alternative, the processed image signal Sproc may be obtained with Formula (8) shown below. Formula (7) and Formula (8) are different in the point described below. Specifically, in Formula (7), the band-limited image signal is obtained by subtracting each of the unsharp image signals Susk of all frequency bands from the original image signal Sorg. On the other hand, in Formula (8), each of the unsharp image signals Susk, where k=2 to N, is subtracted from the unsharp image signal Sus1. The band-limited image signals in Formula (8) have the frequency characteristics shown in FIG. 19. As illustrated in FIG. 19, the processed image signal Sproc obtained with Formula (8) has the frequency characteristics such that the high frequency components may have been eliminated.

In the processing carried out with Formula (7), the high frequency components, which can be considered as being noise in the image, are also emphasized, and therefore noise becomes perceptible in the resulting processed image. On the other hand, as illustrated in FIG. 19, in the processing carried out with Formula (8), the processed image signal Sproc can be obtained such that the high frequency components may have been eliminated. Therefore, noise is not emphasized, and a processed image having good image quality can be obtained.

$$Sproc = Sorg + \beta(Sorg) \cdot Fusm(Sus1, Sus2, \ldots, SusN) \quad (8)$$

$$Fusm(Sus1, Sus2, \ldots, SusN) =$$
$$(1/N) \cdot \{f2(Sus1 - Sus2) + f3(Sus1 - Sus3) + \ldots +$$
$$fk(Sus1 - Susk) + \ldots + fN(Sus1 - SusN)\}$$

wherein Sproc represents the image signal, in which the high frequency components have been emphasized, Sorg represents the original image signal, Susk (k=1 to N) represents the unsharp mask image signal, fk (k=2 to N) represents the function for converting the band-limited image signal, and β(Sorg) represents the emphasis coefficient determined in accordance with the original image signal.

As a further alternative, the processing may be carried out with Formula (9) shown below. In Formula (6) shown above, the band-limited image signal (Sorg–Sus1) is used. On the other hand, in Formula (9), the band-limited image signal (Sorg–Sus1) is not used. As a result, the highest frequency components shown in FIG. 14 are eliminated. Therefore, as in the processing carried out with Formula (8), the processed image signal Sproc can be obtained such that the high frequency components may have been eliminated. Accordingly, noise is not emphasized, and a processed image having good image quality can be obtained.

$$Sproc = Sorg + \beta(Sorg) \cdot Fusm(Sus1, Sus2, \ldots, SusN) \quad (9)$$

$$Fusm(Sus1, Sus2, \ldots, SusN) =$$
$$\{f2(Sus1 - Sus2) + f3(Sus2 - Sus3) + \ldots +$$
$$fk(Susk - 1 - Susk) + \ldots + fN(SusN - 1 - SusN)\}$$

wherein Sproc represents the image signal, in which the high frequency components have been emphasized, Sorg represents the original image signal, Susk (k=1 to N) represents the unsharp mask image signal, fk (k=2 to N) represents the function for converting the band-limited image signal, and β(Sorg) represents the emphasis coefficient determined in accordance with the original image signal.

The frequency band, which is to be used in making a diagnosis, or the like, varies for different portions of the object, the images of which were recorded. For example, as for the images obtained with the double contrast image recording of the lungs and the stomach, the comparatively low frequency components should preferably be emphasized in the lung image, and the comparatively high frequency components should preferably be emphasized in the stomach image such that the patterns of the folds of the walls of the stomach may be viewed. As for images containing patterns of bones or metal members, such as artificial bones, it is necessary to prevent an artifact from occurring due to excessive emphasis of the edges of the bone patterns or the metal member patterns. However, as for the images, which do not contain edges, e.g. those of bones, such as mamma images, and in which an artifact will not occur easily, if the emphasis of frequency components is carried out in the same manner as that for the images containing bone patterns, the image portions, which is to be used in making a diagnosis, will become difficult to view. Therefore, the shape of the function f shown in FIG. 15 should preferably be altered in accordance with the portion of the object, the image of which was recorded, or the frequency bands of the band-limited image signals.

For example, as illustrated in FIG. 20, as for the image containing bone patterns, the function f should preferably be set as indicated by B such that the high frequency components of the band-limited image signals may be restricted, and an artifact may be prevented from occurring at an edge. As for the image containing no bone pattern, such as a mamma image, the function f should preferably be set as indicated by A, and the converting process should preferably be carried out such that the high frequency components of the band-limited image signals may also be emphasized, and the absolute values of the band-limited image signals may become large over approximately the entire frequency band.

Figure 21:
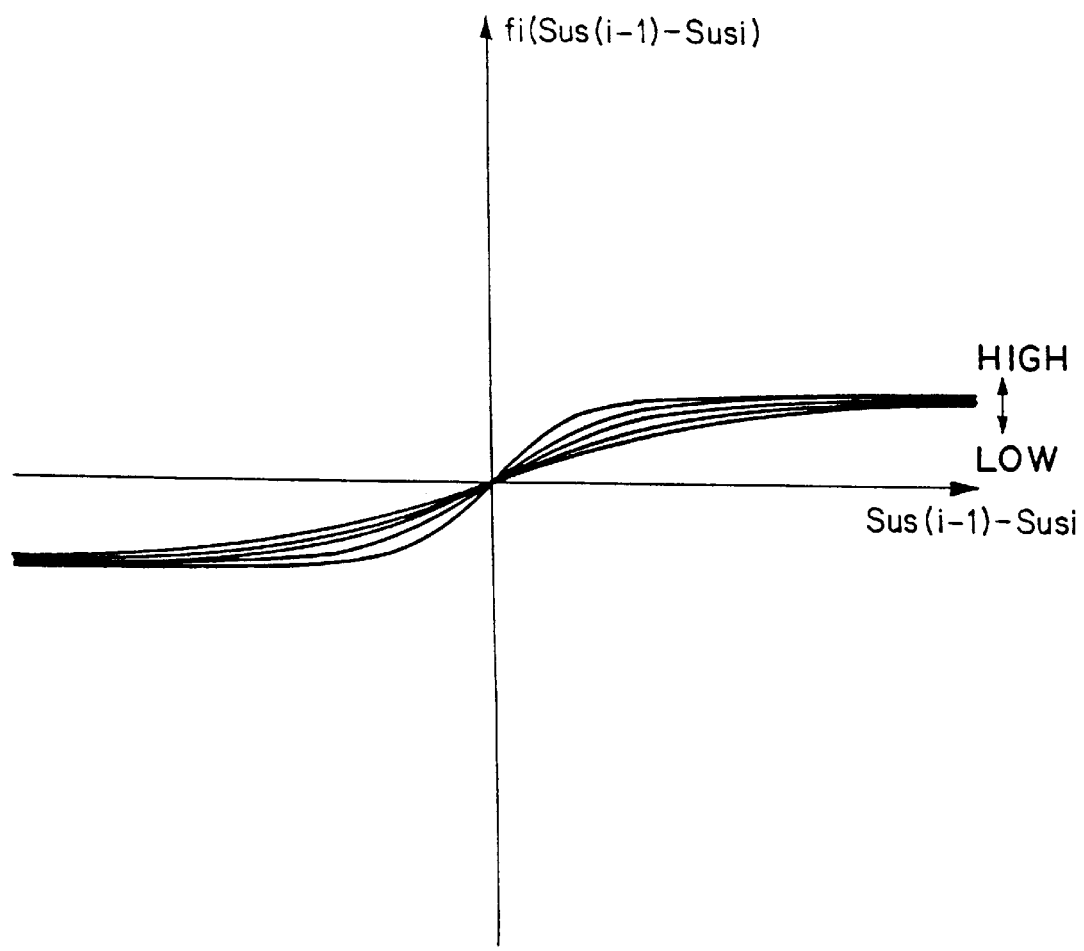
FIG. 21 is a graph showing examples of functions used in a converting process carried out on band-limited image signals in accordance with the levels of frequency bands.
Figure 22:
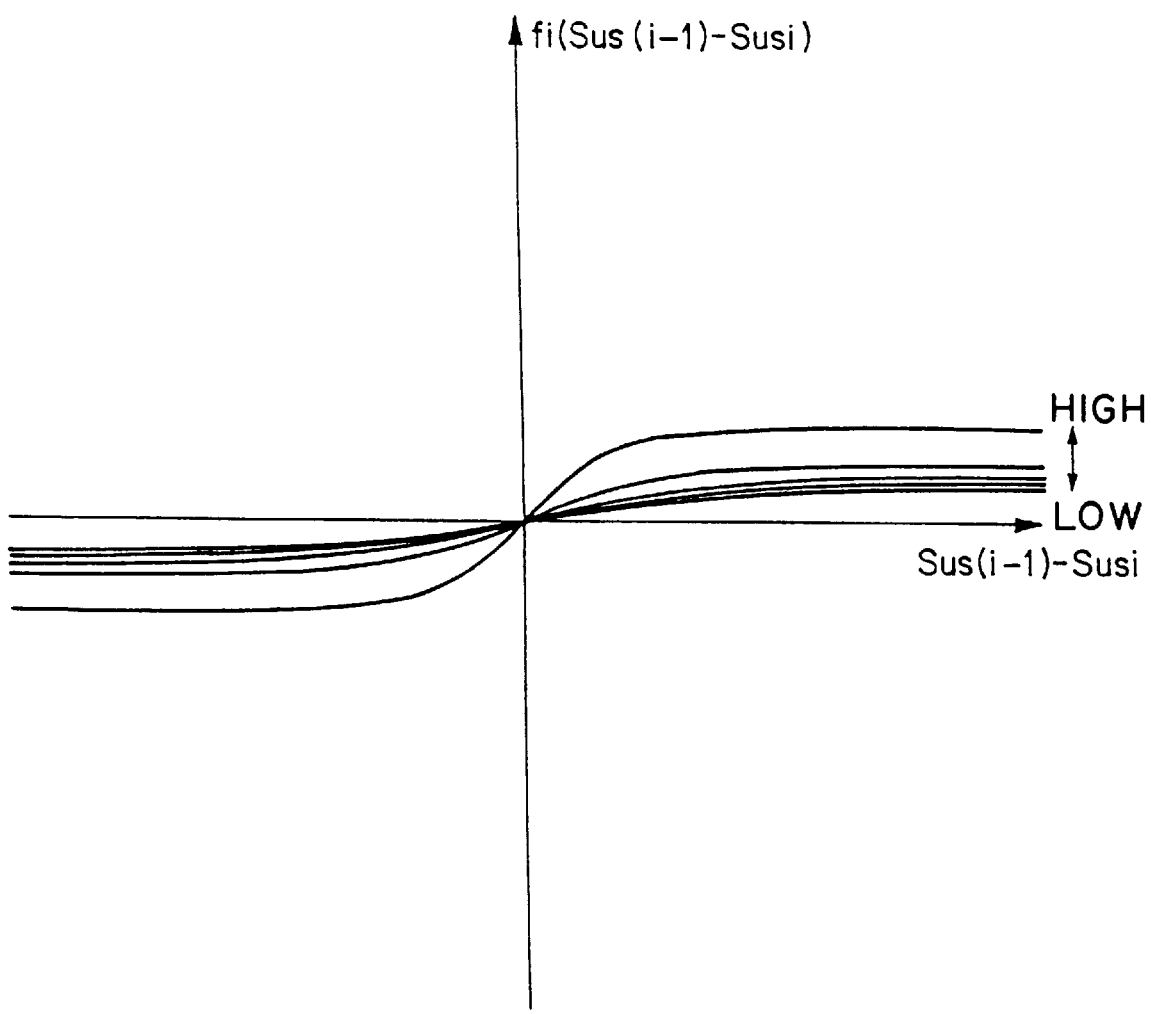
FIG. 22 is a graph showing different examples of functions used in a converting process carried out on band-limited image signals in accordance with frequency bands.
Figure 23:
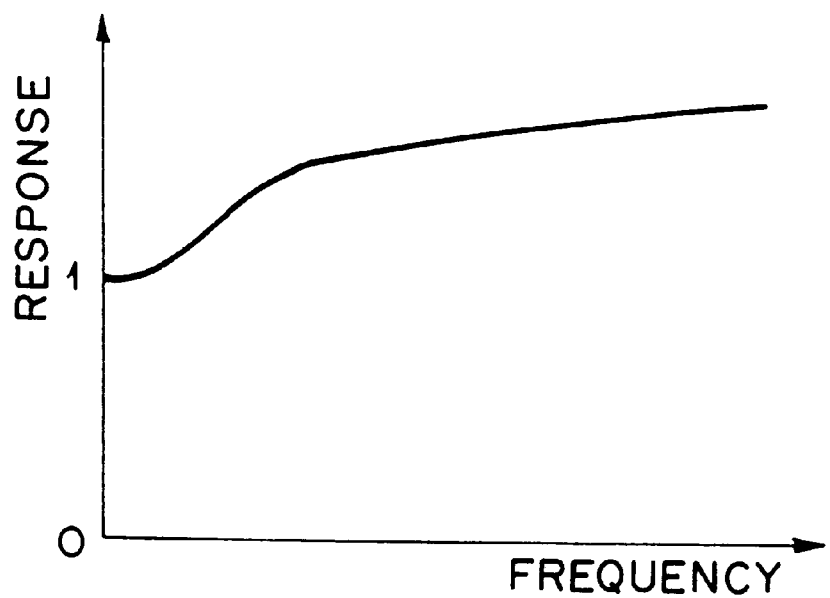
FIG. 23 is a graph showing frequency characteristics of a processed image signal, which is obtained with the functions shown in FIG. 21.
Figure 24:
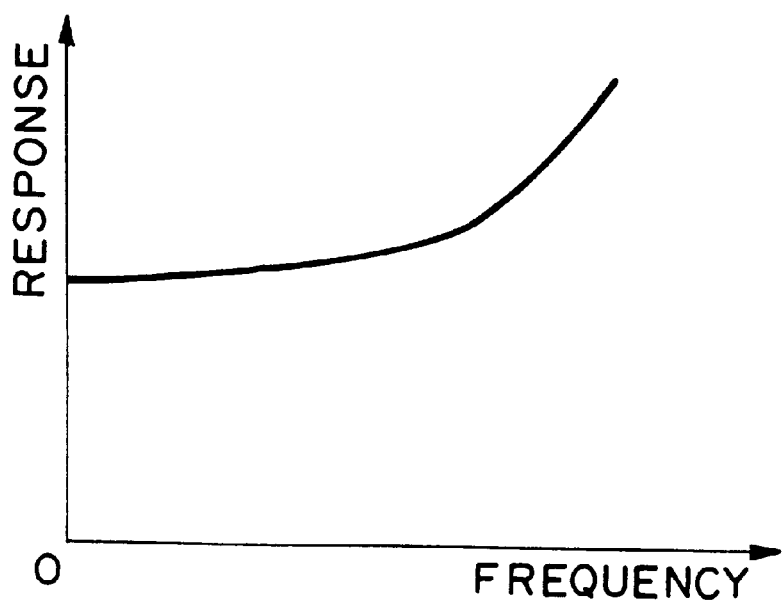
FIG. 24 is a graph showing frequency characteristics of a processed image signal, which is obtained with the functions shown in FIG. 22.

As for a chest image, the band-limited image signals should preferably be emphasized over the entire frequency band, and therefore the function f should preferably be altered as shown in FIG. 21 in accordance with the frequency bands of the band-limited image signals. As for the double contrast image of the stomach, the high frequency components of the band-limited image signals should preferably be emphasized, and the low frequency components should preferably be restricted. Therefore, the function f should preferably be altered as shown in FIG. 22 in accordance with the frequency bands of the band-limited image signals. FIG. 23 shows the frequency characteristics of the processed image signal Sproc, which is obtained by converting the band-limited image signals in accordance with the functions f shown in FIG. 21. FIG. 24 shows the frequency characteristics of the processed image signal Sproc, which is obtained by converting the band-limited image signals in accordance with the functions f shown in FIG. 22. As illustrated in FIG. 23, as for the chest image, the response is emphasized over approximately the entire frequency band. Also, as illustrated in FIG. 24, as for the double contrast image of the stomach, the response with respect to the high frequency band is emphasized to a higher extent than the response with respect to the other frequency bands.

As described above, as for the chest image, the processing should preferably be carried out such that the response may be emphasized over the entire frequency band. In such cases, the lung field patterns becomes perceptible. Also, as for the double contrast image of the stomach, the processing should preferably be carried out such that the response with respect to the high frequency band may be emphasized. In such cases, the patterns of the folds of the walls of the stomach becomes perceptible. Also, in cases where the processing is carried out such that the absolute values of the band-limited image signals may be changed in accordance with the frequency bands of the band-limited image signals or the portion of the object, the image of which was recorded, an image having good image quality in accordance with the portion of the object, the image of which was recorded, or the frequency bands can be obtained.

The conversion of the band-limited image signals in the conversion means 3 may be carried out regardless of the aforesaid threshold value Th1 and in accordance with a plurality of functions f1 to fN, which vary for different frequency bands, such that the absolute value of each band-limited image signal may be converted to a value, which is not larger than the absolute value of the band-limited image signal and is determined in accordance with the absolute value of the band-limited image signal. As the functions f1 to fN, a combination of appropriate functions should preferably be set in accordance with the characteristics of the image processing which is to be achieved.

In the embodiment which is free from the threshold value, the processed image signal Sproc can be adjusted, such that it may have arbitrary frequency characteristics, by varying the functions, which are used in the conversion means 3, for different frequency bands. Therefore, the frequency characteristics of the processed image signal Sproc can be adjusted in accordance with the conditions, which are required for the images to be processed in the respective apparatuses described above.

Figure 29A:
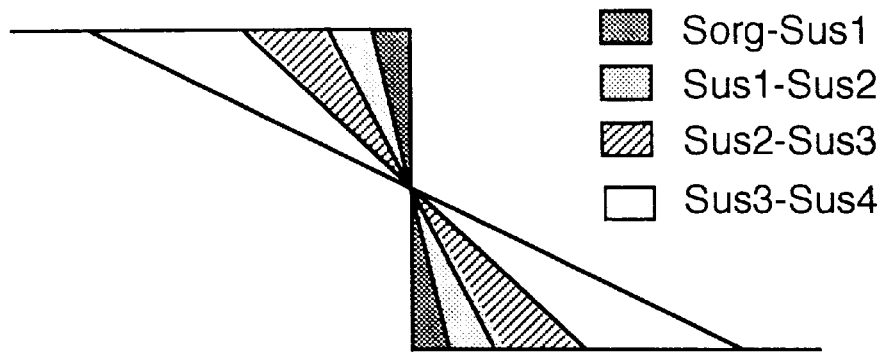
Figure 29B:
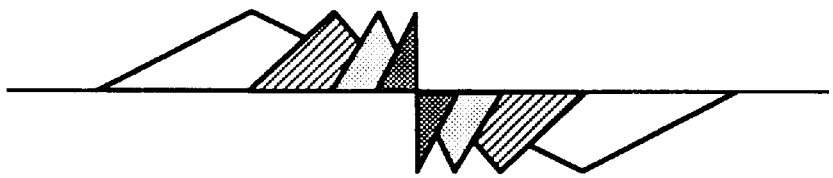
Figure 29C:
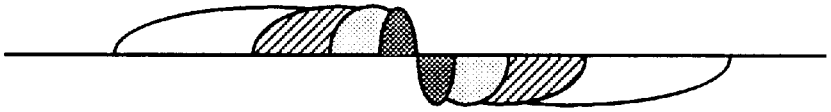
Figure 29D:
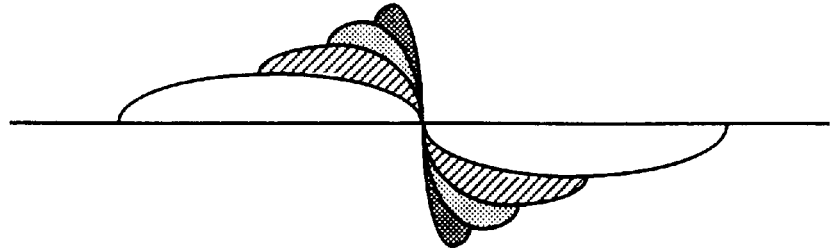

Effects obtained by varying the functions for different frequency bands will be described hereinbelow. FIGS. 29A, 29B, 29C, and 29D are explanatory views showing the problems encountered with the conventional technique, in which the same function is employed as the functions f1 to fN, i.e. in which the band-limited image signals of all frequency bands are converted with the same converting method. In FIGS. 29A, 29B, 29C, and 29D, the processing in the vicinity of an edge, at which the image density changes sharply, is illustrated in steps. FIG. 29A shows a step-like profile of the original image signal and the profiles of the unsharp image signals having been formed from the original image signal. FIG. 29B shows the profiles of the band-limited image signals with respect to the signals shown in FIG. 29A. FIG. 29C shows the profiles of the converted image signals. FIG. 29D shows the profile of the signal obtained by integrating the converted image signals.

As illustrated in FIG. 29D, ordinarily, in the signal obtained by integrating the converted image signals, unnatural joints are formed at the boundaries among the frequency bands. The unnatural joints cause a streak-like artifact to occur. In order for such problems to be prevented, the converted image signals must be formed by considering such that the boundaries among the frequency bands may join in a pattern as natural as possible. However, in cases where the function is set to be uniform, arbitrary conversion, in which the influence of the boundaries among the frequency bands is taken into consideration, cannot be carried out on the respective band-limited image signals. As a result, the streak-like artifact cannot be prevented from occurring. On the other hand, in the embodiment of the image processing apparatus in accordance with the present invention, different functions are used for different frequency bands, and the functions are set by considering the boundaries among the frequency bands. In this manner, the streak-like artifact is prevented from occurring.

Figure 25:
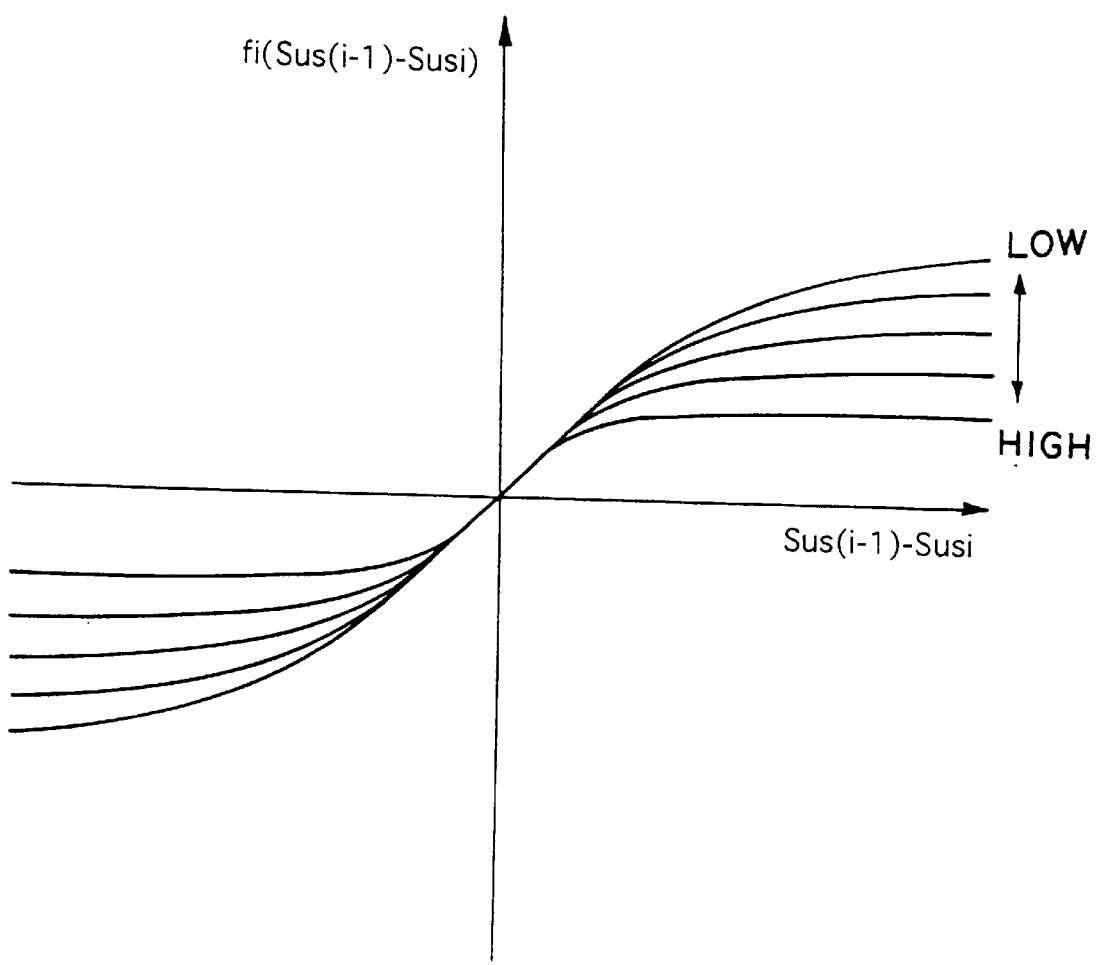
FIG. 25 is a graph showing examples of functions, which are used in a converting process carried out in the conversion means.

Examples of the functions varying for different frequency bands will be described hereinbelow. FIG. 25 shows examples of the functions used for the formation of the band-limited image signals. In FIG. 25, the value of the band-limited image signal to be processed is plotted on the horizontal axis, and the value obtained by processing the band-limited image signal is plotted on the vertical axis. Each of the functions illustrated in FIG. 25 converts the band-limited image signal such that the absolute value of the band-limited image signal may be converted to a value, which is not larger than the absolute value of the band-limited image signal and is determined in accordance with the absolute value of the band-limited image signal. Also, each of the functions carries out the conversion such that, as for the band-limited image signal, the absolute value of which is larger than a predetermined value, the value of the converted image signal may become approximately equal to a predetermined level. In a function for processing a high frequency band, the aforesaid predetermined value is set to be smaller than those in the other functions.

In other words, the functions have the characteristics such that each function may pass through the origin, such that the inclination of the function may be equal to at most 1 regardless of the value of the band-limited image signal processed with the function, and such that the inclination of the function may become equal to 0 or may converge to 0 as the absolute value of the signal value of the band-limited image signal processed with the function becomes large. The functions also have the characteristics such that, in a function for processing a high frequency band, the absolute value of the processed signal value, which absolute value is associated with the point in the function where the inclination of the function becomes equal to 0 or a predetermined value close to 0, may take a smaller value than those in the other functions.

Figure 30A:
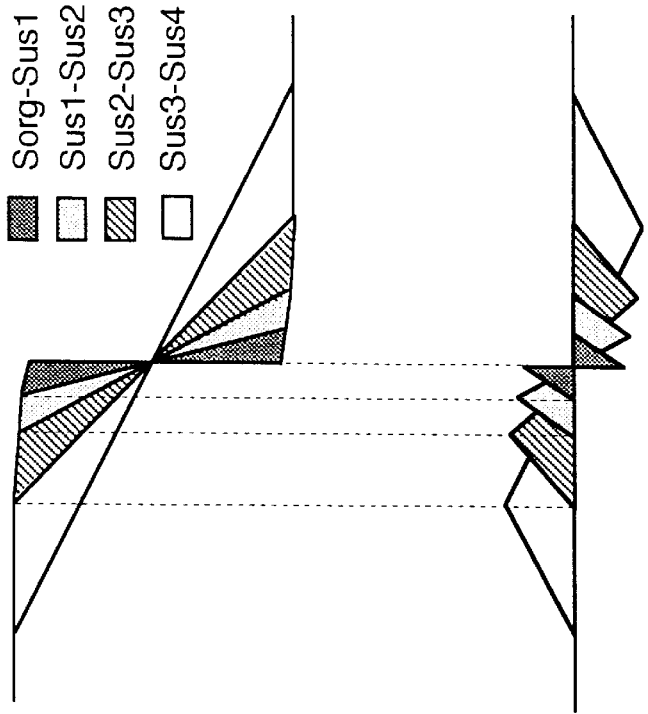
FIG. 30A is an explanatory view showing ideal patterns of frequency components at an edge in the image.
Figure 30B:
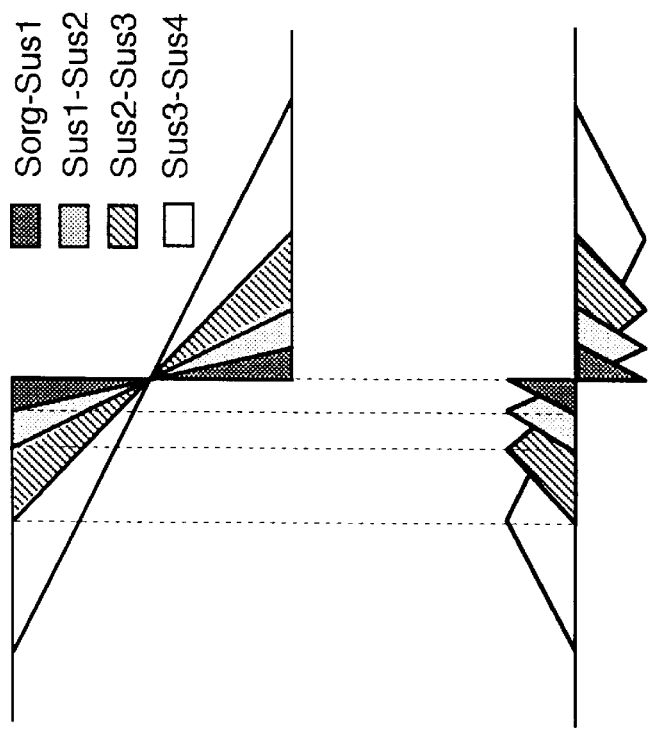
FIG. 30B is an explanatory view showing actual patterns of frequency components at an edge in the image.

The functions shown in FIG. 25 carry out the conversion such that a band-limited image signal having a large amplitude may be restricted, and such that the degree of restriction of a band-limited image signal of a high frequency band may be higher than the degree of restriction of a band-limited image signal of a low frequency band. Such conversion is carried out by considering the feature in that the high frequency components contained in an edge in an actual radiation image have a smaller amplitude than the amplitude of low frequency components. Specifically, even at a very sharp edge in an actual radiation image, the signal does not take a definite step-like profile illustrated in FIG. 30A, but the amplitude of the high frequency components becomes smaller than the amplitude of the low frequency components as illustrated in FIG. 30B. Therefore, in accordance with the amplitude of the respective frequency components, as for a band-limited image signal having a high frequency, the restriction should preferably be carried out starting with a small amplitude. The functions shown in FIG. 25 can achieve such restriction.

Functions shown in FIG. 26 will be described hereinbelow. Each of the functions illustrated in FIG. 26 converts the band-limited image signal such that the absolute value of the band-limited image signal may be converted to a value, which is not larger than the absolute value of the band-limited image signal and is determined in accordance with the absolute value of the band-limited image signal. In a function for processing a low frequency band, the absolute value of the converted image signal, that is obtained when the band-limited image signal having a signal value, the absolute value of which falls within a predetermined range close to 0, is converted, takes a value smaller than those in the other functions.

In other words, the functions have the characteristics such that each function may pass through the origin, and such that the inclination of the function may be equal to at most 1 regardless of the value of the band-limited image signal processed with the function. The functions also have the characteristics such that, in a function for processing a low frequency band, the inclination of the function in the region, in which the absolute value of the band-limited image signal is close to 0, may be smaller than those in the other functions.

These functions have the effects described below. Specifically, when the integration signal shown in FIG. 29D, which has been obtained by integrating the converted image signals, is added to the original image signal Sorg, the joint between the original image signal Sorg and the integration signal can be formed in a natural pattern. More specifically, the rise of the signal can be rendered natural.

Figure 26:
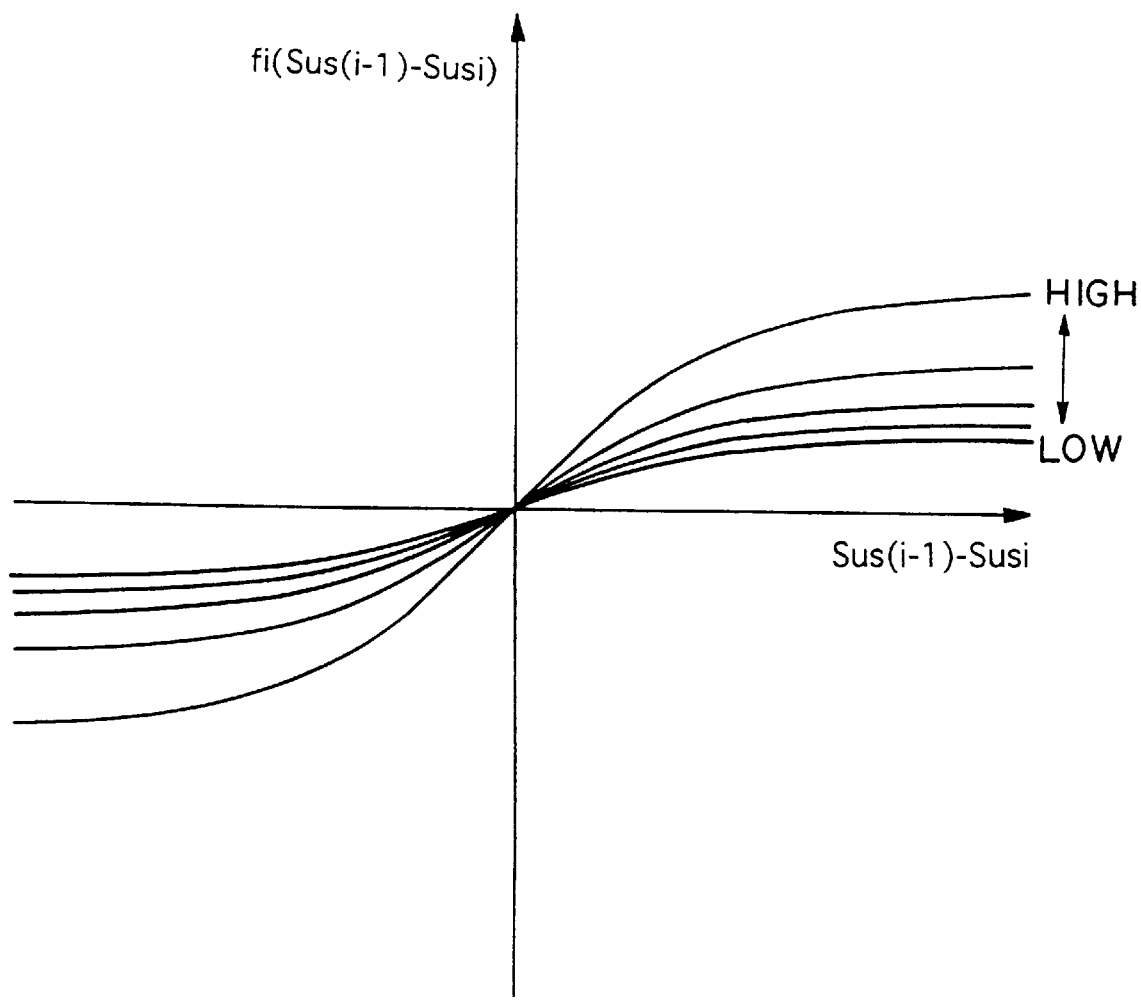
FIG. 26 is a graph showing different examples of functions, which are used in a converting process carried out in the conversion means.
Figure 27:
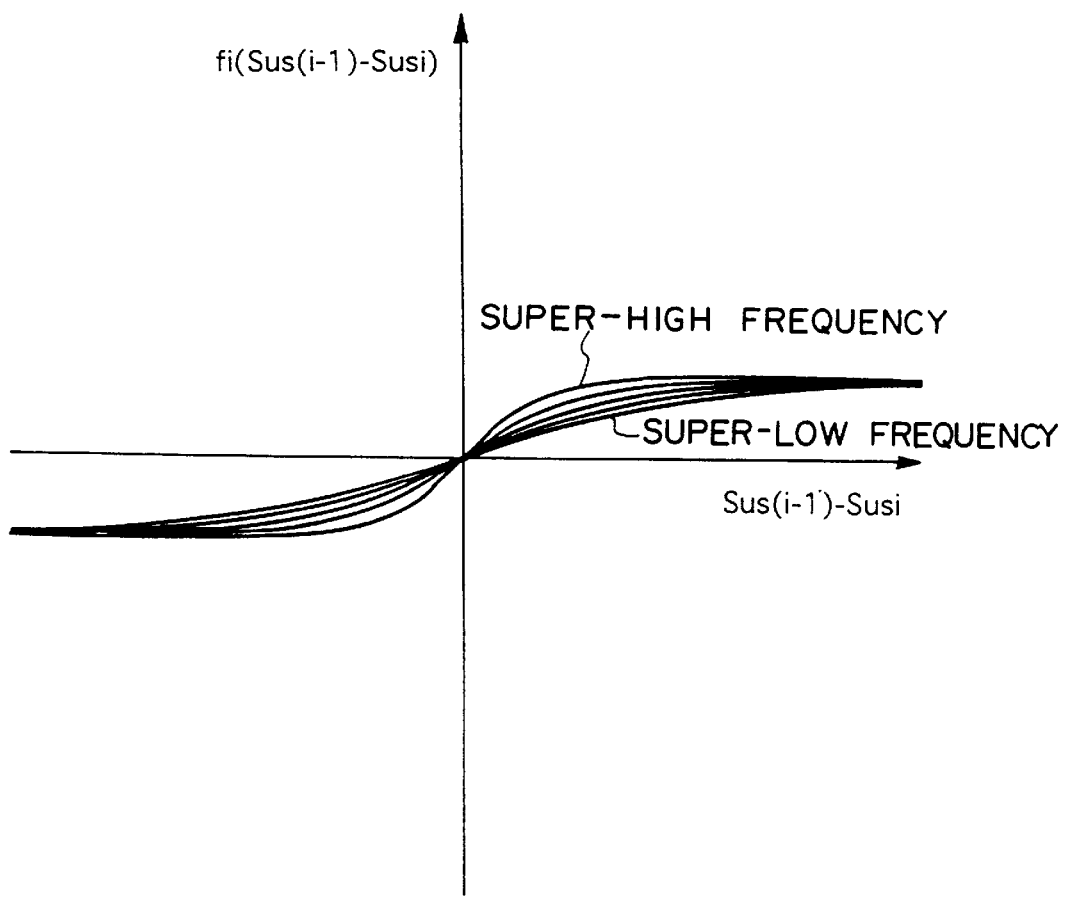
FIG. 27 is a graph showing examples of functions, which have both of the characteristics of the functions shown in FIG. 25 and the characteristics of the functions shown in FIG. 26, FIGS. 28A-1, 28B-1, and 28C-1 are graphs showing frequency characteristics with respect to respective frequency bands.

FIG. 27 is a graph showing examples of functions, which have both of the characteristics of the functions shown in FIG. 25 and the characteristics of the functions shown in FIG. 26. With the functions shown in FIG. 27, both of the effects of the functions shown in FIG. 25 and the effects of the functions shown in FIG. 26 can be obtained.

Figures 1, 28B:
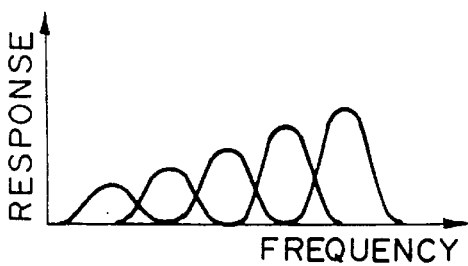
Figures 2, 28B:
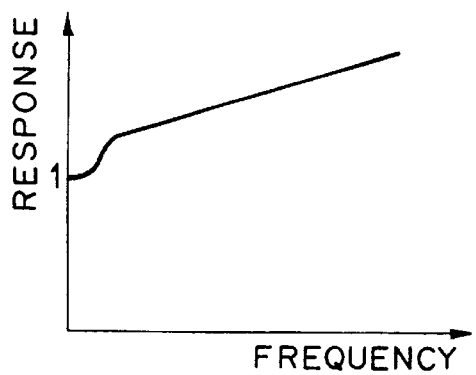
Figures 1, 28C:
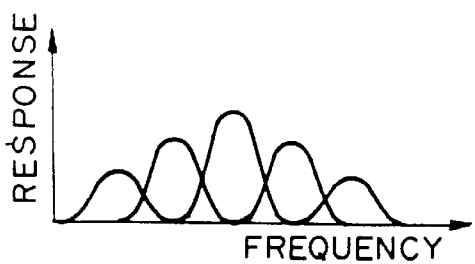
Figures 2, 28C:
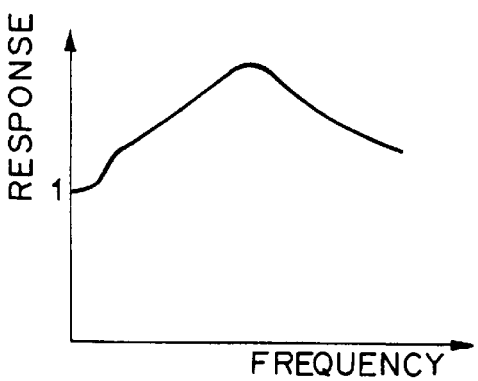

As described above, with the embodiments of the image processing method and apparatus in accordance with the present invention, the functions used for the respective frequency bands are varied in accordance with the characteristics of the image processing which is to be achieved, and the frequency characteristics of the entire frequency band can be adjusted appropriately. FIGS. 28A-1, 28B-1, 28C-1 and FIGS. 28A-2, 28B-2, 28C-2 show examples of the effects obtained with the embodiments of the image processing method and apparatus in accordance with the present invention. FIGS. 28A-1, 28B-1, and 28C-1 show the frequency characteristics of the signals of the respective frequency bands having been formed by the embodiments of the image processing apparatus in accordance with the present invention. FIGS. 28A-2, 28B-2, and 28C-2 show the frequency characteristics with respect to the entire frequency band, which correspond respectively to FIGS. 28A-1, 28B-1, and 28C-1. The frequency characteristics shown in FIGS. 28A-1 and 28 A-2 are obtained when a function having an inclination of 1 is set for all of the frequency bands. The frequency characteristics shown in FIGS. 28B-1 and 28B-2 are obtained when the inclination of the function is set to be small for a low frequency band. The frequency characteristics shown in FIGS. 28C-1 and 28C-2 are obtained when the inclination of the function is set to be 1 for a specific frequency band and is set to be smaller than 1 for the other frequency bands such that band pass frequency characteristics may be obtained as a whole. The example shown in FIGS. 28C-1 and 28C-2 is useful when, for example, only the information of a specific frequency band is to be obtained.

In the aforesaid embodiments wherein the signal value larger than the aforesaid threshold value is restricted, and in the aforesaid embodiments wherein the entire signal value is restricted regardless of a threshold value, the converting process carried out by the conversion means 3 may be varied in accordance with the value of the emphasis coefficient $\beta$. The effects obtained in such cases will be described hereinbelow by taking the processing with functions, which are free from the threshold value, as an example.

Figure 31:
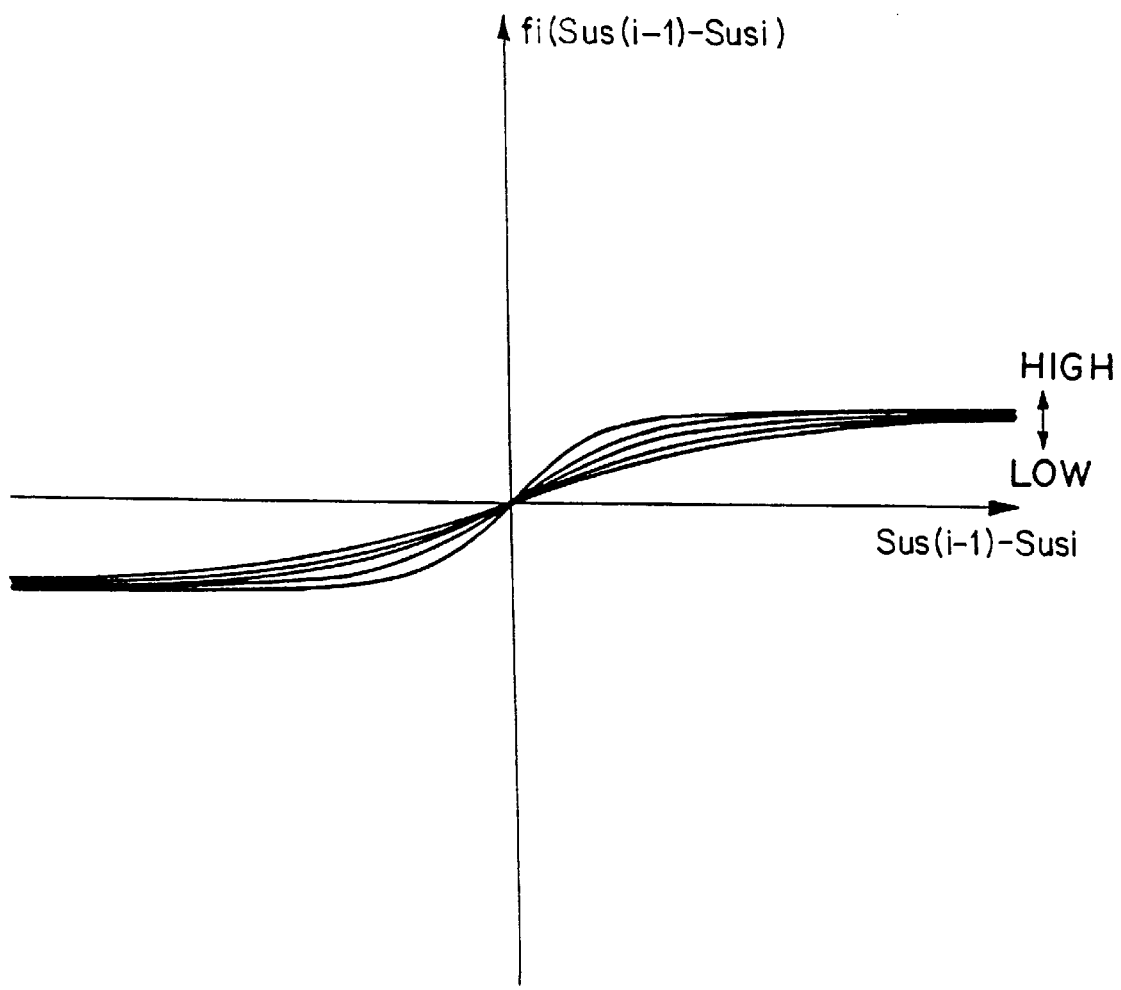
FIG. 31 is a graph showing examples of functions, which are used for the conversion of band-limited image signals in cases where the value of an emphasis coefficient is small.
Figure 32:
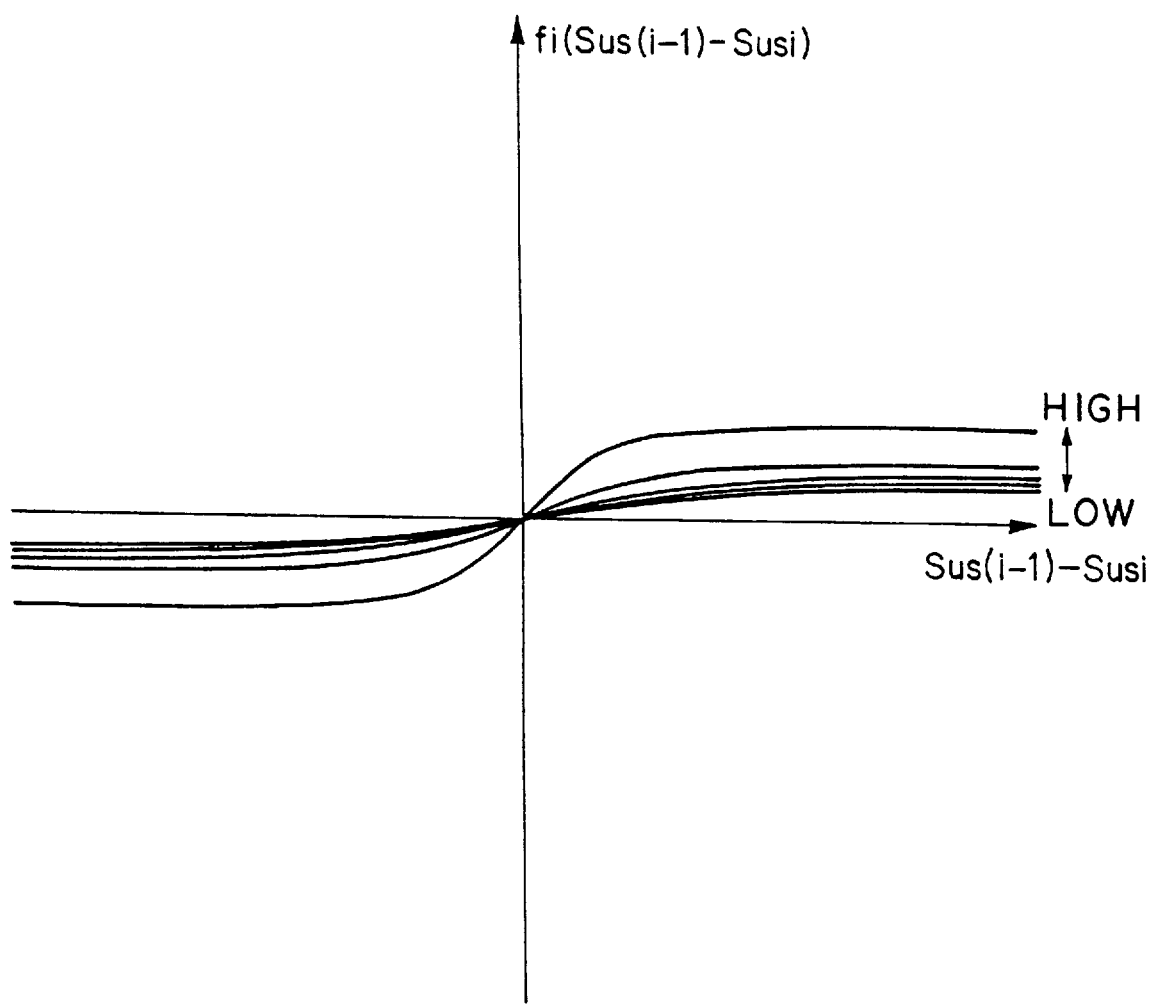
FIG. 32 is a graph showing examples of functions, which are used for the conversion of band-limited image signals in cases where the value of an emphasis coefficient is large.

Specifically, in cases where the value of the emphasis coefficient $\beta$ is comparatively small, as the functions f1 to fN, the functions shown in FIG. 31 are used. Also, in cases where the value of the emphasis coefficient $\beta$ is large, as the functions f1 to fN, the functions shown in FIG. 32 are used. In FIGS. 31 and 32, "high" represents the function used for the conversion of a band-limited image signal of a high frequency band, and "low" represents the function used for the conversion of a band-limited image signal of a low frequency band.

The functions shown in FIGS. 31 and 32 restrict each band-limited image signal such that it may become smaller than the absolute value of the band-limited image signal. In this embodiment, as will be understood when FIGS. 31 and 32 are compared with each other, the combination of the functions is defined such that, as the value of the emphasis coefficient $\beta$ becomes large, the difference between the degree of restriction, which is carried out with the function for processing a high frequency band, and the degree of restriction, which is carried out with the function for processing a low frequency band, may become large. Specifically, the function for processing the high frequency band is kept the same regardless of the value of the emphasis coefficient $\beta$, and the degree of restriction, which is carried out with the function for processing the low frequency band, is set to be high as the value of the emphasis coefficient $\beta$ becomes large. Alternatively, the function for processing the low frequency band is kept the same regardless of the value of the emphasis coefficient $\beta$, and the degree of restriction, which is carried out with the function for processing the high frequency band, may be changed. As another alternative, all of the functions may be changed such that the difference in the degree of restriction may become large.

FIG. 33 shows the response of the image signal, in which the high frequency components have been emphasized with the combination of the functions shown in FIG. 31. FIG. 34 shows the response of the image signal, in which the high frequency components have been emphasized with the combination of the functions shown in FIG. 32. From FIGS. 33 and 34, it will be found that, in cases where the value of the emphasis coefficient $\beta$ is large, only the degree of emphasis of the high frequency components becomes high, and the degree of emphasis of the low frequency components is kept approximately the same as when the value of the emphasis coefficient $\beta$ is small.

In cases where the combination of the functions is determined regardless of the emphasis coefficient β, if the value of the emphasis coefficient is set to be large, the degree of emphasis will become high for all of the frequency bands. In general, the value of the emphasis coefficient is set to be large such that the high frequency components carrying a small amount of information may be emphasized. However, in such cases, the low frequency components are also emphasized. As a result, the level of contrast becomes very high, and an artifact will occur. On the other hand, in cases where the combination of the functions is set as shown in FIG. 32 such that, even if the value of the emphasis coefficient β is set to be large, the degree of emphasis of the low frequency components may not change very much, an artifact can be prevented from occurring.

In FIG. 31, a single set of functions are shown which may be used when the value of the emphasis coefficient β is small. Also, in FIG. 32, a single set of functions are shown which may be used when the value of the emphasis coefficient β is large. However, the examples shown in FIGS. 31 and 32 do not mean that only two sets of the functions are used, but merely illustrate how the characteristics of the functions may be changed in accordance with a change in the value of the emphasis coefficient β. Therefore, it is also possible to classify the extent of the change in the value of the emphasis coefficient β into several different levels, and to determine a set of functions in accordance with each of the classified levels. In cases where such levels are set finely, an image having better image quality can be obtained.

In the embodiment described above, the non-linear functions are determined on the basis of the consideration in that the value of the emphasis coefficient is set to be large in order for only the high frequency components to be emphasized. However, the effects, which should be obtained from the changing of the value of the emphasis coefficient, are not limited to the emphasis of the high frequency components. Therefore, as the non-linear functions, various functions may be utilized in accordance with the effects, which are to be obtained. In the aforesaid embodiment, as the non-linear functions, sets of the plurality of non-linear functions varying for different frequency bands are employed. However, the effects of the image processing apparatus in accordance with the present invention can also be obtained when a single same non-linear function is employed for all of the frequency bands, depending upon the effects, which are to be obtained from the changing of the value of the emphasis coefficient.

A different embodiment of the image processing method and apparatus in accordance with the present invention will be described hereinbelow. In this embodiment, the processes carried out by the unsharp image signal forming means 1, the band-limited image signal forming means 2, the integration means 4, and the frequency emphasis processing means 5 are the same as those in the aforesaid embodiment shown in FIG. 12. Therefore, only the process carried out by the conversion means 3 will be described hereinbelow.

Figure 35:
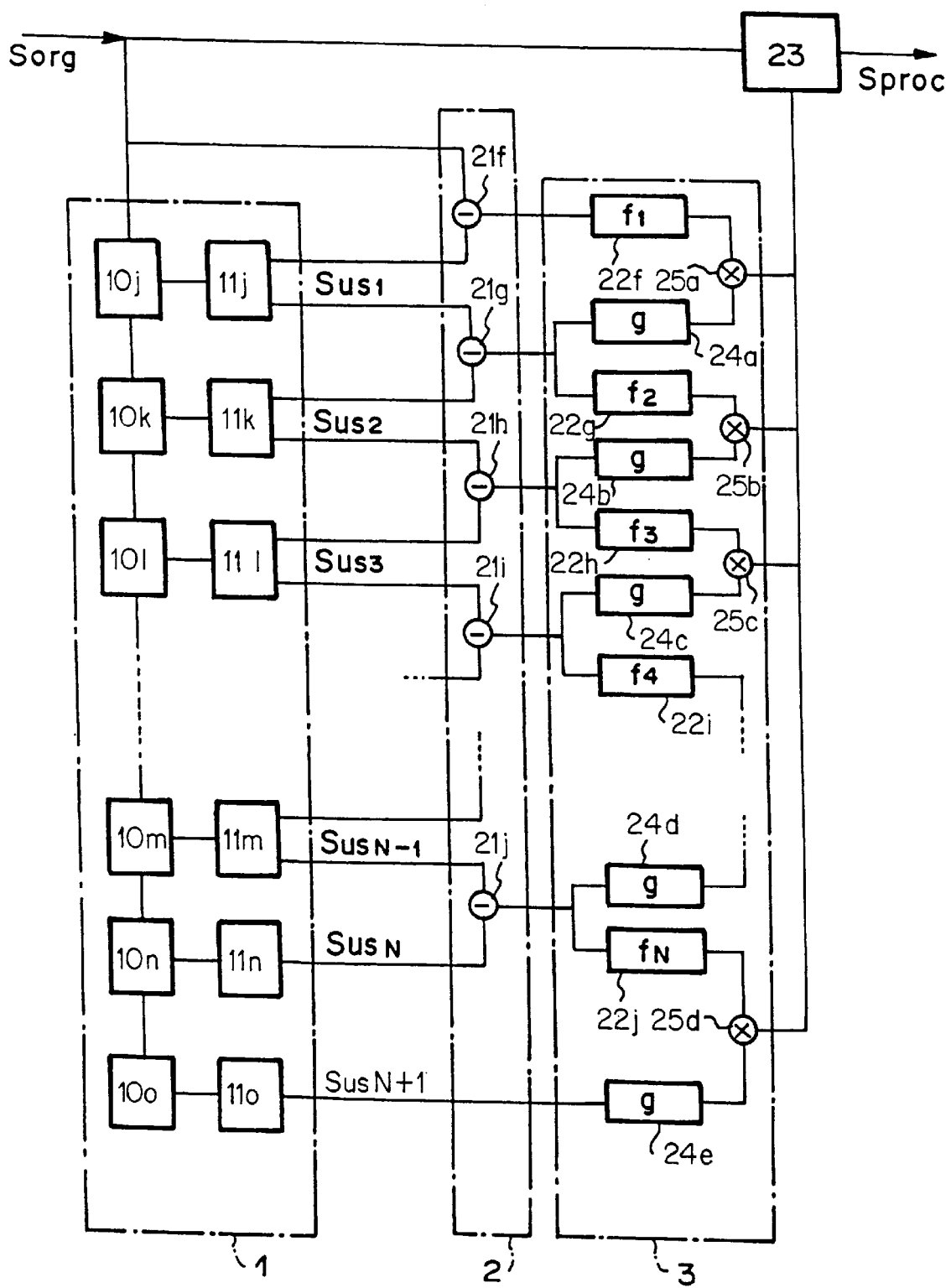
FIG. 35 is a block diagram showing a different embodiment of the image processing apparatus in accordance with the present invention.

FIG. 35 is a block diagram showing this embodiment of the image processing apparatus in accordance with the present invention. As in the aforesaid embodiment, the band-limited image signals are formed from the original image signal Sorg and the plurality of the unsharp image signals Susk, which have been formed by the unsharp image signal forming means 1. Each of the band-limited image signals is obtained from the subtracter 21f–21j, which subtracts the unsharp image signals Susk of two adjacent frequency bands (as for the original image signal Sorg, Sorg and Sus1) from each other. Specifically, the values of Sorg–Sus1, Sus1–Sus2, . . . , SusN–1–SusN are calculated successively, and the plurality of the band-limited image signals are thereby obtained. In this embodiment, for example, as for the band-limited image signal Sus1–Sus2, the signal Sus2–Sus3 is employed as the corresponding auxiliary image signal. Therefore, a single means substantially serves as the band-limited image signal forming means and an auxiliary image signal forming means. Specifically, the signal, which has been formed by the band-limited image signal forming means, is processed as the band-limited image signal and is also processed as the auxiliary image signal corresponding to the adjacent band-limited image signal.

Thereafter, each of the band-limited image signals having thus been obtained is converted in the conversion means 3. The conversion is carried out on each band-limited image signal by using the converter 22f–22j and a converter 24a–24e shown in FIG. 35. In the converter 22, the converting process is carried out by using one of the functions f1 to fN for the respective frequency bands, and a restricted image signal is thereby obtained. In the converter 24, a converting process is carried out by using a function g, and a magnification ratio signal is thereby obtained. In a multiplier 25a–25d the restricted image signal is multiplied by the magnification ratio signal. The conversion is carried out in this manner. In such cases, as illustrated in FIG. 35, the signals of two adjacent frequency bands are multiplied by each other. For example, the restricted image signal, which has been obtained by converting the band-limited image signal Sus1–Sus2, and the magnification ratio signal, which has been obtained by converting the auxiliary image signal Sus2–Sus3, are multiplied by each other. The converter 22 for carrying out the conversion with the function fk corresponds to a restricted image signal forming means. The converter 24 for carrying out the conversion with the function g corresponds to a magnification ratio signal forming means. Also, the multiplier 25 for multiplying the output signals, which have been obtained from the converters 22 and 24, by each other corresponds to a multiplication means.

The functions f1 to fN may be identical with one another or may be different from one another. They may be set arbitrarily in accordance with the characteristics of the image processing which is to be carried out. In this embodiment, as the functions f1 to fN, the functions are used, each of which restricts the band-limited image signal such that it may become smaller than the absolute value of the band-limited image signal, and which vary for different frequency bands. By way of example, the functions shown in FIG. 25 are used.

As the function g, for example, a function shown in FIG. 36 may be used. With the function g shown in FIG. 36, the auxiliary image signal is converted such that a converted value close to 1 may be obtained when the absolute value of the auxiliary image signal is small and such that, as the absolute value of the auxiliary image signal becomes large, a converted value close to 0 may be obtained. In FIG. 36, K represents the minimum value of the absolute value of the auxiliary image signal among the values, for which the converted values become equal to 0.

The converted image signals, which have been obtained from the conversion means 3, are fed into the operation device 23, which is provided with the integration means 4 and the frequency emphasis processing means 5. In the operation device 23, the processing is carried out in the manner described below. Firstly, the plurality of the converted image signals are integrated, and the integration signal is thereby obtained. The integration signal is multiplied by an emphasis coefficient β, which has a value determined in accordance with the value of the original image signal Sorg. The resulting product is then added to the original image signal Sorg, and the processed image signal Sproc is thereby obtained. This process and the other processes described above may be represented by Formula (10) shown below.

$$Sproc = Sorg + \beta(Sorg) \cdot Fusm(Sorg, Sus1, Sus2, \ldots, SusN) \quad (10)$$

$$Fusm(Sorg, Sus1, Sus2, \ldots, SusN) =$$

$$\{f1(Sorg - Sus1) \cdot g(Sus1 - Sus2) +$$

$$f2(Sus1 - Sus2) \cdot g(Sus2 - Sus3) + \ldots +$$

$$fk(Susk - 1 - Susk) \cdot g(Susk - Susk + 1) + \ldots +$$

$$fN(SusN - 1 - SusN) \cdot g(SusN - SusN + 1)\}$$

wherein Sproc represents the image signal, in which the high frequency components have been emphasized, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and β(Sorg) represents the emphasis coefficient determined in accordance with the original image signal.

Figure 37A:
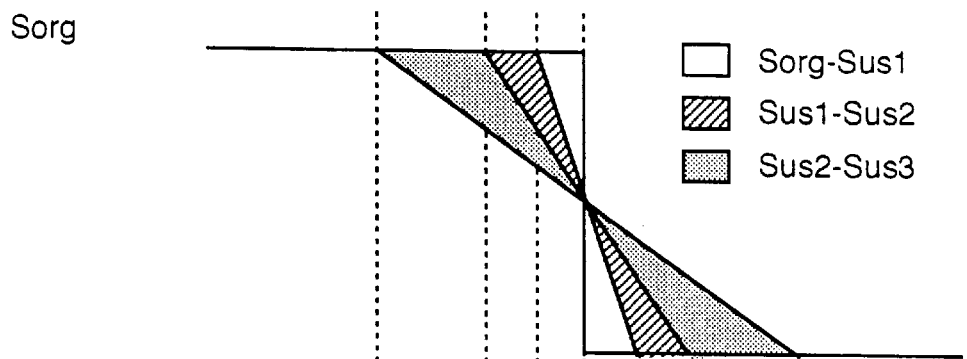
FIGS. 37A, 37B, 37C, 37D, and 37E are explanatory views showing the effects of the embodiment shown in FIG. 35, FIGS. 38A-1, 38B-1, 38C-1, 38D-1, 38E-1, and FIGS. 38A-2, 38B-2, 38C-2, 38D-2, 38E-2 are explanatory views showing the effects of the embodiment shown in FIG. 35.
Figure 37B:
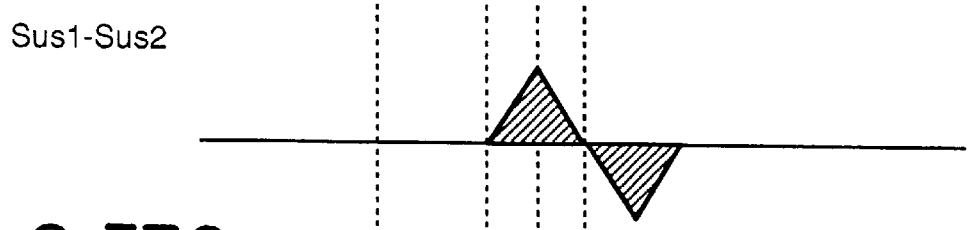
Figure 37C:
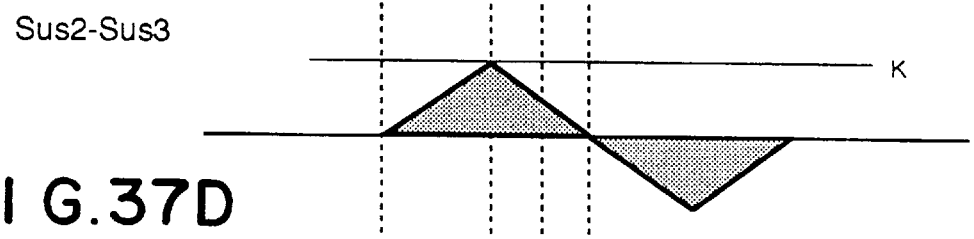
Figure 37D:
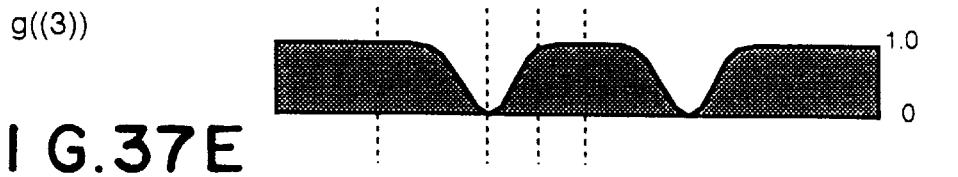
Figure 37E:
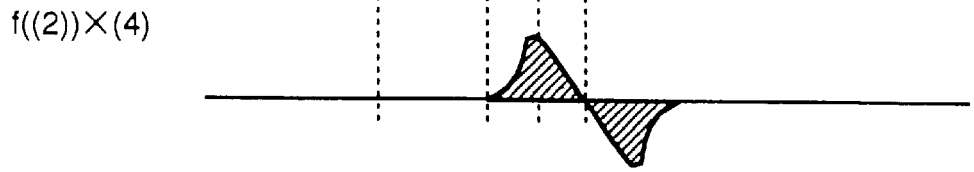

FIGS. 37A, 37B, 37C, 37D, and 37E show the effects obtained when an image signal corresponding to a region in the vicinity of an edge in the image is processed in the embodiment of FIG. 35. FIG. 37A shows a step-like profile of the original image signal, which corresponds to the region in the vicinity of an edge in the image, and the profiles of the unsharp image signals having been formed from the original image signal. FIG. 37B shows the profile of the band-limited image signal with respect to the signals shown in FIG. 37A. FIG. 37C shows the profile of the auxiliary image signal containing the signal of the frequency band, which is lower by a single level than the frequency band of the band-limited image signal shown in FIG. 37B. FIG. 37D shows the profile of the magnification ratio signal, which is obtained when the auxiliary image signal shown in FIG. 37C is processed with the function g. FIG. 37E shows the profile of the processed signal, which is obtained when the restricted image signal having been obtained by processing the band-limited image signal shown in FIG. 37B with the function f is multiplied by the magnification ratio signal shown in FIG. 37D. The value K shown in FIG. 37C is identical with the value K shown in FIG. 36. It is illustrated that, when the value of the auxiliary image signal shown in FIG. 37C becomes equal to K, the value of the magnification ratio signal shown in FIG. 37D becomes equal to 0. If the band-limited image signal shown in FIG. 37B is converted merely such that its absolute value may become small, the shape of the peak of the signal will become smooth, but the rise portion of the signal will be kept sharp. On the other hand, in the processed signal shown in FIG. 37E, its rise portion is smooth. In cases where the rise portion of each band-limited image signal is thus rendered smooth, a step-like artifact can be prevented from occurring at the boundaries among the frequency bands in the signal, which is obtained by integrating the band-limited image signals.

The auxiliary image signals, which are processed with the function g, are not limited to those described above. In a different embodiment of the image processing apparatus in accordance with the present invention, the image processing is carried out with Formula (11) shown below.

$$Sproc = Sorg + \beta(Sorg) \cdot Fusm(Sorg, Sus1, Sus2, \ldots, SusN) \quad (11)$$

$$Fusm(Sorg, Sus1, Sus2, \ldots, SusN) =$$

$$\{f1(Sorg - Sus1) \cdot g(Sorg - Sus2) +$$

$$f2(Sus1 - Sus2) \cdot g(Sorg - Sus3) + \ldots +$$

$$fk(Susk - 1 - Susk) \cdot g(Sorg - Susk + 1) + \ldots +$$

$$fN(SusN - 1 - SusN) \cdot g(Sorg - SusN + 1)\}$$

wherein Sproc represents the image signal, in which the high frequency components have been emphasized, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and β(Sorg) represents the emphasis coefficient determined in accordance with the original image signal.

FIGS. 38A-1, 38B-1, 38C-1, 38 D-1, and 38E-1 show the effects obtained when an image signal corresponding to a region in the vicinity of an edge in the image, which edge has a high level of contrast, is processed in the embodiment utilizing Formula (11). FIG. 38A-1 shows a step-like profile of the original image signal, which corresponds to the region in the vicinity of an edge in the image, and the profiles of the unsharp image signals having been formed from the original image signal. FIG. 38B-1 shows the profile of the band-limited image signal with respect to the signals shown in FIG. 38A-1. FIG. 38C-1 shows the profile of the auxiliary image signal containing the signal of the frequency band, which is lower by a single level than the frequency band of the band-limited image signal shown in FIG. 38B-1. FIG. 38D-1 shows the profile of the magnification ratio signal, which is obtained when the auxiliary image signal shown in FIG. 38C-1 is processed with the function g. FIG. 38E-1 shows the profile of the processed image signal, which is obtained when the restricted image signal having been obtained by processing the band-limited image signal shown in FIG. 38B-1 with the function f is multiplied by the magnification ratio signal shown in FIG. 38D-1. FIGS. 38A-2, 38B-2, 38C-2, 38D-2, and 38E-2 show the effects obtained when an image signal corresponding to a region in the vicinity of an edge in the image, which edge has a low level of contrast, is processed in the embodiment utilizing Formula (11). FIGS. 38A-2, 38B-2, 38C-2, 38D-2, and 38E-2 are the views respectively similar to FIGS. 38A-1, 38B-1, 38C-1, 38D-1, and 38E-1. As illustrated in these figures, in cases where the value of Sorg−Susk is used as the value to be processed with the function g, the signal obtained from the conversion becomes small as for the edge having a high level of contrast. As for the edge having a high level of contrast, the signal obtained from the conversion has a level close to the level of the original band-limited image signal.

The signals obtained from the conversion are then integrated, and the integration signal thus obtained is added to the original image signal Sorg for the purposes of emphasis. In such cases, the effects can be obtained such that the edge having a high level of contrast may not be emphasized strongly, and the edge having a low level of contrast is emphasized more strongly than the edge having the high level of contrast.

The two kinds of the formulas have the effects described above. Various modifications are possible as for the functions f and g and how the band-limited image signal, which is to be processed with the function g, is formed.

A further different embodiment of the image processing method and apparatus in accordance with the present invention will be described hereinbelow. In this embodiment, the processes carried out by the unsharp image signal forming means 1, the band-limited image signal forming means 2, the integration means 4, and the frequency emphasis processing means 5 are the same as those in the aforesaid embodiment shown in FIG. 12. Therefore, only the process carried out by the conversion means 3 will be described hereinbelow.

Figure 39:
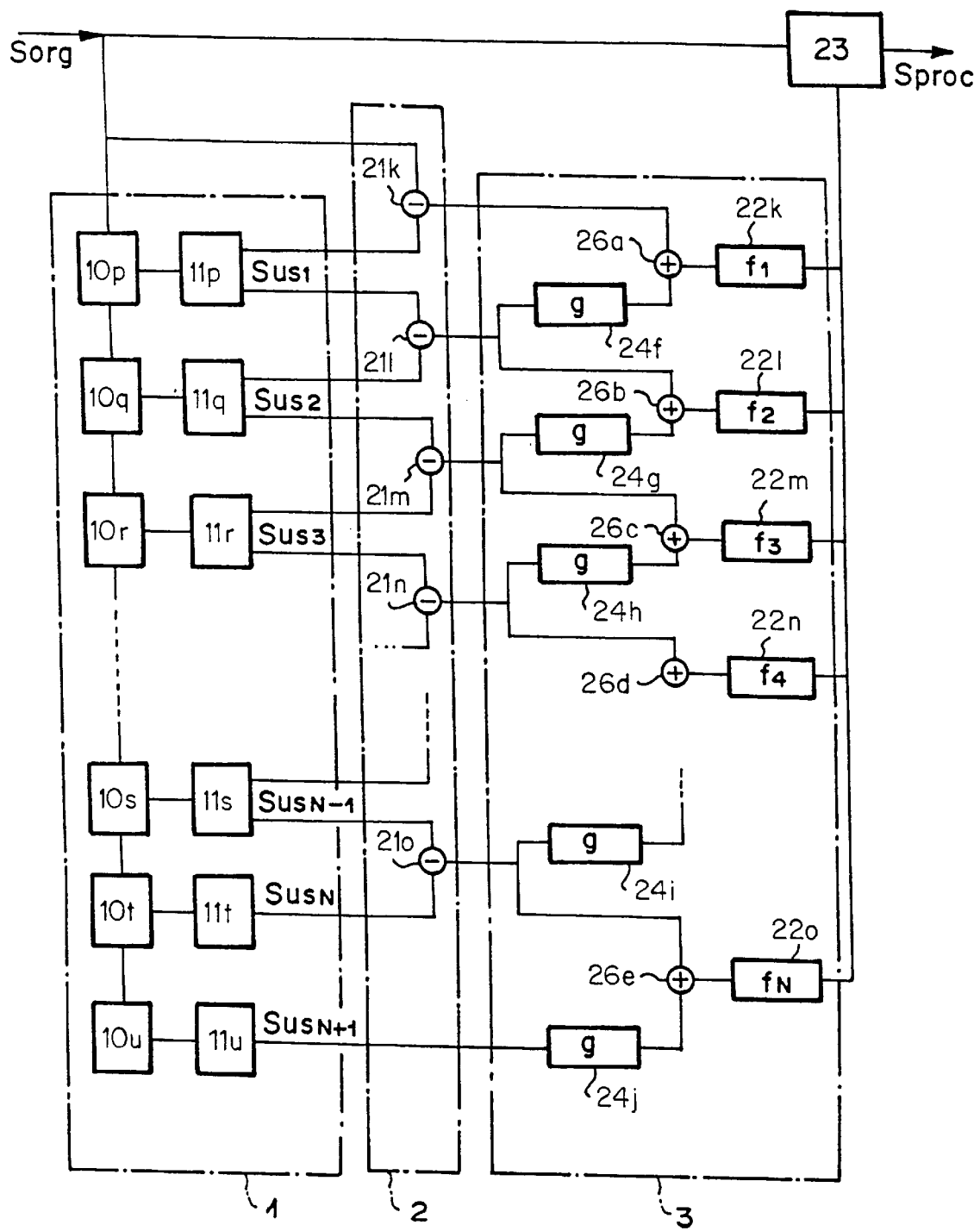
FIG. 39 is a block diagram showing a further different embodiment of the image processing apparatus in accordance with the present invention.

FIG. 39 is a block diagram showing this embodiment of the image processing apparatus in accordance with the present invention. As in the aforesaid embodiment, the band-limited image signals are formed from the original image signal Sorg and the plurality of the unsharp image signals Susk, which have been formed by the unsharp image signal forming means 1. Each of the band-limited image signals is obtained from the subtracter 21k–21o, which subtracts the unsharp image signals Susk of two adjacent frequency bands (as for the original image signal Sorg, Sorg and Sus1) from each other. Specifically, the values of Sorg−Sus1, Sus1−Sus2, . . . , SusN−1−SusN are calculated successively, and the plurality of the band-limited image signals are thereby obtained.

Thereafter, each of the band-limited image signals having thus been obtained is converted in the conversion means 3. As illustrated in FIG. 39, in the conversion means 3, a band-limited image signal to be converted, which is of a certain frequency band, and a signal (i.e., an auxiliary image signal), which has been obtained by converting a low frequency side band-limited image signal of a frequency band, that is lower by a single level than the frequency band of the band-limited image signal to be converted, with a function g in the converter 24f–24j, are added to each other. In this manner, a composite band-limited image signal is obtained. The composite band-limited image signal having been obtained from the addition is then converted with a function fk in the converter 22k–22o. The converter 24 for carrying out the conversion with the function g corresponds to an auxiliary image signal forming means, and an adder 26a–26e corresponds to a composite band-limited image signal forming means.

Figure 40:
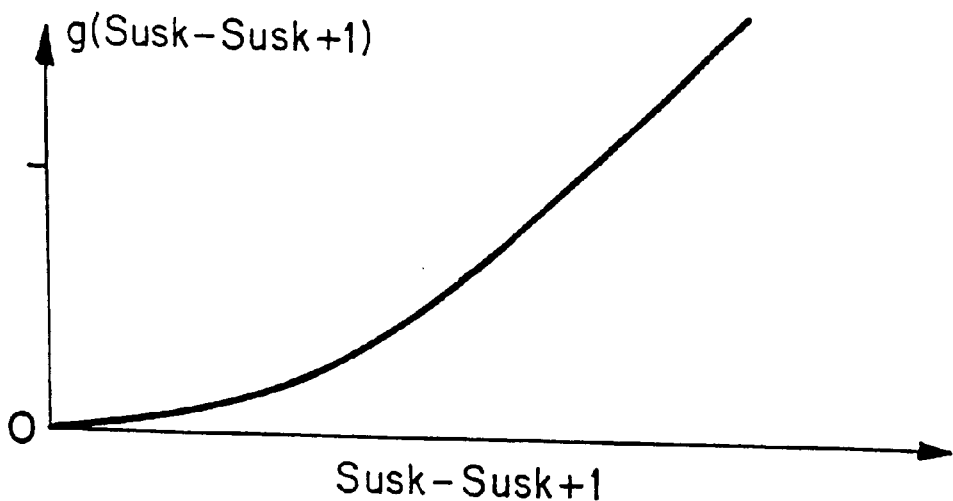
FIG. 40 is a graph showing an example of a function for forming an auxiliary image signal by converting a band-limited image signal.
Figure 41:
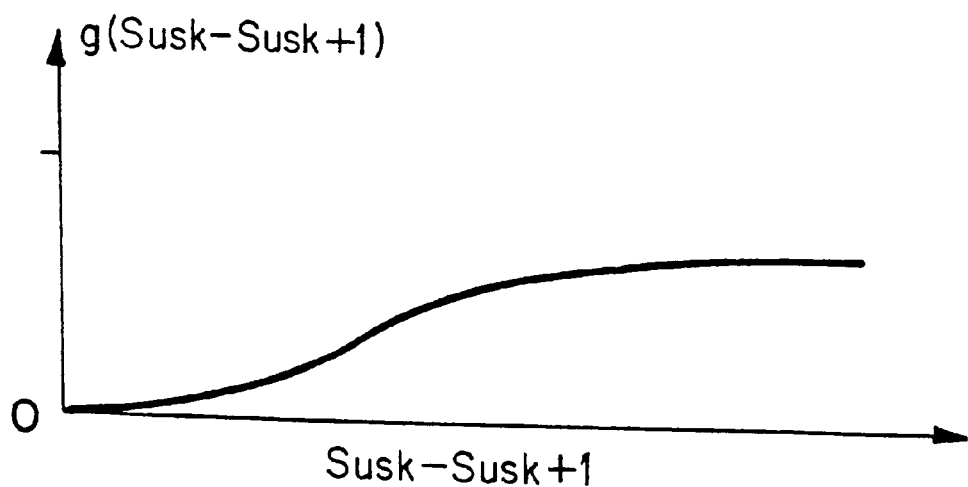
FIG. 41 is a graph showing a different example of a function for forming an auxiliary image signal by converting a band-limited image signal.

As the function g, for example, the function shown in FIG. 40 may be employed. The function g shown in FIG. 40 has the characteristics such that the function may pass through the origin, such that the inclination of the function at the origin may be equal to approximately 0, such that the inclination of the function may increase gradually as the value to be processed becomes large, and such that the inclination of the function may ultimately become equal to approximately 1. Specifically, with this function, the degree of restriction is set to be high when the level of the signal to be processed is low. Also, as the level of the signal to be processed becomes high, the degree of restriction is set to be low. In the processing described above, the portion of this function, at which the inclination increases gradually from the origin, affects the wave form of the rise portion of the auxiliary image signal. Specifically, in cases where the conversion is carried out with this function, a sharp rise portion can be rendered smooth. The level of the actual band-limited image signal is limited, and therefore any of functions, the inclination of which increases gradually from 0 in the region in the vicinity of the origin, may be employed as the function g. For example, a function shown in FIG. 41 may also be employed. In this embodiment, signal amplification is not carried out, and therefore the inclination of the function is set to be at most 1. However, the effects of the present invention are obtained from the gradual increase of the inclination of the function in the region in the vicinity of the origin. Therefore, in so far as the inclination of the function in the region in the vicinity of the origin increases gradually, the inclination of the function need not necessarily be limited to at most 1.

The functions f1 to fN, which are used in this embodiment, may be identical with one another or may be different from one another. They may be set arbitrarily in accordance with the characteristics of the image processing which is to be carried out. In this embodiment, as the functions f1 to fN, by way of example, the functions shown in FIG. 25 are used.

The converted image signals, which have been obtained from the conversion means 3, are fed into the operation device 23, which is provided with the integration means 4 and the frequency emphasis processing means 5. In the operation device 23, the processing is carried out in the manner described below. Firstly, the plurality of the converted image signals are integrated, and the integration signal is thereby obtained. The integration signal is multiplied by an emphasis coefficient $\beta$, which has a value determined in accordance with the value of the original image signal Sorg. The resulting product is then added to the original image signal Sorg, and the processed image signal Sproc is thereby obtained. This process and the other processes described above may be represented by Formula (12) shown below.

$$Sproc = Sorg + \beta(Sorg) \cdot Fusm(Sorg, Sus1, Sus2, \ldots, SusN) \quad (12)$$

$$Fusm(Sorg, Sus1, Sus2, \ldots, SusN) =$$

$$[f1\{(Sorg - Sus1) + g(Sus1 - Sus2)\} +$$

$$f2\{(Sus1 - Sus2) + g(Sus2 - Sus3)\} + \ldots +$$

$$fk\{(Susk - 1 - Susk) + g(Susk - Susk + 1)\} + \ldots +$$

$$fN\{(SusN - 1 - SusN) + g(SusN - SusN + 1)\}]$$

wherein Sproc represents the image signal, in which the high frequency components have been emphasized, Sorg represents the original image signal, Susk (k=1 to N+1) represents the unsharp mask image signal, fk (k=1 to N) represents the function for converting the composite band-limited image signal, g represents the function for converting the band-limited image signal and thereby obtaining the auxiliary image signal, and $\beta(Sorg)$ represents the emphasis coefficient determined in accordance with the original image signal.

FIGS. 42A, 42B, 42C, 42D, 42E, and 42F show the effects obtained when an image signal corresponding to a region in the vicinity of an edge in the image is processed in the embodiment of FIG. 39. FIG. 42A shows a step-like profile of the original image signal, which corresponds to the region in the vicinity of an edge in the image, and the profiles of the unsharp image signals having been formed from the original image signal. FIGS. 42B 42C show the profiles of the band-limited image signals with respect to the signals shown in FIG. 42A. In cases where the band-limited image signal shown in FIG. 42B is taken as the band-limited image signal to be converted, the band-limited image signal shown in FIG. 42C is taken as the low frequency side band-limited image signal. FIG. 42D shows the profile of the auxiliary image signal, which is obtained when the low frequency side band-limited image signal shown in FIG. 42C is processed with the function g. FIG. 42E shows the profile of the composite band-limited image signal, which is obtained by adding the band-limited image signal to be converted, that is shown in FIG. 42B, and the auxiliary image signal, which is shown in FIG. 42D, to each other. FIG. 42F shows the profile of the converted image signal, which is obtained by processing the composite band-limited image signal of FIG. 42E with the function f. If the band-limited image signal shown in FIG. 42B is converted merely such that its absolute value may become small, the shape of the peak of the signal will become smooth, but the rise portion of the signal will be kept sharp. On the other hand, in the converted image signal of FIG. 42F, its rise portion is smooth. In cases where the rise portion of each band-limited image signal is thus rendered smooth, a step-like artifact can be prevented from occurring at the boundaries among the frequency bands in the signal, which is obtained by integrating the band-limited image signals.

In this embodiment, various modifications are possible as for, for example, the functions f and g.

Embodiments of the dynamic range compressing method and apparatus in accordance with the present invention, wherein the dynamic range of the original image signal is compressed by using the unsharp image signals, will be described hereinbelow.

Figure 43:
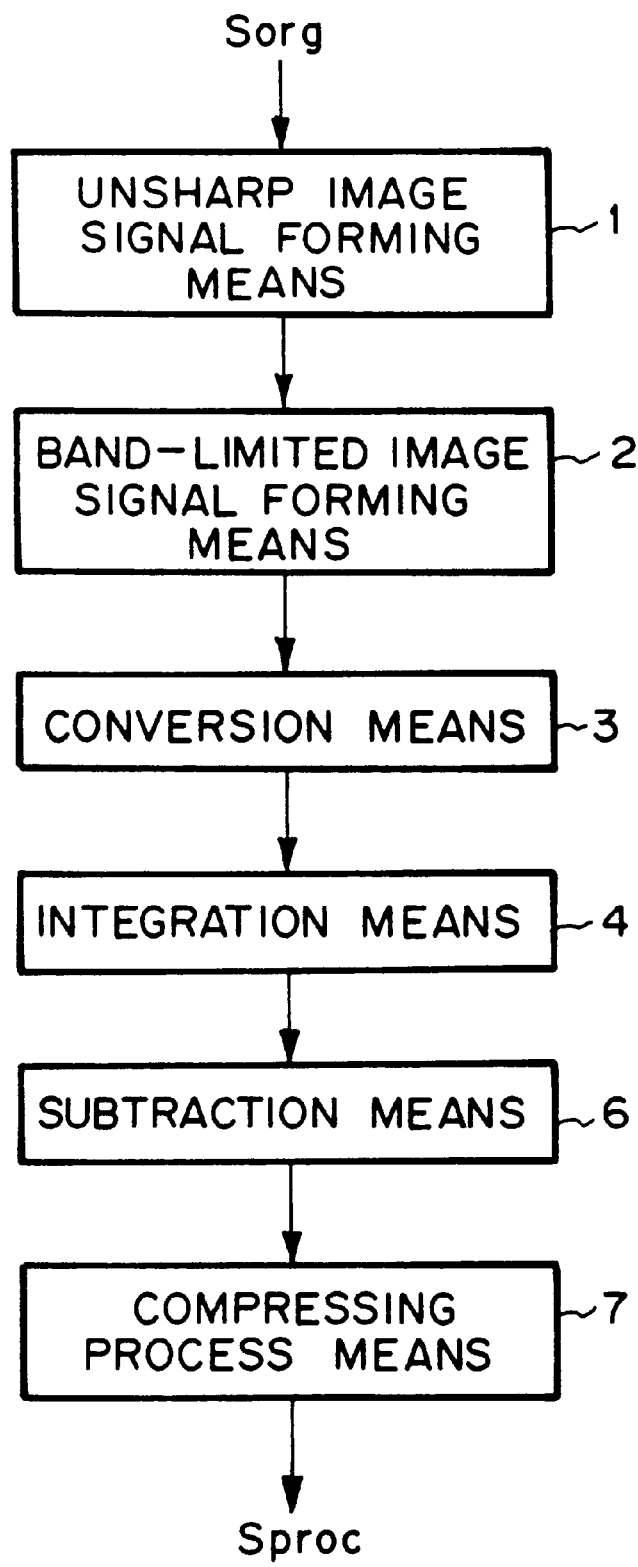
FIG. 43 is a block diagram showing the concept behind the dynamic range compressing apparatus in accordance with the present invention.

FIG. 43 is a block diagram showing an embodiment of the dynamic range compressing apparatus in accordance with the present invention, in which the multi-resolution transforming apparatus shown in FIG. 1 is employed as an unsharp image signal forming means. As illustrated in FIG. 43, the dynamic range compressing apparatus in accordance with the present invention comprises an unsharp image signal forming means 1 for forming multi-resolution unsharp image signal Susk, where k=1 to n, which have different frequency response characteristics, from a received original image signal Sorg. The dynamic range compressing apparatus also comprises a band-limited image signal forming means 2 for forming a plurality of band-limited image signals from the unsharp image signals Susk, which have been formed by the unsharp image signal forming means 1. The dynamic range compressing apparatus further comprises a conversion means 3 for carrying out a converting process on at least a single band-limited image signal, which is among the plurality of the band-limited image signals having been formed by the band-limited image signal forming means 2, such that at least a portion of the band-limited image signal may become small. The dynamic range compressing apparatus still further comprises an integration means 4 for integrating the converted band-limited image signals, which have been obtained from the conversion means 3, and thereby forming an integration signal. The dynamic range compressing apparatus also comprises a subtraction means 6 for subtracting the integration signal from the original image signal Sorg and thereby obtaining a difference signal. The dynamic range compressing apparatus further comprises a compressing process means 7 for converting the difference signal, adding the converted difference signal to the original image signal Sorg, and thereby obtaining a processed image signal Sproc, in which the dynamic range of the original image has been compressed.

Basically, the constitution of the embodiment of the dynamic range compressing apparatus may be illustrated as in FIG. 13, which shows the image processing apparatus for carrying out the frequency emphasis processing described above. However, various means incorporated in the operation device 23 are different from those for the frequency emphasis processing. The embodiment of the dynamic range compressing apparatus will hereinbelow be described with reference to FIG. 13.

As illustrated in FIG. 13, the plurality of the unsharp image signals Susk, which have been formed by the unsharp image signal forming means 1, are then processed in the band-limited image signal forming means 2 and the conversion means 3. Firstly, the band-limited image signals are formed from the original image signal Sorg and the plurality of the unsharp image signals Susk, which have been formed by the unsharp image signal forming means 1. Each of the band-limited image signals is obtained from the subtracter 21, which subtracts the unsharp image signals Susk of two adjacent frequency bands (as for the original image signal Sorg, Sorg and Sus1) from each other. Specifically, the values of Sorg–Sus1, Sus1–Sus2, . . . , SusN–1–SusN are calculated successively, and the plurality of the band-limited image signals are thereby obtained.

Thereafter, in the conversion means 3, each of the band-limited image signals is converted in accordance with the level of the band-limited image signal. The conversion of each band-limited image signal is carried out by the converter 22 by utilizing, for example, the function f shown in FIG. 15. As in the frequency emphasis processing, the same function may be utilized for the respective band-limited image signals, or different functions may be utilized for the respective band-limited image signals.

Figure 44:
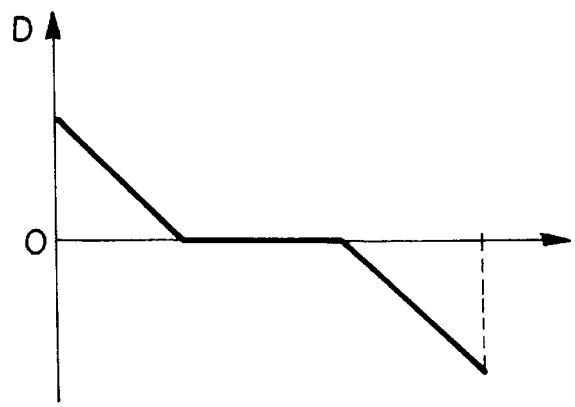
FIG. 44 is a graph showing an example of a monotonically decreasing function for converting a difference signal.
Figure 45A:
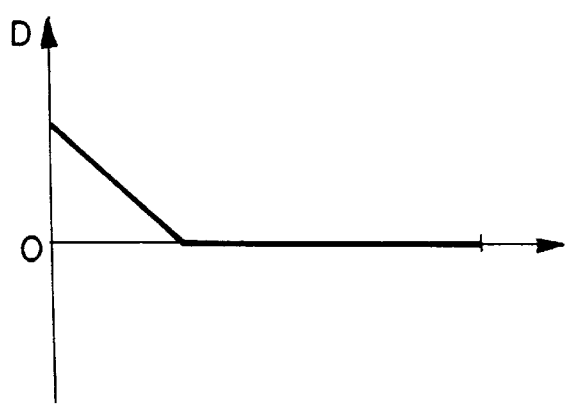
FIGS. 45A and 45B are graphs showing different examples of monotonically decreasing functions for converting a difference signal.
Figure 45B:
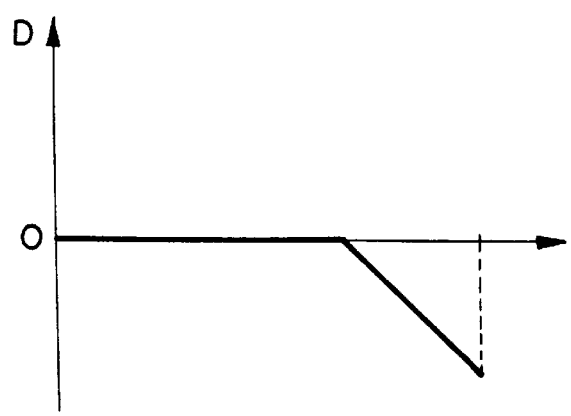
Figure 46:
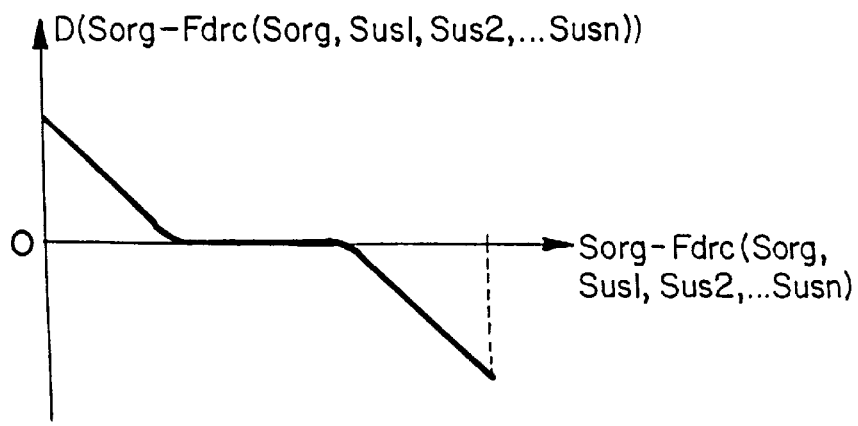
FIG. 46 is a graph showing a further different example of a monotonically decreasing function for converting a difference signal.
Figure 47A:
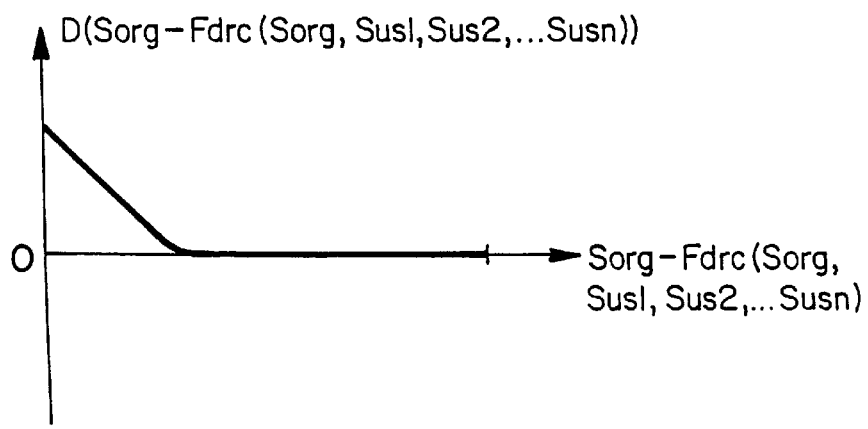
FIGS. 47A and 47B are graphs showing still further different examples of monotonically decreasing functions for converting a difference signal.
Figure 47B:
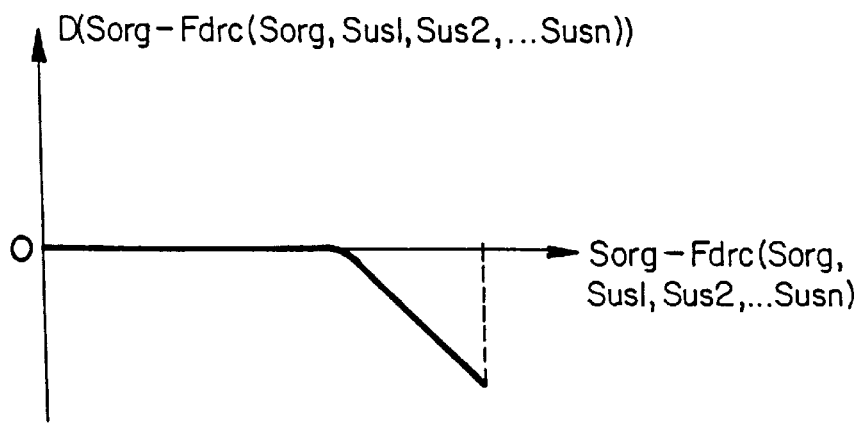

The band-limited image signals, which have been converted with the function f, are fed into the operation device 23, which is provided with the integration means 4, the subtraction means 6, and the compressing process means 7 described above. In the operation device 23, the processing is carried out in the manner described below. Firstly, the band-limited image signals, which have been converted with the function f, are integrated, and the integration signal is thereby obtained. In the subtraction means 6, the integration signal is subtracted from the original image signal Sorg, and the difference signal is thereby obtained. Thereafter, in the compressing process means 7, the difference signal is converted, the converted difference signal is added to the original image signal Sorg, and the processed image signal Sproc is thereby obtained. As a function D for converting the difference signal, by way of example, a monotonously decreasing function shown in FIG. 44 may be used. Alternatively, as the function D, a function as illustrated in FIG. 45A may be employed which has the characteristics such that the value obtained with the function may change only with respect to a region of a comparatively small signal value. As another alternative, as the function D, a function as illustrated in FIG. 45B may be employed which has the characteristics such that the value obtained with the function may change only with respect to a region of a comparatively large signal value. As a further alternative, as the function D, a monotonously decreasing function as illustrated in FIG. 46, in which the differential coefficient is continuous, may be employed. As a still further alternative, as the function D, a function as illustrated in FIG. 47A may be employed which has the characteristics such that the value obtained with the function may change only with respect to a region of a comparatively small signal value, and in which the function pattern is not bent sharply. As another alternative, as the function D, a function as illustrated in FIG. 47B may be employed which has the characteristics such that the value obtained with the function may change only with respect to a region of a comparatively large signal value, and in which the function pattern is not bent sharply.

The aforesaid processing carried out by the band-limited image signal forming means 2, the conversion means 3, the integration means 4, the subtraction means 6, and the compressing process means 7 may be represented by Formula (13) shown below.

$$Sproc = Sorg + D(Sorg - Fdrc(Sorg, Sus1, Sus2, \ldots, SusN)) \quad (13)$$

$$Fdrc(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

Figure 48:
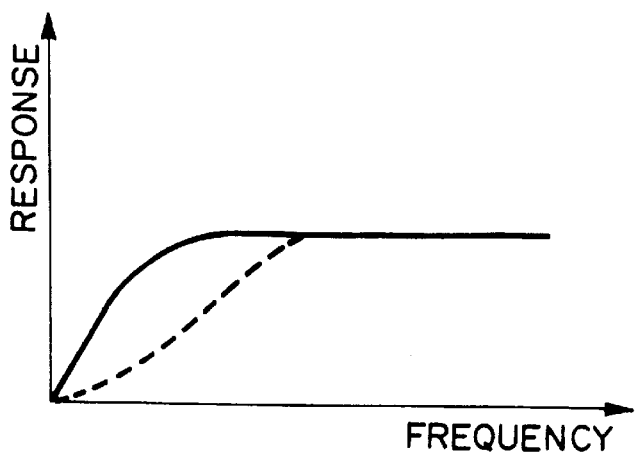
FIG. 48 is a graph showing examples of frequency characteristics of integration signals.
Figure 49:
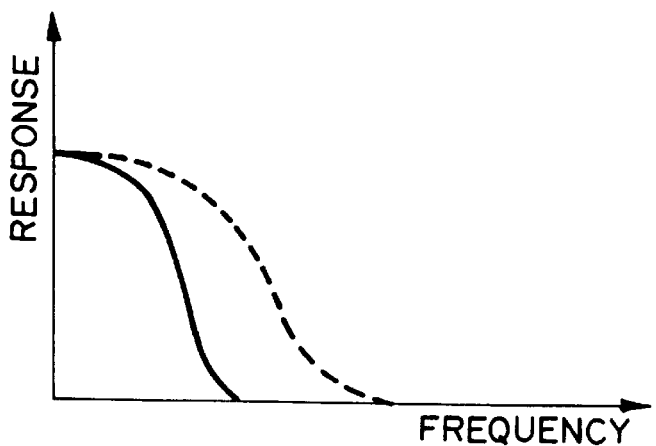
FIG. 49 is a graph showing examples of frequency characteristics of difference signals.

The integration signal having been obtained from the integration means 4 has the frequency characteristics shown in FIG. 48. In FIG. 48, the solid line indicates the frequency characteristics of the integration signal corresponding to a flat region in which no edge is located. Also, the broken line indicates the frequency characteristics of the integration signal corresponding to a region in the vicinity of the edge. The frequency characteristics of the difference signal obtained by subtracting the integration signal from the original image signal Sorg are shown in FIG. 49. The band-limited image signals described above have the characteristics such that, in a flat region in which the change in the image density of the original image is comparatively small, the absolute value of the signal value of each band-limited image signal may be small in each frequency band. On the other hand, as illustrated in FIG. 52, in a region in the vicinity of an edge in the image, at which the image density changes sharply, in cases where the band-limited image signal is of a comparatively low frequency band, i.e. in cases where the size of the unsharp mask used for obtaining the unsharp image signal Susk is comparatively large, the edge in the image is contained in the unsharp mask, which is set for a picture element located in the vicinity of the edge. Therefore, in such cases, the band-limited image signal is affected by the edge, and the absolute value of the signal value of the band-limited image signal becomes comparatively large. In this manner, a portion, which does not constitute the edge in the image, is affected by the image density value of the edge, and an artifact, such as overshoot or undershoot, occurs at the edge portion in the image, which is obtained from the dynamic range compressing process.

Therefore, the band-limited image signal is converted with the aforesaid function fk such that, in cases where the absolute value of the band-limited image signal is larger than the threshold value Th1, the absolute value may become small. The absolute values of the band-limited image signals having thus been converted are integrated, and the obtained integration signal is subtracted from the original image signal Sorg. In this manner, a signal corresponding to the unsharp image signal Sus in Formula (3) shown above is obtained. In the embodiment of the dynamic range compressing apparatus in accordance with the present invention, the term "unsharp image signal" is used in a narrow sense, and the signal corresponding to the unsharp image signal Sus in Formula (3) shown above is referred to as the difference signal.

As illustrated in FIG. 49, in the flat region in which no edge is located, the difference signal has the frequency characteristics indicated by the solid line. Also, as indicated by the broken line in FIG. 49, in the region in the vicinity of an edge, the difference signal has the frequency characteristics such that it may also contain a comparatively high frequency band. Thus the same effects can be obtained as those obtained when the size of the unsharp mask used for obtaining the difference signal is set to be smaller than the size of the actual unsharp mask in region in the vicinity of an edge.

In this manner, the band-limited image signal corresponding to the region in the vicinity of an edge and having a signal value, the absolute value of which is comparatively large, is converted into the signal, which has small influence upon the signal concerning the low frequency components to be added to the original image signal Sorg. Accordingly, in the region in the vicinity of an edge, at which the image density changes sharply, the influence of a signal, which causes an artifact to occur, can be weakened. As a result, an image having no artifact and having good image quality can be obtained from the dynamic range compressing process.

Figure 50:
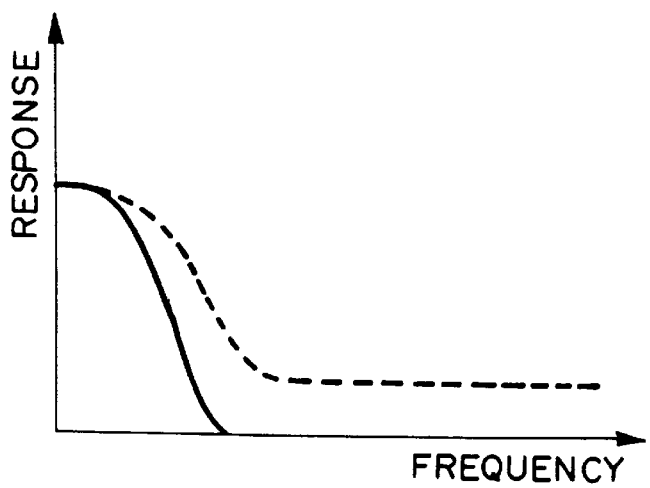
FIG. 50 is a graph showing different examples of frequency characteristics of difference signals.

In the embodiment described above, the processed image signal Sproc is obtained with Formula (13). Alternatively, the processed image signal Sproc may be obtained with Formula (14) shown below. Formula (13) and Formula (14) are different in the point described below. Specifically, in Formula (13), the band-limited image signal is obtained by subtracting the signals of two adjacent frequency bands from each other. On the other hand, in Formula (14), the band-limited image signal is obtained by subtracting each of the unsharp image signals Susk of all frequency bands from the original image signal Sorg. The difference signal obtained in Formula (14) has the frequency characteristics shown in FIG. 50. As illustrated in FIG. 50, in the flat region in which no edge is located, the difference signal has the frequency characteristics indicated by the solid line. Also, as indicated by the broken line in FIG. 50, in the region in the vicinity of an edge, the difference signal has the frequency characteristics such that it may also contain a comparatively high frequency band. Thus the same effects can be obtained as those obtained when the size of the unsharp mask for obtaining the unsharp image signal Sus is set to be smaller than the size of the actual unsharp mask in region in the vicinity of an edge. When the frequency characteristics indicated by the broken line in FIG. 50 are compared with those in FIG. 49, the response in FIG. 50 becomes low over the entire frequency band. Therefore, in the frequency characteristics shown in FIG. 50, the response is obtained also in the flat region, which is not located in the vicinity of an edge. Accordingly, the processed image signal Sproc should preferably be obtained with Formula (13). With Formula (13), the response in the flat region does not become low, and only the response in the region in the vicinity of an edge becomes low.

$$Sproc = Sorg + D(Sorg - Fdrc(Sorg, Sus1, Sus2, \ldots, SusN)) \quad (14)$$

$$Fdrc(Sorg, Sus1, Sus2, \ldots, SusN) =$$

$$(1/N) \cdot \{f1(Sorg - Sus1) + f2(Sorg - Sus2) + \ldots +$$

$$fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

Also, in the embodiment of the dynamic range compressing apparatus described above, as illustrated in FIG. 15, the function for converting the band-limited image signal is set such that, in cases where the absolute value of the band-limited image signal is larger than the threshold value Th1, the absolute value may become small. Alternatively, for example, as illustrated in FIG. 18, the function for converting the band-limited image signal may be set such that, in cases where the absolute value of the band-limited image signal is larger than the threshold value Th1, the absolute value may become small, and such that, in cases where the absolute value of the band-limited image signal is smaller than a threshold value Th2, the absolute value may become small.

In this manner, a correction may be made such that, as the absolute value of the band-limited image signal becomes smaller than the threshold value Th2, which is smaller than the threshold value Th1, the absolute value of the band-limited image signal may be converted to a small value. In such cases, the response with respect to the components, which have a small absolute value of a signal value and may be considered as being noise in the image, can be rendered low. As a result, noise in the processed image can be reduced.

Further, in the embodiments of the dynamic range compressing apparatus described above, the processed image signal Sproc is obtained with Formula (13) or Formula (14). As another alternative, the processed image signal Sproc may be obtained with Formula (15) shown below. Formula (14) and Formula (15) are different in the point described below. Specifically, in Formula (14), the band-limited image signal is obtained by subtracting each of the unsharp image signals Susk of all frequency bands from the original image signal Sorg. On the other hand, in Formula (15), each of the unsharp image signals Susk, where k=2 to N, is subtracted from the unsharp image signal Sus1. In the processing carried out with Formula (14), the high frequency components, which can be considered as being noise in the image, are also emphasized, and therefore noise becomes perceptible in the resulting processed image. On the other hand, in the processing carried out with Formula (15), the high frequency components have been eliminated. Therefore, noise does not become perceptible, and a processed image having good image quality can be obtained.

$$Sproc = Sorg + D(Sorg - Fdrc(Sus1, Sus2, \ldots, SusN)) \quad (15)$$

$$Fdrc(Sus1, Sus2, \ldots, SusN) =$$

$$(1/N) \cdot \{f2(Sus1 - Sus2) + f3(Sus1 - Sus3) + \ldots +$$

$$fk(Sus1 - Susk) + \ldots + fN(Sus1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

As a further alternative, the processing may be carried out with Formula (16) shown below. In Formula (13) shown above, the band-limited image signal (Sorg–Sus1) is used. On the other hand, in Formula (16), the band-limited image signal (Sorg–Sus1) is not used. As a result, the highest frequency components shown in FIG. 14 are eliminated. Therefore, as in the processing carried out with Formula (15), the processed image signal Sproc can be obtained such that the high frequency components may have been eliminated. Accordingly, noise does not become perceptible, and a processed image having good image quality can be obtained.

$$Sproc = Sorg + D(Sorg - Fdrc(Sus1, Sus2, \ldots, SusN)) \quad (16)$$

$$Fdrc(Sus1, Sus2, \ldots, SusN) =$$

$$\{f2(Sus1 - Sus2) + f3(Sus2 - Sus3) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

Figure 15:
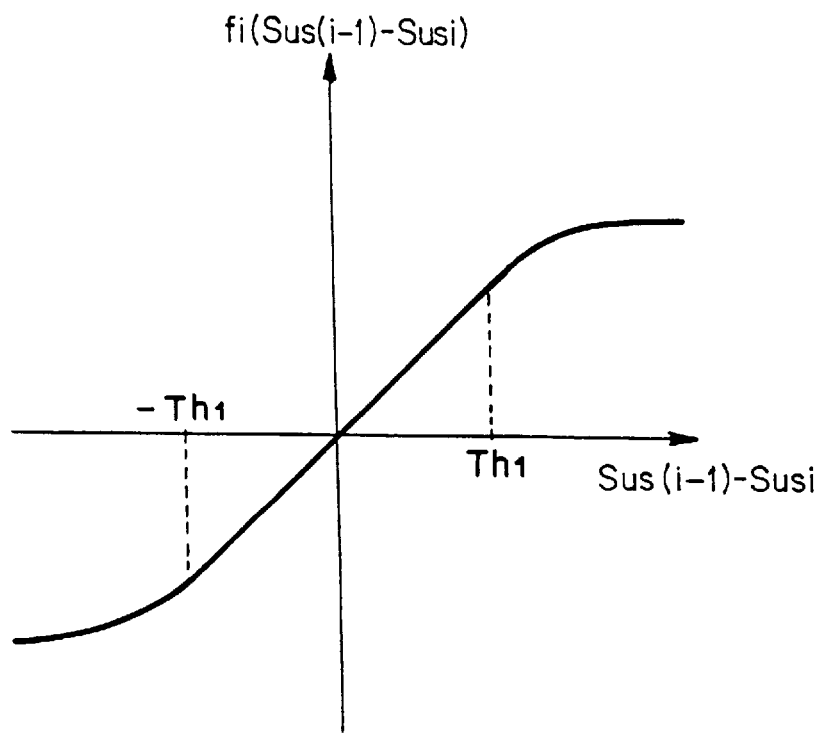
FIG. 15 is a graph showing an example of a function, which is used in a converting process carried out on a band-limited image signal in a conversion means.

In the dynamic range compressing process, as in the frequency emphasis processing, the shape of the function f shown in FIG. 15 should preferably be altered in accordance with the portion of the object, the image of which was recorded, or the frequency bands of the band-limited image signals.

For example, as for a mamma image, the change in the signal value is sharp and large at a boundary between the background region and the skin pattern. Therefore, if the processing is carried out by eliminating the signal of the high frequency band and using only the signal of the low frequency band, an artifact will occur. Therefore, in cases where such an image is processed, the converting process should be carried out such that the signal of the high frequency band may also be contained. Also, as for a chest image, there is no sharp and large signal change as in the mamma image. Therefore, even if the signal of the high frequency components is not contained in the converting process, an artifact as in the mamma image will not occur. Accordingly, in cases where the image, such as the chest image, is processed, only the signal of the low frequency components may be subjected to the converting process. In cases where the processing is carried out such that the absolute values of the band-limited image signals may be changed in accordance with the frequency bands of the band-limited image signals or the portion of the object, the image of which was recorded, an image having good image quality in accordance with the portion of the object, the image of which was recorded, or the frequency bands can be obtained.

The conversion of the band-limited image signals in the conversion means 3 may be carried out regardless of the aforesaid threshold value Th1 and in accordance with a plurality of functions f1 to fN, which vary for different frequency bands, such that the absolute value of each band-limited image signal may be converted to a value, which is not larger than the absolute value of the band-limited image signal and is determined in accordance with the absolute value of the band-limited image signal. As the functions f1 to fN, a combination of appropriate functions should preferably be set in accordance with the characteristics of the image processing which is to be achieved.

In the embodiment which is free from the threshold value, the processed image signal Sproc can be adjusted, such that it may have arbitrary frequency characteristics, by varying the functions, which are used in the conversion means 3, for different frequency bands. Therefore, as in the frequency emphasis processing, the frequency characteristics of the processed image signal Sproc can be adjusted in accordance with the conditions, which are required for the images to be processed in the respective apparatuses described above.

Figure 51:
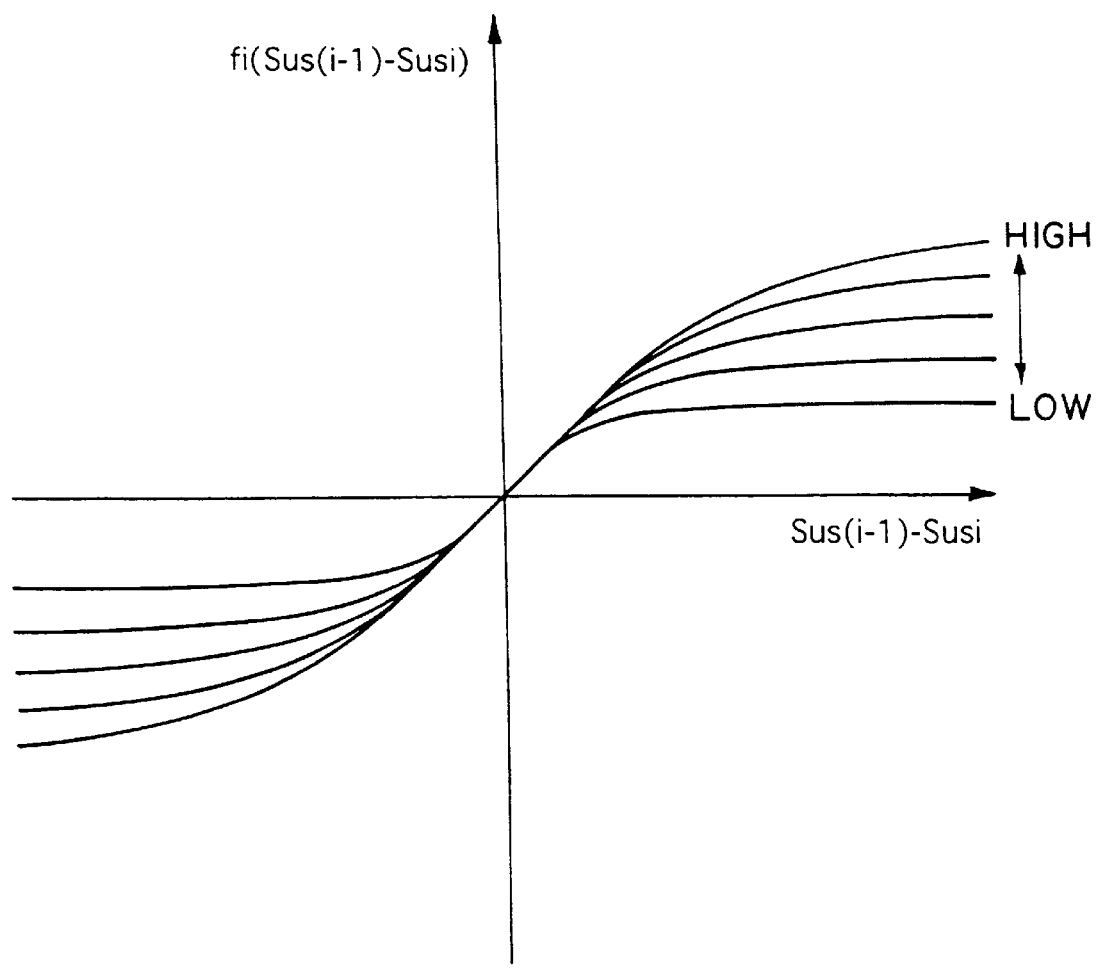
FIG. 51 is a graphs showing examples of functions used in a converting process in a conversion means.

In the cases of the dynamic range compressing process, as the functions varying for different frequency bands, for example, the functions shown in FIG. 51 are used. Each of the functions illustrated in FIG. 51 converts the band-limited image signal such that the absolute value of the band-limited image signal may be converted to a value, which is not larger than the absolute value of the band-limited image signal and is determined in accordance with the absolute value of the band-limited image signal. Also, each of the functions carries out the conversion such that, as for the band-limited image signal, the absolute value of which is larger than a predetermined value, the value of the converted image signal may become approximately equal to a predetermined level. As illustrated in FIG. 51, in a function for processing a low frequency band, the aforesaid predetermined value is set to be smaller than those in the other functions.

In other words, the functions have the characteristics such that each function may pass through the origin, such that the inclination of the function may be equal to at most 1 regardless of the value of the band-limited image signal processed with the function, and such that the inclination of the function may become equal to 0 or may converge to 0 as the absolute value of the signal value of the band-limited image signal processed with the function becomes large. The functions also have the characteristics such that, in a function for processing a low frequency band, the absolute value of the processed signal value, which absolute value is associated with the point in the function where the inclination of the function becomes equal to 0 or a predetermined value close to 0, may take a smaller value than those in the other functions. The functions have the effects such that the edge information can be kept as much as possible within a narrow dynamic range.

It is also possible to employ the functions shown in FIG. 26, which are employed in the frequency emphasis processing. These functions have the effects in that the rise of the integration signal shown in FIG. 29D, which has been obtained by integrating the converted image signals, can be rendered natural. In this manner, a smooth processed image signal Sproc can be obtained.

Further, functions, which have both of the characteristics of the two kinds of the functions described above, may be employed, and the effects of both of the functions may thereby be obtained. In cases where the functions used for the respective frequency bands are varied in accordance with the characteristics of the image processing which is to be achieved, the frequency characteristics of the entire frequency band can be adjusted appropriately.

A different embodiment of the dynamic range compressing method and apparatus in accordance with the present invention will be described hereinbelow. In this embodiment, the processes carried out by the unsharp image signal forming means 1, the band-limited image signal forming means 2, the integration means 4, the subtraction means 6, and the compressing process means 7 are the same as those in the embodiment described above with reference to FIG. 43. Therefore, only the process carried out by the conversion means 3 will be described hereinbelow.

Basically, the constitution of the embodiment of the dynamic range compressing apparatus described below may be illustrated as in FIG. 35, which shows the image processing apparatus for carrying out the frequency emphasis processing described above. However, various means incorporated in the operation device 23 are different from those for the frequency emphasis processing. The embodiment of the dynamic range compressing apparatus will hereinbelow be described with reference to FIG. 35.

As in the aforesaid embodiment, the band-limited image signals are formed from the original image signal Sorg and the plurality of the unsharp image signals Susk, which have been formed by the unsharp image signal forming means 1. Each of the band-limited image signals is obtained from the subtracter 21, which subtracts the unsharp image signals Susk of two adjacent frequency bands (as for the original image signal Sorg, Sorg and Sus1) from each other. Specifically, the values of Sorg−Sus1, Sus1−Sus2, . . . , SusN−1−SusN are calculated successively, and the plurality of the band-limited image signals are thereby obtained. In this embodiment, for example, as for the band-limited image signal Sus1−Sus2, the signal Sus2−Sus3 is employed as the corresponding auxiliary image signal. Therefore, a single means substantially serves as the band-limited image signal forming means and an auxiliary image signal forming means. Specifically, the signal, which has been formed by the band-limited image signal forming means, is processed as the band-limited image signal and is also processed as the auxiliary image signal corresponding to the adjacent band-limited image signal.

Thereafter, each of the band-limited image signals having thus been obtained is converted in the conversion means 3. The conversion is carried out on each band-limited image signal by using the converter 22 and the converter 24 shown in FIG. 35. In the converter 22, the converting process is carried out by using one of the functions f1 to fN for the respective frequency bands, and a restricted image signal is thereby obtained. In the converter 24, a converting process is carried out by using a function g, and a magnification ratio signal is thereby obtained. In the multiplier 25, the restricted image signal is multiplied by the magnification ratio signal. The conversion is carried out in this manner. In such cases, as illustrated in FIG. 35, the signals of two adjacent frequency bands are multiplied by each other. For example, the restricted image signal, which has been obtained by converting the band-limited image signal Sus1−Sus2, and the magnification ratio signal, which has been obtained by converting the auxiliary image signal Sus2−Sus3, are multiplied by each other. The converter 22 for carrying out the conversion with the function fk corresponds to a restricted image signal forming means. The converter 24 for carrying out the conversion with the function g corresponds to a magnification ratio signal forming means. Also, the multiplier 25 for multiplying the output signals, which have been obtained from the converters 22 and 24, by each other corresponds to a multiplication means.

The functions f1 to fN may be identical with one another or may be different from one another. They may be set arbitrarily in accordance with the characteristics of the image processing which is to be carried out. In this embodiment, as the functions f1 to fN, the functions are used, each of which restricts the band-limited image signal such that it may become smaller than the absolute value of the band-limited image signal, and which vary for different frequency bands. By way of example, the functions shown in FIG. 51 are used.

As in the frequency emphasis processing, as the function g, for example, the function shown in FIG. 36 may be used.

The converted image signals, which have been obtained from the conversion means 3, are fed into the operation device 23, which is provided with the integration means 4, the subtraction means 6, and the compressing process means 7. In the operation device 23, the processing is carried out in the manner described below. Firstly, the plurality of the converted image signals are integrated, and the integration signal is thereby obtained. The integration signal is then subtracted from the original image signal Sorg, and the difference signal is thereby obtained. Thereafter, the dynamic range compression factor, which is obtained with the function D and takes a value in accordance with the value of the difference signal, is added to the original image signal Sorg, and the processed image signal Sproc is thereby obtained. The processing described above may be represented by Formula (17) shown below.

$$Sproc = Sorg + D(Sorg - Fdrc(Sorg, Sus1, Sus2, \ldots, SusN)) \quad (17)$$

$$Fdrc(Sorg, Sus1, Sus2, \ldots, SusN) =$$

$$\{f1(Sorg - Sus1) \cdot g(Sus1 - Sus2) +$$

$$f2(Sus1 - Sus2) \cdot g(Sus2 - Sus3) + \ldots +$$

$$fk(Susk - 1 - Susk) \cdot g(Susk - Susk + 1) + \ldots +$$

$$fN(SusN - 1 - SusN) \cdot g(SusN - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

With the processing described above, as in the frequency emphasis processing, the rise portion of each band-limited image signal can be rendered smooth, and a step-like artifact can be prevented from occurring at the boundaries among the frequency bands in the signal, which is obtained by integrating the band-limited image signals.

The auxiliary image signals, which are processed with the function g, are not limited to those described above. For example, the dynamic range compressing process may be carried out with Formula (18) shown below.

$$Sproc = Sorg + D(Sorg - Fdrc(Sorg, Sus1, Sus2, \ldots, SusN)) \quad (18)$$

$$Fdrc(Sorg, Sus1, Sus2, \ldots, SusN) =$$

$$\{f1(Sorg - Sus1) \cdot g(Sorg - Sus2) +$$

$$f2(Sus1 - Sus2) \cdot g(Sorg - Sus3) + \ldots +$$

$$fk(Susk - 1 - Susk) \cdot g(Sorg - Susk + 1) + \ldots +$$

$$fN(SusN - 1 - SusN) \cdot g(Sorg - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

In the embodiment utilizing Formula (18), an image signal corresponding to a region in the vicinity of an edge in the image is processed, the signal obtained from the conversion as for the edge having a high level of contrast becomes smaller than the signal obtained from the conversion as for the edge having a low level of contrast.

The signals obtained from the conversion are then integrated, and the integration signal thus obtained is subtracted from the original image signal Sorg. Thereafter, the dynamic range compression factor, which is obtained with the function D and takes a value in accordance with the value of the thus obtained difference signal, is added to the original image signal Sorg. In such cases, the effects can be obtained such that the influence of the edge of a high level of contrast upon the processed image signal may become smaller than the influence of the edge of a low level of contrast upon the processed image signal.

The two kinds of the formulas have the effects described above. Various modifications are possible as for the functions f and g and how the band-limited image signal, which is to be processed with the function g, is formed.

A further different embodiment of the dynamic range compressing method and apparatus in accordance with the present invention will be described hereinbelow. In this embodiment, the processes carried out by the unsharp image signal forming means 1, the band-limited image signal forming means 2, the integration means 4, the subtraction means 6, and the compressing process means 7 are the same as those in the embodiment described above with reference to FIG. 43. Therefore, only the process carried out by the conversion means 3 will be described hereinbelow.

Basically, the constitution of the embodiment of the dynamic range compressing apparatus described below may be illustrated as in FIG. 39, which shows the image processing apparatus for carrying out the frequency emphasis processing described above. However, various means incorporated in the operation device 23 are different from those for the frequency emphasis processing. The embodiment of the dynamic range compressing apparatus will hereinbelow be described with reference to FIG. 39.

As in the aforesaid embodiment, the band-limited image signals are formed from the original image signal Sorg and the plurality of the unsharp image signals Susk, which have been formed by the unsharp image signal forming means 1. Each of the band-limited image signals is obtained from the subtracter 21, which subtracts the unsharp image signals Susk of two adjacent frequency bands (as for the original image signal Sorg, Sorg and Sus1) from each other. Specifically, the values of Sorg-Sus1, Sus1-Sus2, . . . , SusN-1-SusN are calculated successively, and the plurality of the band-limited image signals are thereby obtained.

Thereafter, each of the band-limited image signals having thus been obtained is converted in the conversion means 3. As illustrated in FIG. 39, in the conversion means 3, a band-limited image signal to be converted, which is of a certain frequency band, and a signal (i.e., an auxiliary image signal), which has been obtained by converting a low frequency side band-limited image signal of a frequency band, that is lower by a single level than the frequency band of the band-limited image signal to be converted, with a function g in the converter 24, are added to each other. In this manner, a composite band-limited image signal is obtained. The composite band-limited image signal having been obtained from the addition is then converted with a function fk in the converter 22. The converter 24 for carrying out the conversion with the function g corresponds to an auxiliary image signal forming means, and the adder 26 corresponds to a composite band-limited image signal forming means.

As the function g, for example, the function shown in FIG. 40 may be employed. In the dynamic range compressing process, as in the frequency emphasis processing, the portion of this function, at which the inclination increases gradually from the origin, affects the wave form of the rise portion of the auxiliary image signal. Specifically, in cases where the conversion is carried out with this function, a sharp rise portion can be rendered smooth. As in the frequency emphasis processing, any of functions, the inclination of which increases gradually from 0 in the region in the vicinity of the origin, may be employed as the function g. For example, the function shown in FIG. 41 may also be employed.

The functions f1 to fN, which are used in this embodiment, may be identical with one another or may be different from one another. They may be set arbitrarily in accordance with the characteristics of the image processing which is to be carried out. In this embodiment, as the functions f1 to fN, by way of example, the functions shown in FIG. 51 are used.

The converted image signals, which have been obtained from the conversion means 3, are fed into the operation device 23, which is provided with the integration means 4, the subtraction means 6, and the compressing process means 7. In the operation device 23, the processing is carried out in the manner described below. Firstly, the plurality of the converted image signals are integrated, and the integration signal is thereby obtained. The integration signal is then subtracted from the original image signal Sorg, and the difference signal is thereby obtained. Thereafter, the difference signal is converted, and the signal thus obtained is added to the original image signal Sorg. In this manner, the processed image signal Sproc is obtained. This process and the other processes described above may be represented by Formula (19) shown below.

$$Sproc = Sorg + D(Sorg - Fdrc(Sorg, Sus1, Sus2, \ldots, SusN)) \quad (19)$$

$$Fdrc(Sorg, Sus1, Sus2, \ldots, SusN) =$$

$$[f1\{(Sorg - Sus1) + g(Sus1 - Sus2)\} +$$

$$f2\{(Sus1 - Sus2) + g(Sus2 - Sus3)\} + \ldots +$$

$$fk\{(Susk - 1 - Susk) + g(Susk - Susk + 1)\} + \ldots +$$

$$fN\{(SusN - 1 - SusN) + g(SusN - SusN + 1)\}]$$

wherein Sproc represents the image signal, in which the dynamic range has been compressed, Sorg represents the original image signal, Susk (k=1 to N+1) represents the unsharp mask image signal, fk (k=1 to N) represents the function for converting the composite band-limited image signal, g represents the function for converting the band-limited image signal and thereby obtaining the auxiliary image signal, and D(Sorg-Fdrc) represents the dynamic range compression factor determined in accordance with the low frequency component signal, in which D represents the function for converting Sorg-Fdrc.

With the processing described above, as in the frequency emphasis processing, the rise portion of each band-limited image signal can be rendered smooth. Also, it becomes possible to prevent an artifact from occurring in the processed image signal due to a step-like pattern occurring at the boundaries among the frequency bands in the signal, which is obtained by integrating the band-limited image signals.

In this embodiment of the dynamic range compressing apparatus, various modifications are possible as for, for example, the functions f and g.

In the embodiments described above, the dynamic range compressing process is carried out by using the unsharp image signals Susk. Alternatively, together with the dynamic range compressing process, the frequency emphasis processing described above may be carried out on the original image signal Sorg by using the unsharp image signals Susk.

In cases where the dynamic range compressing process and the frequency emphasis processing are carried out simultaneously, the unsharp image signals Susk can be utilized commonly. Therefore, the time required to carry out the operations can be kept shorter and the processing can be carried out more efficiently than when the dynamic range compressing process and the frequency emphasis processing are carried independently.

Also, in cases where the dynamic range compressing process and the frequency emphasis processing are carried out simultaneously, the influence of the comparatively low frequency components of the original image is large in the dynamic range compressing process, and the influence of the comparatively high frequency components of the original image is large in the frequency emphasis processing. Therefore, in cases where the dynamic range compressing process is carried out, of the plurality of the unsharp image signals Susk, the unsharp image signals Susk of the comparatively low frequency bands may be utilized. Also, in cases where the frequency emphasis processing is carried out, of the plurality of the unsharp image signals Susk, the unsharp image signals Susk of the comparatively high frequency bands may be utilized. In this manner, the unsharp image signals Susk of different frequency bands may be used in the dynamic range compressing process and the frequency emphasis processing.

In the aforesaid embodiments of the multi-resolution transforming process, the frequency emphasis processing, and the dynamic range compressing process, the interpolating operation process is carried out by using the filter of the Gaussian signal. Alternatively, the interpolating operation process may be carried out on the filtering-processed image by using the B spline interpolating operation. How the B spline interpolating operation process is carried out will be described hereinbelow.

The B spline interpolating operation is an interpolating operation technique for obtaining an interpolation image signal representing a secondary image, in which the sharpness is comparatively low and which is smooth. In the B spline interpolating operation, the spline interpolating function need not pass through the original sampling points (picture elements), and it is necessary that the first-order differential coefficient and the second-order differential coefficient {represented by f"(X)} of the spline interpolating function are continuous between adjacent sections.

Specifically, in Formula (20), $$f_k(x) = A_k x^3 + B_k x^2 + C_k x + D_k \quad (20)$$

wherein $B_k$ is a coefficient used as an aid in facilitating the explanation and does not represent the filtering-processed image signal, the conditions shown below should be satisfied.

$f_k'(X_k)=f_{k-1}'(X_k)$ (21)

$f_k'(X_{k+1})=f_{k+1}'(X_{k+1})$ (22)

$f_k''(X_k)=f_{k-1}''(X_k)$ (23)

$f_k''(X_{k+1})=f_{k+1}''(X_{k+1})$ (24)

Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (25) to be satisfied.

$f_k'(X_k)=(Y_{k+1}-Y_{k-1})/(X_{k+1}-X_{k-1})$ (25)

Further, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (26) to be satisfied.

$f_k'(X_{k+1})=(Y_{k+2}-Y_k)/(X_{k+2}-X_k)$ (26)

In general, the function f(X) may be approximately represented by Formula (27).

$f(X)=f(0)+f'(0)X+\{f''(0)/2\}X^2$ (27)

It is herein assumed that the interval (i.e., the lattice interval) of each of sections $X_{k-2}\sim X_{k-1}$, $X_{k-1}\sim X_k$, $X_k\sim X_{k+1}$, and $X_{k+1}\sim X_{k+2}$ is equal to 1, and the position of the interpolation point $X_p$, which is taken from the picture element $X_k$ toward the picture element $X_{k+1}$, is represented by t ($0\leq t\leq 1$). In such cases, from Formulas (21), (22), (23), (24), and (27), the formulas shown below obtain.

$f_k'(0)=C_k=(Y_{k+1}-Y_{k-1})/2$ $f_k'(1)=3A_k+2B_k+C_k=(Y_{k+2}-Y_k)/2$ $f_k''(0)=Y_{k+1}-2Y_k+Y_{k-1}=2B$

Therefore, the formulas shown below obtain.

$A_k=(Y_{k+2}-3Y_{k+1}+3Y_k-Y_{k-1})/6$ $B_k=(Y_{k-1}-2Y_k+Y_{k-1})/2$ $C_k=(Y_{k+1}-Y_{k-1})/2$

Since $D_k$ is unknown, it is represented by the formula $D_k=(D_1Y_{k+2}+D_2Y_{k+1}+D_3Y_k+D_4Y_{k-1})/6$ As described above, the variable conversion of X=t is carried out, and therefore the spline interpolating function $f_k(X)$ is represented by the formula shown below.

$f_k(x)=f_k(t)$

Therefore, $f_k(t) = \{(Y_{k+2} - 3Y_{k+1} + 3Y_k - Y_{k-1})/6\}t^3 + \{(Y_{k+1} - 2Y_k + Y_{k-1})/2\}t^2 +$
$\{(Y_{k+1} - Y_{k-1})/2\}t + (D_1Y_{k+2} + D_2Y_{k+1} + D_3Y_k + D_4Y_{k-1})/6$ Arranging this formula with respect to the image signal components $Y_{k-1}$, $Y_k$, $Y_{k+1}$, and $Y_{k+2}$ yields Formula (28).

$f_k(t) = \{(-t^3 + 3t^2 - 3t + D_4)/6\}Y_{k-1} + \{(3t^3 - 6t^2 + D_3)/6\}Y_k +$ (28)
$\{(-3t^3 + 3t^2 + 3t + D_2)/6\}Y_{k+1} + \{(t^3 + D_1)/6\}Y_{k+2}$

If t is set to be t=1, the formula shown below will obtain.

$f_k(1) = \{(D_4 - 1)/6\}Y_{k-1} +$
$\{(D_3 - 3)/6\}Y_k + \{(D_2 + 3)/6\}Y_{k+1} + \{(D_1 + 1)/6\}Y_{k+2}$

As for the section $X_{k+1}\sim X_{k+2}$, Formula (29) obtains.

$f_{k+1}(t) = \{(-t^3 + 3t^2 - 3t + D_4)/6\}Y_k + \{(3t^3 - 6t^2 + D_3)/6\}Y_{k+1} +$ (29)
$\{(-3t^3 + 3t^2 + 3t + D_2)/6\}Y_{k+2} + \{(t^3 + D_1)/6\}Y_{k+3}$

If t is set to be t=0, the formula shown below will obtain.

$f_{k+1}(0) = (D_4/6)Y_k + (D_3/6)Y_{k+1} + (D_2/6)Y_{k+2} + (D_1/6)Y_{k+3}$

From the continuity condition $\{f_k(1)=f_{k+1}(0)\}$ and the condition in that the coefficients corresponding to the respective filtering-processed image signal components are equal to each other, $D_4-1=0$, $D_3-3=D_4$, $D_2+3=D_3$, $D_1+1=D_2$, and $D_1=0$. Therefore, $D_k=(Y_{k+1}4Y_k+Y_{k-1})/6$ Accordingly, Formula (30) obtains.

$Y_p = f_k(t) = \{(-t^3 + 3t^2 - 3t + 1)/6\}Y_{k-1} + \{(3t^3 - 6t^2 + 4)/6\}Y_k +$ (30)
$\{(-3t^3 + 3t^2 + 3t + 1)/6\}Y_{k+1} + (t^3/6)Y_{k+2}$

Therefore, the interpolation coefficients $b_{k-1}$, $b_k$, $b_{k+1}$, and $b_{k+2}$, which respectively correspond to the filtering-processed image signal components $Y_{k-1}$, $Y_k$, $Y_{k+1}$, and $Y_{k+2}$, may be represented by the formulas shown below.

$b_{k-1}=(-t^3+3t^2-3t+1)/6$ $b_k=(3t^3-6t^2+4)/6$ $b_{k+1}=(-3t^3+3t^2+3t+1)/6$ $b_{k+2}=t^3/6$

The operations described above are repeated for the sections $X_{k-2}\sim X_{k-1}$, $X_{k-1}\sim X_k$, $X_k\sim X_{k+1}$, and $X_{k+1}\sim X_{k+2}$. In this manner, an interpolation image signal can be obtained, which is made up of image signal components occurring at intervals different from those of the image signal components of the entire filtering-processed image signal.

Therefore, in cases where the B spline interpolating operation process is carried out on each of the filtering-processed image signals Bk, the unsharp image signals Susk corresponding respectively to the filtering-processed image signals Bk can be obtained.

Also, in the embodiments described above, the filtering process is carried out with respect to the image signal components of the original image signal Sorg, which represent the picture elements located at every second row and every second column in the array of picture elements of the original image. The interpolating operation is then carried out. The process is carried out successively, and the unsharp image signals Susk are thereby obtained. Alternatively, the filtering process may be carried out on the original image signal Sorg by using a plurality of unsharp masks having different sizes, and the unsharp image signals Susk having different frequency response characteristics may thereby be obtained.

Further, the frequency emphasis processing or the dynamic range compressing process in the embodiments described above is also applicable when the frequency emphasis processing or the dynamic range compressing process is carried out on a flow pattern, which occurs in the image obtained with the tomographic image recording operation. The embodiment, wherein the frequency emphasis processing and the dynamic range compressing process are carried out simultaneously, is also applicable to the image obtained with the tomographic image recording operation. In this manner, the flow pattern can be eliminated, and an artifact can be prevented from occurring at the region in the vicinity of an edge in the image.

Specifically, the image processing method for eliminating the flow pattern, which occurs when the tomographic image recording operation is carried out, by carrying out the image processing with unsharp masks is proposed in, for example, Japanese Unexamined Patent Publication No. 3(1991)-276265. In such cases, the problems occur in that an artifact occurs in the region in the vicinity of an edge, at which the image density changes sharply. In such cases, in order for the flow pattern to be eliminated, the unsharp image signals Susk are obtained by using a one-dimensional unsharp mask. Specifically, when the unsharp image signals having different frequency response characteristics are obtained in the embodiments described above, the filtering process with the one-dimensional unsharp mask for eliminating the flow pattern may be carried out. The band-limited image signals may then be obtained in accordance with the thus obtained filtering-processed image signals. In cases where the absolute value of each band-limited image signal is comparatively large, the band-limited image signal may be converted such that its absolute value may become small. The subsequent processes may then be carried out. In this manner, the flow pattern can be eliminated, and an image free from any artifact and having good image quality can be obtained.

Also, together with the process using the one-dimensional unsharp mask for the elimination of the flow pattern, the aforesaid process using the two-dimensional unsharp mask or the process, in which the processing is carried out with the one-dimensional unsharp mask in two-dimensional directions, may be carried out. In such cases, the flow pattern can be eliminated from the original image, and the occurrence of the artifact in the region in the vicinity of an edge can be reduced even further. Therefore, a processed image having good image quality can be obtained.

Further, as described above, in the frequency emphasis processing and the dynamic range compressing process, the converting process carried out on the band-limited image signals may be varied for different portions of the object, the images of which were recorded. The idea of the changing of the process in accordance with the portion of the object, the image of which was recorded, is applicable to every embodiment.

What is claimed is:

1. A multi-resolution transforming method, wherein an original image constituted of a lattice-like array of picture elements, which are located at predetermined intervals along the rows and columns of the lattice-like array, is transformed into a multi-resolution space, the method comprising the steps of:

i) carrying out a filtering process on the original image, the filtering process being carried out by using a filter having a predetermined size and with respect to each of picture elements selected at predetermined intervals, a first filtering-processed image being thereby obtained, ii) carrying out said filtering process on said first filtering-processed image, a second filtering-processed image being thereby obtained, iii) successively carrying out said filtering process on the respective filtering-processed images, which are thus obtained successively, the original image being thereby transformed into a plurality of images having different levels of resolution, and iv) carrying out an interpolating operation process on each of the plurality of said images having different levels of resolution, whereby multi-resolution transformed images, each of which is constituted of the same number of picture elements as that of the picture elements constituting the original image, are obtained.

2. A multi-resolution transforming apparatus, wherein an original image constituted of a lattice-like array of picture elements, which are located at predetermined intervals along the rows and columns of the lattice-like array, is transformed into a multi-resolution space, the apparatus comprising:

i) a filtering means for transforming the original image into a plurality of images having different levels of resolution by:

carrying out a filtering process on the original image, the filtering process being carried out by using a filter having a predetermined size and with respect to each of picture elements selected at predetermined intervals, a first filtering-processed image being thereby obtained, carrying out said filtering process on said first filtering-processed image, a second filtering-processed image being thereby obtained, and successively carrying out said filtering process on the respective filtering-processed images, which are thus obtained successively, and ii) an interpolating operation means for carrying out an interpolating operation process on each of the plurality of said images having different levels of resolution, and thereby obtaining multi-resolution transformed images, each of which is constituted of the same number of picture elements as that of the picture elements constituting the original image.

3. An image processing method, wherein a signal concerning high frequency components of an original image is added to an original image signal, which represents the original image, and the high frequency components of the original image are thereby emphasized, the method comprising:

i) forming a plurality of unsharp mask image signals, which have different frequency response characteristics, from the original image signal, ii) forming a plurality of band-limited image signals, each of which represents one of signals falling within a plurality of different frequency bands of the original image signal, from the original image signal and the plurality of said unsharp mask image signals, or from the plurality of said unsharp mask image signals, iii) carrying out a converting process on at least a single band-limited image signal, which is among the plurality of said band-limited image signals, such that at least a portion of the band-limited image signal becomes small, a plurality of converted image signals thereby being formed, and iv) integrating the plurality of said converted image signals, whereby the signal concerning the high frequency components of the original image, which signal is to be added to the original image signal is obtained;

wherein the formation of the plurality of said converted image signals is carried out by converting a band-limited image signal having a signal value, the absolute value of which is larger than a predetermined threshold value, such that the absolute value of the signal value of the band-limited image signal, which absolute value is larger than the predetermined threshold value, is converted to a small value.

4. An image processing method as defined in claim 3 wherein the formation of the plurality of said converted image signals is carried out by converting a band-limited image signal such that, as the absolute value of the signal value of the band-limited image signal becomes larger than the predetermined threshold value, the absolute value of the signal value of the band-limited image signal is converted to a small value, and such that, as the absolute value of the signal value of the band-limited image signal becomes smaller than a different threshold value, which is smaller than the predetermined threshold value, the absolute value of the signal value of the band-limited image signal is converted to a small value.

5. An image processing method as defined in claim 3 wherein the formation of the plurality of said converted image signals is carried out by converting a band-limited image signal such that the level of the absolute value of the signal value of the band-limited image signal is changed in accordance with the frequency band of the band-limited image signal.

6. An image processing method as defined in claim 4 wherein the formation of the plurality of said converted image signals is carried out by converting a band-limited image signal such that the level of the absolute value of the signal value of the band-limited image signal is changed in accordance with the frequency band of the band-limited image signal.

7. An image processing method, wherein a signal concerning high frequency components of an original image is added to an original image signal, which represents the original image, and the high frequency components of the original image are thereby emphasized, the method comprising:

i) forming a plurality of unsharp mask image signals, which have different frequency response characteristics, from the original image signal, ii) forming a plurality of band-limited image signals, each of which represents one of signals falling within a plurality of different frequency bands of the original image signal, from the original image signal and the plurality of said unsharp mask image signals, or from the plurality of said unsharp mask image signals, iii) carrying out a converting process on at least a single band-limited image signal, which is among the plurality of said band-limited image signals, such that at least a portion of the band-limited image signal becomes small, a plurality of converted image signals thereby being formed, and iv) integrating the plurality of said converted image signals, whereby the signal concerning the high frequency components of the original image, which signal is to be added to the original image signal is obtained;

wherein the formation of the plurality of said converted image signals is carried out by converting a band-limited image signal in accordance with one of a plurality of functions, which vary for different frequency bands, such that the absolute value of the signal value of the band-limited image signal is converted to a value which is not larger than said absolute value and is determined in accordance with said absolute value.

8. An image processing method as defined in claim 7 wherein each of the functions, which are used for the formation of said converted image signals, converts a band-limited image signal having a signal value, the absolute value of which is larger than a predetermined value, such that the value of the converted image signal becomes approximately equal to a predetermined level, and wherein the functions are set such that, in a function for processing a high frequency band, said predetermined value is set to be smaller than those in the other functions.

9. An image processing method as defined in claim 7 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

10. An image processing method as defined in claim 8 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

11. An image processing method as defined in claim 3 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\ (Sorg) \cdot Fusm\ (Sorg, Sus1, Sus2, \ldots, SusN)$$

$$Fusm(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient dimermined in accordance with the original image signal.

12. An image processing method as defined in claim 7 wherein the formation of said band-limited image signals, the formation of said converted image signals, the formation of the signal concerning the high frequency components, and the addition of the signal concerning the high frequency components to the original image signal are carried out with the formula:

$$Sproc = (Sorg + \beta\ (Sorg) \cdot Fusm(Sorg, Sus1, Sus2, \ldots, SusN)$$

$$Fusm(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

13. An image processing method as defined in claim 3 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\ (Sorg) \cdot Fusm\ (Sorg, Sus1, Sus2, \ldots, SusN)$$

$$Fusm(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

14. An image processing method as defined in claim 7 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta(Sorg) \cdot Fusm(Sorg, Sus1, Sus2, \ldots, SusN)$$

$$Fusm(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

15. An image processing method as defined in claim 3 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\ (Sorg) \cdot Fusm\ (Sus1, Sus2, \ldots, SusN)$$

$$Fusm(Sus1, Sus2, \ldots, SusN) =$$

$$\{f2(Sus1 - Sus2) + f3(Sus2 - Sus3) + \ldots +$$

$$fk(Susk - 1 - Susk) + \ldots + fN(SusN - 1 - SusN)\}$$

wherein Sproc represents the image signal, in which the high frequency components have been emphasized, Sorg represents the original image signal, Susk (k=1 to N) represents the unsharp mask image signal, fk (k=2 to N) represents the function for converting the band-limited image signal, and β(Sorg) represents the emphasis coefficient determined in accordance with the original image signal.

16. An image processing method as defined in claim 3 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\ (Sorg) \cdot Fusm\ (Sus1, Sus2, \ldots, SusN)$$

$$Fusm(Sus1, Sus2, \ldots, SusN) =$$

$$(1/N) \cdot \{f2(Sus1 - Sus2) + f3(Sus1 - Sus3) +$$

$$\ldots + fk(Sus1 - Susk) + \ldots + fN(Sus1 - SusN)\}$$

wherein Sproc represents the image signal, in which the high frequency components have been emphasized, Sorg represents the original image signal, Susk (k=1 to N) represents the unsharp mask image signal, fk (k=2 to N) represents the function for converting the band-limited image signal, and β(Sorg) represents the emphasis coefficient determined in accordance with the original image signal.

17. An image processing method as defined in claim 3 wherein the formation of the plurality of said converted image signals is carried out by conducting a converting process on a band-limited image signal in accordance with the value of an emphasis coefficient, which is used for the emphasis.

18. An image processing method as defined in claim 7 wherein the formation of the plurality of said converted image signals is carried out by conducting a converting process on a band-limited image signal in accordance with the value of an emphasis coefficient, which is used for the emphasis.

19. An image processing method as defined in claim 3 wherein the formation of the plurality of said converted image signals is carried out by converting a band-limited image signal in accordance with the portion of an object, the image of which was recorded as the original image.

20. An image processing method as defined in claim 7 wherein the formation of the plurality of said converted image signals is carried out by converting a band-limited image signal in accordance with the portion of an object, the image of which was recorded as the original image.

21. An image processing method as defined in claim 3 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

22. An image processing method as defined in claim 7 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

23. An image processing apparatus, wherein a signal concerning high frequency components of an original image is added to an original image signal, which represents the original image, and the high frequency components of the original image are thereby emphasized, the apparatus comprising:
   i) an unsharp mask image forming means for forming a plurality of unsharp mask image signals, which have different frequency response characteristics, from the original image signal,
   ii) a band-limited image signal forming means for forming a plurality of band-limited image signals, each of which represents one of signals falling within a plurality of different frequency bands of the original image signal, from the original image signal and the plurality of said unsharp mask image signals, or from the plurality of said unsharp mask image signals,
   iii) a conversion means for carrying out a converting process on at least a single band-limited image signal, which is among the plurality of said band-limited image signals, such that at least a portion of the band-limited image signal becomes small and thereby forming a plurality of converted image signals, and
   iv) a frequency emphasis processing means for integrating the plurality of said converted image signals, and thereby obtaining the signal concerning the high frequency components of the original image, which signal is to be added to the original image signal;
wherein said conversion means forms the plurality of said converted image signals by converting a band-limited image signal having a signal value, the absolute value of which is larger than a predetermined threshold value, such that the absolute value of the signal value of the band-limited image signal, which absolute value is larger than the predetermined threshold value, is converted to a small value.

24. An image processing apparatus as defined in claim 23 wherein said conversion means forms the plurality of said converted image signals by converting a band-limited image signal such that, as the absolute value of the signal value of the band-limited image signal becomes larger than the predetermined threshold value, the absolute value of the signal value of the band-limited image signal is converted to a small value, and such that, as the absolute value of the signal value of the band-limited image signal becomes smaller than a different threshold value, which is smaller than the predetermined threshold value, the absolute value of the signal value of the band-limited image signal is converted to a small value.

25. An image processing apparatus as defined in claim 23 wherein said conversion means forms the plurality of said converted image signals by converting a band-limited image signal such that the level of the absolute value of the signal value of the band-limited image signal is changed in accordance with the frequency band of the band-limited image signal.

26. An image processing apparatus as defined in claim 24 wherein said conversion means forms the plurality of said converted image signals by converting a band-limited image signal such that the level of the absolute value of the signal value of the band-limited image signal is changed in accordance with the frequency band of the band-limited image signal.

27. An image processing apparatus, wherein a signal concerning high frequency components of an original image is added to an original image signal, which represents the original image, and the high frequency components of the original image are thereby emphasized, the apparatus comprising:
   i) an unsharp mask image forming means for forming a plurality of unsharp mask image signals, which have different frequency response characteristics, from the original image signal,
   ii) a band-limited image signal forming means for forming a plurality of band-limited image signals, each of which represents one of signals falling within a plurality of different frequency bands of the original image signal, from the original image signal and the plurality of said unsharp mask image signals, or from the plurality of said unsharp mask image signals,
   iii) a conversion means for carrying out a converting process on at least a single band-limited image signal, which is among the plurality of said band-limited image signals, such that at least a portion of the band-limited image signal becomes small, and thereby forming a plurality of converted image signals, and
   iv) a frequency emphasis processing means for integrating the plurality of said converted image signals, and thereby obtaining the signal concerning the high frequency components of the original image, which signal is to be added to the original image signal;
   wherein said conversion means forms the plurality of said converted image signals by converting a band-limited image signal in accordance with one of a plurality of functions, which vary for different frequency bands, such that the absolute value of the signal value of the band-limited image signal is converted to a value which is not larger than said absolute value and is determined in accordance with said absolute value.

28. An image processing apparatus as defined in claim 27 wherein each of the functions, which are used for the formation of said converted image signals, converts a band-limited image signal having a signal value, the absolute value of which is larger than a predetermined value, such that the value of the converted image signal becomes approximately equal to a predetermined level, and wherein the functions are set such that, in a function for processing a high frequency band, said predetermined value is set to be smaller than those in the other functions.

29. An image processing apparatus as defined in claim 27 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

30. An image processing apparatus as defined in claim 28 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

31. An image processing apparatus as defined in claim 23 wherein the formation of said band-limited image signals, the formation of said converted image signals, the formation of the signal concerning the high frequency components, and the addition of the signal concerning the high frequency components to the original image signal are carried out with the formula:

Sproc=Sorg+β(Sorg)·Fusm(Sorg,Sus1,Sus2, . . . , SusN) Fusm-(Sorg,Sus1,Sus2, . . . , SusN)={f1(Sorg−Sus1)+f2(Sus1−Sus2)+ . . . +fk(Susk−1−Susk)+ . . . +fN(SusN−1−SusN)} wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

32. An image processing apparatus as defined in claim 27 wherein the formation of said band-limited image signals, the formation of said converted image signals, the formation of the signal concerning the high frequency components, and the addition of the signal concerning the high frequency components to the original image signal are carried out with the formula:

Sproc=Sorg+β(Sorg)·Fusm(Sorg,Sus1,Sus2, . . . , SusN) Fusm-(Sorg,Sus1,Sus2, . . . , SusN)={f1(Sorg−Sus1)+f2(Sus1−Sus2)+ . . . +fk(Susk−1−Susk)+ . . . +fN(SusN−1−SusN)} wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

33. An image processing apparatus as defined in claim 23 wherein the formation of said band-limited image signals, the formation of said converted image signals, the formation of the signal concerning the high frequency components, and the addition of the signal concerning the high frequency components to the original image signal are carried out with the formula:

Sproc=Sorg+β(Sorg)·Fusm(Sorg,Sus1,Sus2, . . . , SusN) Fusm-(Sorg,Sus1,Sus2, . . . , SusN)=(1/N)·{f1(Sorg−Sus1)+f2(Sorg−Sus2)+ . . . +fk(Sorg−Susk)+ . . . +fN(Sorg−SusN)} wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

34. An image processing apparatus as defined in claim 27 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\,(Sorg) \cdot Fusm\,(Sorg, Sus1, Sus2, \ldots, SusN)$$

$$Fusm(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the high frequency components have been emphasized, Sorg represents the original image signal, Susk (k=1 to N) represents the unsharp mask image signal, fk (k=1 to N) represents the function for converting the band-limited image signal, and β(Sorg) represents the emphasis coefficient determined in accordance with the original image signal.

35. An image processing apparatus as defined in claim 23 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\,(Sorg) \cdot Fusm\,(Sus1, Sus2, \ldots, SusN)$$

$$Fusm(Sus1, Sus2, \ldots, SusN) =$$

$$\{f2(Sus1 - Sus2) + f3(Sus2 - Sus3) + \ldots +$$

$$fk(Susk - 1 - Susk) + \ldots + fN(SusN - 1 - SusN)\}$$

wherein Sproc represents the image signal, in which the high frequency components have been emphasized, Sorg represents the original image signal, Susk (k=1 to N) represents the unsharp mask image signal, fk (k=2 to N) represents the function for converting the band-limited image signal, and β(Sorg) represents the emphasis coefficient determined in accordance with the original image signal.

36. An image processing apparatus as defined in claim 23 wherein the formation of said band-limited image signals, the formation of said converted image signals, the formation of the signal concerning the high frequency components, and the addition of the signal concerning the high frequency components to the original image signal are carried out with the formula:

$$Sproc = Sorg + \beta\,(Sorg) \cdot Fusm\,(Sus1, Sus2, \ldots, SusN)$$

$$Fusm(Sus1, Sus2, \ldots, SusN) =$$

$$(1/N) \cdot \{f2(Sus1 - Sus2) + f3(Sus1 - Sus3) +$$

$$\ldots + fk(Sus1 - Susk) + \ldots + fN(Sus1 - SusN)\}$$

wherein Sproc represents the image signal, in which the high frequency components have been emphasized, Sorg represents the original image signal, Susk (k=1 to N) represents the unsharp mask image signal, fk (k=2 to N) represents the function for converting the band-limited image signal, and β(Sorg) represents the emphasis coefficient determined in accordance with the original image signal.

37. An image processing apparatus as defined in claim 23 wherein said conversion means forms the plurality of said converted image signals by conducting a converting process on a band-limited image signal in accordance with the value of an emphasis coefficient, which is used for the emphasis.

38. An image processing apparatus as defined in claim 27 wherein said conversion means forms the plurality of said converted image signals by conducting a converting process on a band-limited image signal in accordance with the value of an emphasis coefficient, which is used for the emphasis.

39. An image processing apparatus as defined in claim 23 wherein said conversion means forms the plurality of said converted image signals by converting a band-limited image signal in accordance with the portion of an object, the image of which was recorded as the original image.

40. An image processing apparatus as defined in claim 27 wherein said conversion means forms the plurality of said converted image signals by converting a band-limited image signal in accordance with the portion of an object, the image of which was recorded as the original image.

41. An image processing apparatus as defined in claim 23 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

42. An image processing apparatus as defined in claim 27 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

43. A dynamic range compressing method, wherein a signal concerning low frequency components of an original image is added to an original image signal, which represents the original image, and the dynamic range of the original image is thereby compressed, the method comprising the steps of:
   i) forming a plurality of unsharp mask image signals, which have different frequency response characteristics, from the original image signal,
   ii) forming a plurality of band-limited image signals, each of which represents one of signals falling within a plurality of different frequency bands of the original image signal, from the original image signal and the plurality of said unsharp mask image signals, or from the plurality of said unsharp mask image signals,
   iii) carrying out a converting process on at least a single band-limited image signal, which is among the plurality of said band-limited image signals, such that at least a portion of the band-limited image signal becomes small, a plurality of converted image signals being thereby formed,
   iv) integrating the plurality of said converted image signals, an integration signal being thereby obtained,
   v) subtracting said integration signal from the original image signal, a difference signal being thereby obtained, and
   vi) converting said difference signal, whereby the signal concerning the low frequency components of the original image, which signal is to be added to the original image signal, is obtained.

44. A dynamic range compressing method as defined in claim 43 wherein the formation of the plurality of said converted image signals is carried out by converting a band-limited image signal having a signal value, the absolute value of which is larger than a predetermined threshold value, such that the absolute value of the signal value of the band-limited image signal, which absolute value is larger than the predetermined threshold value, is converted to a small value.

45. A dynamic range compressing method as defined in claim 44 wherein the formation of the plurality of said converted image signals is carried out by converting a band-limited image signal such that, as the absolute value of the signal value of the band-limited image signal becomes larger than the predetermined threshold value, the absolute value of the signal value of the band-limited image signal is converted to a small value, and such that, as the absolute value of the signal value of the band-limited image signal becomes smaller than a different threshold value, which is smaller than the predetermined threshold value, the absolute value of the signal value of the band-limited image signal is converted to a small value.

46. A dynamic range compressing method as defined in claim 44 wherein the formation of the plurality of said converted image signals is carried out by converting a band-limited image signal such that the level of the absolute value of the signal value of the band-limited image signal is changed in accordance with the frequency band of the band-limited image signal.

47. A dynamic range compressing method as defined in claim 45 wherein the formation of the plurality of said converted image signals is carried out by converting a band-limited image signal such that the level of the absolute value of the signal value of the band-limited image signal is changed in accordance with the frequency band of the band-limited image signal.

48. A dynamic range compressing method as defined in claim 43 wherein the formation of the plurality of said converted image signals is carried out by converting a band-limited image signal in accordance with one of a plurality of functions, which vary for different frequency bands, such that the absolute value of the signal value of the band-limited image signal is converted to a value, which is not larger than said absolute value and is determined in accordance with said absolute value.

49. A dynamic range compressing method as defined in claim 48 wherein each of the functions, which are used for the formation of said converted image signals, converts a band-limited image signal having a signal value, the absolute value of which is larger than a predetermined value, such that the value of the converted image signal becomes approximately equal to a predetermined level, and wherein the functions are set such that, in a function for processing a high frequency band, said predetermined value is set to be smaller than those in the other functions.

50. A dynamic range compressing method as defined in claim 48 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

51. A dynamic range compressing method as defined in claim 49 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

52. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D\ (Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

53. A dynamic range compressing method as defined in claim 44 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D\ (Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

54. A dynamic range compressing method as defined in claim 48 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

55. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

56. A dynamic range compressing method as defined in claim 44 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

57. A dynamic range compressing method as defined in claim 48 wherein the formation of said band-limited image signals, the formation of said converted image signals, the formation the said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

58. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc=Sorg+D(Sorg-Fdrc(Sus1,Sus2,\ldots,SusN)) \; Fdrc(Sus1,Sus2,\ldots,SusN)=\{f2(Sus1-Sus2)+f3(Sus2-Sus3)+\ldots+fk(Susk-1-Susk)+\ldots+fN(SusN-1-SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

59. A dynamic range compressing method as defined in claim 44 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sus1, Sus2, \ldots, SusN))$$

$$Fdrc(Sus1, Sus2, \ldots, SusN) =$$

$$\{f2(Sus1 - Sus2) + f3(Sus2 - Sus3) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

60. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sus1, Sus2, \ldots, SusN))$$

$$Fdrc(Sus1, Sus2, \ldots, SusN) =$$

$$(1/N) \cdot \{f2(Sus1 - Sus2) + f3(Sus1 - Sus3) +$$

$$\ldots + fk(Sus1 - Susk) + \ldots + fN(Sus1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

61. A dynamic range compressing method as defined in claim 44 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sus1, Sus2, \ldots, SusN))$$

$$Fdrc(Sus1, Sus2, \ldots, SusN) =$$

$$(1/N) \cdot \{f2(Sus1 - Sus2) + f3(Sus1 - Sus3) +$$

$$\ldots + fk(Sus1 - Susk) + \ldots + fN(Sus1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

62. A dynamic range compressing method as defined in claim 43 wherein the formation of the plurality of said converted image signals is carried out by:
   converting a band-limited image signal such that the absolute value of the signal value of the band-limited image signal is converted to a value, which is not larger than said absolute value and is determined in accordance with said absolute value, a restricted image signal being thereby obtained,
   forming an auxiliary image signal, which contains a signal of a frequency band lower than the frequency band of the band-limited image signal having been used for the formation of said restricted image signal, said auxiliary image signal being formed from the original image signal and the plurality of said unsharp mask image signals,
   converting said auxiliary image signal such that, as the absolute value of the signal value of said auxiliary image signal becomes small, said absolute value is converted to a value close to 1, and such that, as the absolute value of the signal value of said auxiliary image signal becomes large, said absolute value is converted to a value close to 0, a magnification ratio signal corresponding to said restricted image signal being thereby obtained, and multiplying said restricted image signal by said magnification ratio signal, which corresponds to said restricted image signal.

63. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, ..., SusN))$$

$$Fdrc(Sorg, Sus1, Sus2, ..., SusN) =$$

$$\{f1(Sorg - Sus1) \cdot g(Sus1 - Sus2) + f2(Sus1 - Sus2) \cdot g(Sus2 - Sus3) +$$

$$... + fk(Susk - 1 - Susk) \cdot g(Susk - Susk + 1) +$$

$$... + fN(SusN - 1 - SusN) \cdot g(SusN - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

64. A dynamic range compressing method as defined in claim 62 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, ..., SusN))$$

$$Fdrc(Sorg, Sus1, Sus2, ..., SusN) =$$

$$\{f1(Sorg - Sus1) \cdot g(Sus1 - Sus2) + f2(Sus1 - Sus2) \cdot g(Sus2 - Sus3) +$$

$$... + fk(Susk - 1 - Susk) \cdot g(Susk - Susk + 1) +$$

$$... + fN(SusN - 1 - SusN) \cdot g(SusN - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

65. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, ..., SusN))$$

$$Fdrc(Sorg, Sus1, Sus2, ..., SusN) =$$

$$\{f1(Sorg - Sus1) \cdot g(Sorg - Sus2) + f2(Sus1 - Sus2) \cdot g(Sorg - Sus3) +$$

$$... + fk(Susk - 1 - Susk) \cdot g(Sorg - Susk + 1) +$$

$$... + fN(SusN - 1 - SusN) \cdot g(Sorg - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

66. A dynamic range compressing method as defined in claim 62 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, ..., SusN))$$

$$Fdrc(Sorg, Sus1, Sus2, ..., SusN) =$$

$$\{f1(Sorg - Sus1) \cdot g(Sorg - Sus2) + f2(Sus1 - Sus2) \cdot g(Sorg - Sus3) +$$

$$... + fk(Susk - 1 - Susk) \cdot g(Sorg - Susk + 1) +$$

$$... + fN(SusN - 1 - SusN) \cdot g(Sorg - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

67. A dynamic range compressing method as defined in claim 43 wherein the formation of the plurality of said converted image signals is carried out by:

converting a low frequency side band-limited image signal, which is of a frequency band lower than the frequency band of a band-limited image signal to be converted, with a non-linear function, an auxiliary image signal for said band-limited image signal to be converted being thereby obtained, said non-linear function having the characteristics such that the function passes through an origin, such that the inclination of the function at the origin is equal to approximately 0, and such that the inclination of the function increases gradually as the value to be processed becomes large, adding said auxiliary image signal to said band-limited image signal to be converted, a composite band-limited image signal being thereby obtained, and converting said composite band-limited image signal such that the absolute value of the signal value of said composite band-limited image signal is converted to a value, which is not larger than said absolute value and is determined in accordance with said absolute value.

68. A dynamic range compressing method as defined in claim 43 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots,$$

$$SusN) = [f1\{(Sorg - Sus1) + g(Sus1 - Sus2)\} +$$

$$f2\{(Sus1 - Sus2) + g(Sus2 - Sus3)\} + \ldots +$$

$$fk\{(Susk - 1 - Susk) + g(Susk - Susk + 1)\} + \ldots +$$

$$fN\{(SusN - 1 - SusN) + g(SusN - SusN + 1)\}]$$

wherein Sproc represents the image signal, in which the dynamic range has been compressed, Sorg represents the original image signal, Susk (k=1 to N+1) represents the unsharp mask image signal, fk (k=1 to N) represents the function for converting the composite band-limited image signal, g represents the function for converting the band-limited image signal and thereby obtaining the auxiliary image signal, and D(Sorg-Fdrc) represents the dynamic range compression factor determined in accordance with the low frequency component signal, in which D represents the function for converting Sorg-Fdrc.

69. A dynamic range compressing method as defined in claim 67 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots,$$

$$SusN) = [f1\{(Sorg - Sus1) + g(Sus1 - Sus2)\} +$$

$$f2\{(Sus1 - Sus2) + g(Sus2 - Sus3)\} + \ldots +$$

$$fk\{(Susk - 1 - Susk) + g(Susk - Susk + 1)\} + \ldots +$$

$$fN\{(SusN - 1 - SusN) + g(SusN - SusN + 1)\}]$$

wherein Sproc represents the image signal, in which the dynamic range has been compressed, Sorg represents the original image signal, Susk (k=1 to N+1) represents the unsharp mask image signal, fk (k=1 to N) represents the function for converting the composite band-limited image signal, g represents the function for converting the band-limited image signal and thereby obtaining the auxiliary image signal, and D(Sorg-Fdrc) represents the dynamic range compression factor determined in accordance with the low frequency component signal, in which D represents the function for converting Sorg-Fdrc.

70. A dynamic range compressing method as defined in claim 43 wherein the formation of the plurality of said converted image signals is carried out by converting a band-limited image signal in accordance with the portion of an object, the image of which was recorded as the original image.

71. A dynamic range compressing method as defined in claim 44 wherein the formation of the plurality of said converted image signals is carried out by converting a band-limited image signal in accordance with the portion of an object, the image of which was recorded as the original image.

72. A dynamic range compressing method as defined in claim 48 wherein the formation of the plurality of said converted image signals is carried out by converting a band-limited image signal in accordance with the portion of an object, the image of which was recorded as the original image.

73. A dynamic range compressing method as defined in claim 52 wherein the formation of the plurality of said converted image signals is carried out by converting a band-limited image signal in accordance with the portion of an object, the image of which was recorded as the original image.

74. A dynamic range compressing method as defined in claim 55 wherein the formation of the plurality of said converted image signals is carried out by converting a band-limited image signal in accordance with the portion of an object, the image of which was recorded as the original image.

75. A dynamic range compressing method as defined in claim 58 wherein the formation of the plurality of said converted image signals is carried out by converting a band-limited image signal in accordance with the portion of an object, the image of which was recorded as the original image.

76. A dynamic range compressing method as defined in claim 60 wherein the formation of the plurality of said converted image signals is carried out by converting a band-limited image signal in accordance with the portion of an object, the image of which was recorded as the original image.

77. A dynamic range compressing method as defined in claim 62 wherein the formation of the plurality of said converted image signals is carried out by converting a band-limited image signal in accordance with the portion of an object, the image of which was recorded as the original image.

78. A dynamic range compressing method as defined in claim 63 wherein the formation of the plurality of said converted image signals is carried out by converting a band-limited image signal in accordance with the portion of an object, the image of which was recorded as the original image.

79. A dynamic range compressing method as defined in claim 65 wherein the formation of the plurality of said converted image signals is carried out by converting a band-limited image signal in accordance with the portion of an object, the image of which was recorded as the original image.

80. A dynamic range compressing method as defined in claim 67 wherein the formation of the plurality of said converted image signals is carried out by converting a band-limited image signal in accordance with the portion of an object, the image of which was recorded as the original image.

81. A dynamic range compressing method as defined in claim 68 wherein the formation of the plurality of said converted image signals is carried out by converting a band-limited image signal in accordance with the portion of an object, the image of which was recorded as the original image.

82. A dynamic range compressing method as defined in claim 43 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

83. A dynamic range compressing method as defined in claim 44 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

84. A dynamic range compressing method as defined in claim 48 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

85. A dynamic range compressing method as defined in claim 52 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

86. A dynamic range compressing method as defined in claim 55 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

87. A dynamic range compressing method as defined in claim 58 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

88. A dynamic range compressing method as defined in claim 60 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

89. A dynamic range compressing method as defined in claim 62 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

90. A dynamic range compressing method as defined in claim 63 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

91. A dynamic range compressing method as defined in claim 65 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

92. A dynamic range compressing method as defined in claim 67 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

93. A dynamic range compressing method as defined in claim 68 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

94. A dynamic range compressing method as defined in claim 70 wherein the original image has been obtained from a tomographic image recording operation and contains a linear flow pattern, and the formation of the plurality of said unsharp mask image signals is carried out by conducting unsharp mask processing on the original image signal by using a one-dimensional unsharp mask extending along the direction of said flow pattern.

95. A dynamic range compressing apparatus, wherein a signal concerning low frequency components of an original image is added to an original image signal, which represents the original image, and the dynamic range of the original image is thereby compressed, the apparatus comprising:
   i) an unsharp mask image signal forming means for forming a plurality of unsharp mask image signals, which have different frequency response characteristics, from the original image signal,
   ii) a band-limited image signal forming means for forming a plurality of band-limited image signals, each of which represents one of signals falling within a plurality of different frequency bands of the original image signal, from the original image signal and the plurality of said unsharp mask image signals, or from the plurality of said unsharp mask image signals,
   iii) a conversion means for carrying out a converting process on at least a single band-limited image signal, which is among the plurality of said band-limited image signals, such that at least a portion of the band-limited image signal becomes small, and thereby forming a plurality of converted image signals, iv) an integration means for integrating the plurality of said converted image signals, and thereby obtaining an integration signal, v) a subtraction means for subtracting said integration signal from the original image signal, and thereby obtaining a difference signal, and vi) a compressing process means for converting said difference signal, and thereby obtaining the signal concerning the low frequency components of the original image, which signal is to be added to the original image signal.

96. A dynamic range compressing apparatus as defined in claim 95 wherein said conversion means forms the plurality of said converted image signals by converting a band-limited image signal having a signal value, the absolute value of which is larger than a predetermined threshold value, such that the absolute value of the signal value of the band-limited image signal, which absolute value is larger than the predetermined threshold value, is converted to a small value.

97. A dynamic range compressing apparatus as defined in claim 96 wherein said conversion means forms the plurality of said converted image signals by converting a band-limited image signal such that, as the absolute value of the signal value of the band-limited image signal becomes larger than the predetermined threshold value, the absolute value of the signal value of the band-limited image signal is converted to a small value, and such that, as the absolute value of the signal value of the band-limited image signal becomes smaller than a different threshold value, which is smaller than the predetermined threshold value, the absolute value of the signal value of the band-limited image signal is converted to a small value.

98. A dynamic range compressing apparatus as defined in claim 96 wherein said conversion means forms the plurality of said converted image signals by converting a band-limited image signal such that the level of the absolute value of the signal value of the band-limited image signal is changed in accordance with the frequency band of the band-limited image signal.

99. A dynamic range compressing apparatus as defined in claim 97 wherein said conversion means forms the plurality of said converted image signals by converting a band-limited image signal such that the level of the absolute value of the signal value of the band-limited image signal is changed in accordance with the frequency band of the band-limited image signal.

100. A dynamic range compressing apparatus as defined in claim 95 wherein said conversion means forms the plurality of said converted image signals by converting a band-limited image signal in accordance with one of a plurality of functions, which vary for different frequency bands, such that the absolute value of the signal value of the band-limited image signal is converted to a value, which is not larger than said absolute value and is determined in accordance with said absolute value.

101. A dynamic range compressing apparatus as defined in claim 100 wherein each of the functions, which are used for the formation of said converted image signals, converts a band-limited image signal having a signal value, the absolute value of which is larger than a predetermined value, such that the value of the converted image signal becomes approximately equal to a predetermined level, and wherein the functions are set such that, in a function for processing a high frequency band, said predetermined value is set to be smaller than those in the other functions.

102. A dynamic range compressing apparatus as defined in claim 100 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

103. A dynamic range compressing apparatus as defined in claim 101 wherein the functions, which are used for the formation of said converted image signals, are set such that, in a function for processing a low frequency band, the absolute value of the converted image signal, that is obtained when the band-limited image signal having a signal value, the absolute value of which falls within a predetermined range close to 0, is converted, takes a value smaller than those in the other functions.

104. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN)) \ Fdrc(Sorg, Sus1, Sus2, \ldots, SusN) = \{f1(Sorg-Sus1) + f2(Sus1-Sus2) + \ldots + fk(Susk-1-Susk) + \ldots + fN(SusN-1-SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

105. A dynamic range compressing apparatus as defined in claim 96 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

106. A dynamic range compressing apparatus as defined in claim 100 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = (Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) + f2(Sus1 - Sus2) + \ldots +$$

$$fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

107. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = (Sorg + D(Sorg - Fdrc(Sorg, Sus1, Sus2, \ldots, SusN))$$

$$Fdrc(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

108. A dynamic range compressing apparatus as defined in claim 96 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

109. A dynamic range compressing apparatus as defined in claim 100 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$(1/N) \cdot \{f1(Sorg - Sus1) + f2(Sorg - Sus2) +$$

$$\ldots + fk(Sorg - Susk) + \ldots + fN(Sorg - SusN)\}$$

wherein Sproc represents the image signal, in which the dynamic range has been compressed, Sorg represents the original image signal, Susk (k=1 to N) represents the unsharp mask image signal, fk (k=1 to N) represents the function for converting the band-limited image signal, and D(Sorg-Fdrc) represents the dynamic range compression factor determined in accordance with the low frequency component signal, in which D represents the function for converting Sorg-Fdrc.

110. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = (Sorg + D(Sorg - Fdrc(Sus1, Sus2, \ldots, SusN))$$

$$Fdrc(Sus1, Sus2, \ldots, SusN) = \{f2(Sus1 - Sus2) + f3(Sus2 - Sus3) +$$

$$\ldots + fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

111. A dynamic range compressing apparatus as defined in claim 96 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sus1, Sus2, \ldots, SusN))$$

$$Fdrc(Sus1, Sus2, \ldots, SusN) = \{f2(Sus1 - Sus2) + f3(Sus2 - Sus3) +$$

$$\ldots + fk(Susk - 1 - Susk) + \ldots + fN(SusN - 1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

112. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sus1, Sus2, \ldots, SusN))$$

$$Fdrc(Sus1, Sus2, \ldots, SusN) =$$

$$(1/N) \cdot \{f2(Sus1 - Sus2) + f3(Sus1 - Sus3) +$$

$$\ldots + fk(Sus1 - Susk) + \ldots + fN(Sus1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

113. A dynamic range compressing apparatus as defined in claim 96 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sus1, Sus2, \ldots, SusN))$$

$$Fdrc(Sus1, Sus2, \ldots, SusN) =$$

$$(1/N) \cdot \{f2(Sus1 - Sus2) + f3(Sus1 - Sus3) +$$

$$\ldots + fk(Sus1 - Susk) + \ldots + fN(Sus1 - SusN)\}$$

wherein Sproc represents the image signal, in which the dynamic range has been compressed, Sorg represents the original image signal, Susk (k=1 to N) represents the unsharp mask image signal, fk (k=2 to N) represents the function for converting the band-limited image signal, and D(Sorg-Fdrc) represents the dynamic range compression factor determined in accordance with the low frequency component signal, in which D represents the function for converting Sorg-Fdrc.

114. A dynamic range compressing apparatus as defined in claim 95 wherein said conversion means comprises:

a restricted image signal forming means for converting a band-limited image signal such that the absolute value of the signal value of the band-limited image signal may be converted to a value, which is not larger than said absolute value and is determined in accordance with said absolute value, and thereby obtaining a restricted image signal, an auxiliary image signal forming means for forming an auxiliary image signal, which contains a signal of a frequency band lower than the frequency band of the band-limited image signal having been used for the formation of said restricted image signal, said auxiliary image signal being formed from the original image signal and the plurality of said unsharp mask image signals, a magnification ratio signal forming means for converting said auxiliary image signal such that, as the absolute value of the signal value of said auxiliary image signal becomes small, said absolute value is converted to a value close to 1, and such that, as the absolute value of the signal value of said auxiliary image signal becomes large, said absolute value is converted to a value close to 0, and thereby obtaining a magnification ratio signal corresponding to said restricted image signal, and a multiplication means for multiplying said restricted image signal by said magnification ratio signal, which corresponds to said restricted image signal.

115. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) \cdot g(Sus1 - Sus2) + f2(Sus1 - Sus2) \cdot g(Sus2 - Sus3) +$$

$$\ldots + fk(Susk - 1 - Susk) \cdot g(Susk - Susk + 1) +$$

$$\ldots + fN(SusN - 1 - SusN) \cdot g(SusN - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

116. A dynamic range compressing apparatus as defined in claim 114 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) \cdot g(Sus1 - Sus2) + f2(Sus1 - Sus2) \cdot g(Sus2 - Sus3) +$$

$$\ldots + fk(Susk - 1 - Susk) \cdot g(Susk - Susk + 1) +$$

$$\ldots + fN(SusN - 1 - SusN) \cdot g(SusN - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

117. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) \cdot g(Sorg - Sus2) + f2(Sus1 - Sus2) \cdot g(Sorg - Sus3) +$$

$$\ldots + fk(Susk - 1 - Susk) \cdot g(Sorg - Susk + 1) +$$

$$\ldots + fN(SusN - 1 - SusN) \cdot g(Sorg - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

118. A dynamic range compressing apparatus as defined in claim 114 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$\{f1(Sorg - Sus1) \cdot g(Sorg - Sus2) + f2(Sus1 - Sus2) \cdot g(Sus3 - Sus3) +$$

$$\ldots + fk(Susk - 1 - Susk) \cdot g(Sorg - Susk + 1) +$$

$$\ldots + fN(SusN - 1 - SusN) \cdot g(Sorg - SusN + 1)\}$$

wherein Sproc represents the image signal, in which the dynamic range has been compressed, Sorg represents the original image signal, Susk (k=1 to N+1) represents the unsharp mask image signal, fk (k=1 to N) represents the function for converting the band-limited image signal and thereby obtaining the restricted image signal, g represents the function for converting the auxiliary image signal and thereby obtaining the magnification ratio signal, and D(Sorg-Fdrc) represents the dynamic range compression factor determined in accordance with the low frequency component signal, in which D represents the function for converting Sorg-Fdrc.

119. A dynamic range compressing apparatus as defined in claim 95 wherein said conversion means comprises:

an auxiliary image signal forming means for converting a low frequency side band-limited image signal, which is of a frequency band lower than the frequency band of a band-limited image signal to be converted, with a non-linear function, and thereby obtaining an auxiliary image signal for said band-limited image signal to be converted, said non-linear function having the characteristics such that the function passes through an origin, such that the inclination of the function at the origin is equal to approximately 0, and such that the inclination of the function increases gradually as the value to be processed becomes large, a composite band-limited image signal forming means for adding said auxiliary image signal to said band-limited image signal to be converted, and thereby obtaining a composite band-limited image signal, and a converted image signal forming means for converting said composite band-limited image signal such that the absolute value of the signal value of said composite band-limited image signal is converted to a value, which is not larger than said absolute value and is determined in accordance with said absolute value, and thereby forming a converted image signal.

120. A dynamic range compressing apparatus as defined in claim 95 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$[f1\{(Sorg - Sus1) + g(Sus1 - Sus2)\} +$$

$$f2\{(Sus1 - Sus2) + g(Sus2 - Sus3)\} + \ldots +$$

$$fk\{(Susk - 1 - Susk) + g(Susk - Susk + 1)\} + \ldots +$$

$$fN\{(SusN - 1 - SusN) + g(SusN - SusN + 1)\}]$$

wherein Sproc represents the image signal, in which the dynamic range has been compressed, Sorg represents the original image signal, Susk (k=1 to N+1) represents the unsharp mask image signal, fk (k=1 to N) represents the function for converting the composite band-limited image signal, g represents the function for converting the band-limited image signal and thereby obtaining the auxiliary image signal, and D(Sorg-Fdrc) represents the dynamic range compression factor determined in accordance with the low frequency component signal, in which D represents the function for converting Sorg-Fdrc.

121. A dynamic range compressing apparatus as defined in claim 119 wherein the formation of said band-limited image signals, the formation of said converted image signals, the formation of said integration signal, the formation of said difference signal, the formation of the signal concerning the low frequency components, and the addition of the signal concerning the low frequency components to the original image signal are carried out with the formula:

$$Sproc = Sorg + D(Sorg - Fdrc(Sorg, Sus1, Sus2, \ldots, SusN))$$

$$Fdrc(Sorg, Sus1, Sus2, \ldots, SusN) =$$

$$[f1\{(Sorg - Sus1) + g(Sus1 - Sus2)\} +$$

$$f2\{(Sus1 - Sus2) + g(Sus2 - Sus3)\} + \ldots +$$

$$fk\{(Susk - 1 - Susk) + g(Susk - Susk + 1)\} + \ldots +$$

$$fN\{(SusN - 1 - SusN) + g(SusN - SusN + 1)\}]$$

wherein Sproc represents the image signal, in which the dynamic range has been compressed, Sorg represents the original image signal, Susk (k=1 to N+1) represents the unsharp mask image signal, fk (k=1 to N) represents the function for converting the composite band-limited image signal, g represents the function for converting the band-limited image signal and thereby obtaining the auxiliary image signal, and D(Sorg-Fdrc) represents the dynamic range compression factor determined in accordance with the low frequency component signal, in which D represents the function for converting Sorg-Fdrc.

122. A dynamic range compressing apparatus as defined in claim 95 wherein said conversion means forms the plurality of said converted image signals by converting a band-limited image signal in accordance with the portion of an object, the image of which was recorded as the original image.

123. A dynamic range compressing apparatus as defined in claim 96 wherein said conversion means forms the plurality of said converted image signals by converting a band-limited image signal in accordance with the portion of an object, the image of which was recorded as the original image.

124. A dynamic range compressing apparatus as defined in claim 100 wherein said conversion means forms the plurality of said converted image signals by converting a band-limited image signal in accordance with the portion of an object, the image of which was recorded as the original image.

125. A dynamic range compressing apparatus as defined in claim 104 wherein said conversion means forms the plurality of said converted image signals by converting a band-limited image signal in accordance with the portion of an object, the image of which was recorded as the original image.

126. A dynamic range compressing apparatus as defined in claim 107 wherein said conversion means forms the plurality of said converted image signals by converting a band-limited image signal in accordance with the portion of an object, the image of which was recorded as the original image.

127. A dynamic range compressing apparatus as defined in claim 110 wherein said conversion means forms the plurality of said converted image signals by converting a band-limited image signal in accordance with the portion of an object, the image of which was recorded as the original image.

128. A dynamic range compressing apparatus as defined in claim 112 wherein said conversion means forms the plurality of said converted image signals by converting a band-limited image signal in accordance with the portion of an object, the image of which was recorded as the original image.

129. A dynamic range compressing apparatus as defined in claim 114 wherein said conversion means forms the plurality of said converted image signals by converting a band-limited image signal in accordance with the portion of an object, the image of which was recorded as the original image.

130. A dynamic range compressing apparatus as defined in claim 115 wherein said conversion means forms the plurality of said converted image signals by converting a band-limited image signal in accordance with the portion of an object, the image of which was recorded as the original image.

131. A dynamic range compressing apparatus as defined in claim 117 wherein said conversion means forms the plurality of said converted image signals by converting a band-limited image signal in accordance with the portion of an object, the image of which was recorded as the original image.

132. A dynamic range compressing apparatus as defined in claim 119 wherein said conversion means forms the plurality of said converted image signals by converting a band-limited image signal in accordance with the portion of an object, the image of which was recorded as the original image.

133. A dynamic range compressing apparatus as defined in claim 120 wherein said conversion means forms the plurality of said converted image signals by converting a band-limited image signal in accordance with the portion of an object, the image of which was recorded as the original image.

134. A dynamic range compressing apparatus as defined in claim 95 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

135. A dynamic range compressing apparatus as defined in claim 96 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

136. A dynamic range compressing apparatus as defined in claim 100 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

137. A dynamic range compressing apparatus as defined in claim 104 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

138. A dynamic range compressing apparatus as defined in claim 107 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

139. A dynamic range compressing apparatus as defined in claim 110 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

140. A dynamic range compressing apparatus as defined in claim 112 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

141. A dynamic range compressing apparatus as defined in claim 114 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

142. A dynamic range compressing apparatus as defined in claim 115 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

143. A dynamic range compressing apparatus as defined in claim 117 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

144. A dynamic range compressing apparatus as defined in claim 119 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

145. A dynamic range compressing apparatus as defined in claim 120 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

146. A dynamic range compressing apparatus as defined in claim 122 wherein the original image has been obtained from a tomographic image recording operation and contains a linear flow pattern, and said unsharp mask image signal forming means forms the plurality of said unsharp mask image signals by conducting unsharp mask processing on the original image signal by using a one-dimensional unsharp mask extending along the direction of said flow pattern.

\* \* \* \* \*